US012796703B2

(12) United States Patent
Beers et al.

(10) Patent No.: US 12,796,703 B2
(45) Date of Patent: Nov. 17, 2026

(54) METHODS AND DEVICES FOR TREATING A RAW AGRICULTURAL PRODUCT WITH A TREATMENT GAS

(71) Applicant: ICA TriNova, LLC, Newnan, GA (US)

(72) Inventors: Steven Beers, Newnan, GA (US); James Barry Billett, Newnan, GA (US)

(73) Assignee: ICA TriNova, LLC, Newnan, GA (US)

( * ) Notice: Subject to any disclaimer, the term of this patent is extended or adjusted under 35 U.S.C. 154(b) by 379 days.

(21) Appl. No.: 18/520,984

(22) Filed: Nov. 28, 2023

(65) Prior Publication Data

US 2024/0172766 A1 May 30, 2024

Related U.S. Application Data

(60) Provisional application No. 63/428,530, filed on Nov. 29, 2022.

(51) Int. Cl.

| | |
|---|---|
| ***A23B 7/152*** | (2006.01) |
| ***A23B 2/704*** | (2025.01) |
| ***A23B 2/721*** | (2025.01) |

(52) U.S. Cl.

CPC ............ *A23B 7/152* (2013.01); *A23B 2/7045* (2025.01); *A23B 2/721* (2025.01)

(58) Field of Classification Search

CPC ........ A23B 7/152; A23B 2/7045; A23B 2/721

See application file for complete search history.

(56) References Cited

U.S. PATENT DOCUMENTS

| | | | |
|---|---|---|---|
| 2,163,793 | A | 6/1939 | Ogden |
| 2,482,891 | A | 9/1949 | Aston |
| 2,885,368 | A | 5/1959 | Hess et al. |
| 3,049,399 | A | 8/1962 | Gamson et al. |
| 3,271,242 | A | 9/1966 | Mcnicholas |
| 3,298,780 | A | 1/1967 | Fleck |
| 3,382,033 | A | 5/1968 | Tetsuzo |
| 3,591,515 | A | 7/1971 | Lovely |
| 3,997,462 | A | 12/1976 | Denaeyer et al. |
| 4,076,242 | A | 2/1978 | Joseph |
| 4,247,531 | A | 1/1981 | Hicks |

(Continued)

FOREIGN PATENT DOCUMENTS

| | | |
|---|---|---|
| CN | 1820607 A | 8/2006 |
| CN | 100387518 C | 5/2008 |

(Continued)

OTHER PUBLICATIONS

Brickhouse, et al., "Effects of Vapor-Based Decontamination Systems on Selected Building Interior Materials: Chlorine Dioxide", EPA/600/R-08/054. Apr. 2008.

(Continued)

*Primary Examiner* — Sean E Conley

(74) *Attorney, Agent, or Firm* — Meunier Carlin & Curfman LLC

(57) ABSTRACT

Disclosed herein are devices and methods for controlled delivery of a treatment gas to treat a raw agricultural product, for example by contacting the raw agricultural product with the treatment gas. The devices and methods can deliver a dose of the treatment gas at a relative velocity, wherein the dose of the treatment gas and the relative velocity are selected in view of the surface reactivity of the raw agricultural product to be treated.

11 Claims, 21 Drawing Sheets
(16 of 21 Drawing Sheet(s) Filed in Color)

(56) References Cited

U.S. PATENT DOCUMENTS

| | | | |
|---|---|---|---|
| 4,292,292 | A | 9/1981 | Hicks et al. |
| 4,362,753 | A | 12/1982 | Barta et al. |
| 4,384,972 | A | 5/1983 | Nakamura et al. |
| 4,528,171 | A | 7/1985 | Casci et al. |
| 4,547,381 | A | 10/1985 | Mason et al. |
| 4,554,261 | A | 11/1985 | Gergely et al. |
| 4,581,219 | A | 4/1986 | Imada et al. |
| 4,585,482 | A | 4/1986 | Tice et al. |
| 4,590,057 | A | 5/1986 | Hicks |
| 4,689,169 | A | 8/1987 | Mason et al. |
| 4,695,296 | A | 9/1987 | Christe |
| 4,731,193 | A | 3/1988 | Mason et al. |
| 4,815,092 | A | 3/1989 | Chartier |
| 4,845,958 | A | 7/1989 | Senda et al. |
| 4,871,701 | A | 10/1989 | Danner et al. |
| 4,889,654 | A | 12/1989 | Mason et al. |
| 5,008,096 | A | 4/1991 | Ringo |
| 5,078,908 | A | 1/1992 | Ripley et al. |
| 5,110,580 | A | 5/1992 | Rosenblatt et al. |
| 5,246,622 | A | 9/1993 | Shimizu et al. |
| 5,264,227 | A | 11/1993 | Laroche et al. |
| 5,278,112 | A | 1/1994 | Klatte et al. |
| 5,302,354 | A | 4/1994 | Watvedt et al. |
| 5,306,440 | A | 4/1994 | Ripley et al. |
| 5,314,852 | A | 5/1994 | Klatte |
| 5,346,876 | A | 9/1994 | Ichimura et al. |
| 5,360,609 | A | 11/1994 | Wellinghoff |
| 5,376,164 | A | 12/1994 | Zarchy et al. |
| 5,407,656 | A | 4/1995 | Roozdar |
| 5,458,743 | A | 10/1995 | Allen |
| 5,464,598 | A | 11/1995 | Klatte et al. |
| 5,567,405 | A | 10/1996 | Biswell et al. |
| 5,573,743 | A | 11/1996 | Klatte et al. |
| 5,631,300 | A | 5/1997 | Wellinghoff |
| 5,639,295 | A | 6/1997 | Wellinghoff et al. |
| 5,668,185 | A | 9/1997 | Wellinghoff |
| 5,707,739 | A | 1/1998 | Wellinghoff et al. |
| 5,730,948 | A | 3/1998 | Klatte et al. |
| 5,776,850 | A | 7/1998 | Biswell et al. |
| 5,853,689 | A | 12/1998 | Klatte |
| 5,855,822 | A | 1/1999 | Chen |
| 5,885,543 | A | 3/1999 | Klatte |
| 5,935,660 | A | 8/1999 | Forsythe et al. |
| 5,974,810 | A | 11/1999 | Speronello |
| 5,989,497 | A | 11/1999 | Labonte, Jr. |
| 6,068,888 | A | 5/2000 | Forsythe et al. |
| 6,077,495 | A | 6/2000 | Speronello et al. |
| 6,132,748 | A | 10/2000 | Khanna et al. |
| 6,174,508 | B1 | 1/2001 | Klatte et al. |
| 6,238,643 | B1 | 5/2001 | Thangaraj et al. |
| 6,267,953 | B1 | 7/2001 | Bernier et al. |
| 6,322,002 | B1 | 11/2001 | Forsythe et al. |
| 6,379,643 | B1 | 4/2002 | Klatte et al. |
| 6,383,541 | B1 | 5/2002 | Danner et al. |
| 6,423,277 | B1 | 7/2002 | Gravitt et al. |
| 6,423,289 | B1 | 7/2002 | Klatte et al. |
| 6,436,345 | B1 | 8/2002 | Roensch et al. |
| 6,458,735 | B1 | 10/2002 | Klatte et al. |
| 6,503,419 | B2 | 1/2003 | Klatte et al. |
| 6,592,919 | B1 | 7/2003 | Matthews et al. |
| 6,602,466 | B2 | 8/2003 | Hamilton et al. |
| 6,605,558 | B2 | 8/2003 | Klatte et al. |
| 6,607,696 | B1 | 8/2003 | Hamilton et al. |
| 6,635,230 | B2 | 10/2003 | Klatte et al. |
| 7,077,995 | B2 | 7/2006 | Roensch et al. |
| 7,220,367 | B2 | 5/2007 | Speronello et al. |
| 7,273,567 | B1 | 9/2007 | Wellinghoff et al. |
| 7,347,994 | B2 | 3/2008 | Tenney et al. |
| 7,625,533 | B2 | 12/2009 | Doona et al. |
| 7,883,640 | B2 | 2/2011 | Doona et al. |
| 7,922,984 | B2 | 4/2011 | Hamilton et al. |
| 7,922,992 | B2 | 4/2011 | Ernst et al. |
| 8,178,145 | B1 | 5/2012 | Micka et al. |
| 8,192,684 | B2 | 6/2012 | Mason et al. |
| 8,622,209 | B2 | 1/2014 | Isaac et al. |
| 8,652,411 | B2 | 2/2014 | Taguchi et al. |
| 8,709,396 | B2 | 4/2014 | Tenney et al. |
| 8,920,717 | B2 | 12/2014 | Nelson et al. |
| 8,991,123 | B2 | 3/2015 | Micka et al. |
| 9,227,156 | B2 | 1/2016 | Richardson et al. |
| 9,380,746 | B2 | 7/2016 | Micka et al. |
| 9,382,116 | B2 | 7/2016 | Isaac et al. |
| 9,414,611 | B2 | 8/2016 | Ernst et al. |
| 9,605,890 | B2 | 3/2017 | Micka et al. |
| 9,901,105 | B2 | 2/2018 | Ernst et al. |
| 10,076,129 | B1 | 9/2018 | Micka |
| 10,850,981 | B2 | 12/2020 | Ernst et al. |
| 12,329,159 | B2 | 6/2025 | Cushman et al. |
| 2001/0036421 | A1 | 11/2001 | Speronello et al. |
| 2001/0038805 | A1 | 11/2001 | Hamilton et al. |
| 2002/0028191 | A1 | 3/2002 | Bernier et al. |
| 2002/0036284 | A1 | 3/2002 | Speronello et al. |
| 2002/0056830 | A1 | 5/2002 | Klatte et al. |
| 2002/0122854 | A1 | 9/2002 | Danner et al. |
| 2003/0021819 | A1 | 1/2003 | Khanna et al. |
| 2003/0082087 | A1 | 5/2003 | Klatte et al. |
| 2003/0205051 | A1 | 11/2003 | Kilawee et al. |
| 2003/0215381 | A1 | 11/2003 | Rosenblatt et al. |
| 2004/0022676 | A1 | 2/2004 | Hamilton et al. |
| 2004/0051080 | A1 | 3/2004 | Ernst et al. |
| 2006/0034750 | A1 | 2/2006 | Lee et al. |
| 2006/0099121 | A1 | 5/2006 | Doona et al. |
| 2006/0130498 | A1 | 6/2006 | Joshi et al. |
| 2007/0039898 | A1 | 2/2007 | Dee |
| 2007/0081919 | A1 | 4/2007 | Koermer et al. |
| 2007/0237671 | A1 | 10/2007 | Yuan et al. |
| 2008/0025870 | A1 | 1/2008 | Groenewegen et al. |
| 2008/0131395 | A1 | 6/2008 | Wellinghoff et al. |
| 2009/0196969 | A1 | 8/2009 | Guzman |
| 2010/0075004 | A1 | 3/2010 | Nelson et al. |
| 2010/0209332 | A1 | 8/2010 | Hratko et al. |
| 2011/0062086 | A1 | 3/2011 | Burns et al. |
| 2011/0082591 | A1 | 4/2011 | Micka et al. |
| 2011/0150748 | A1 | 6/2011 | Thangaraj |
| 2012/0012092 | A1 | 1/2012 | Micka et al. |
| 2012/0024744 | A1 | 2/2012 | Harrison et al. |
| 2012/0034356 | A1 | 2/2012 | Itzhak |
| 2013/0071287 | A1 | 3/2013 | O'Connell |
| 2013/0287722 | A1 | 10/2013 | Uhlmann |
| 2014/0050831 | A1 | 2/2014 | Itzhak |
| 2014/0086821 | A1 | 3/2014 | Ozawa et al. |
| 2014/0147360 | A1 | 5/2014 | Richardson et al. |
| 2014/0272046 | A1 | 9/2014 | Micka et al. |
| 2015/0173381 | A1 | 6/2015 | Micka et al. |
| 2015/0173382 | A1 | 6/2015 | Ernst et al. |
| 2015/0273096 | A1 | 10/2015 | Takimoto |
| 2017/0051945 | A1 | 2/2017 | Micka et al. |
| 2017/0202876 | A1 | 7/2017 | Pugliese et al. |
| 2017/0332674 | A1 | 11/2017 | Annous et al. |
| 2017/0339968 | A1 | 11/2017 | Edelman et al. |
| 2018/0305209 | A1 | 10/2018 | Ernst et al. |
| 2019/0159470 | A1 | 5/2019 | Sardo et al. |
| 2019/0284049 | A1 | 9/2019 | Ernst et al. |
| 2020/0221701 | A1 | 7/2020 | Cushman et al. |
| 2022/0061223 | A1 | 3/2022 | Micka et al. |
| 2022/0387645 | A1 | 12/2022 | Cushman et al. |
| 2023/0363394 | A1 | 11/2023 | Cushman et al. |

FOREIGN PATENT DOCUMENTS

| | | | |
|---|---|---|---|
| CN | 101253881 | A | 9/2008 |
| CN | 101411334 | A | 4/2009 |
| CN | 102249194 | A | 11/2011 |
| CN | 102422841 | A | 4/2012 |
| CN | 105453920 | A | 4/2016 |
| EP | 0132049 | A1 | 1/1985 |
| EP | 0159660 | A2 | 10/1985 |
| JP | S52038028 | B1 | 9/1977 |
| JP | S5667521 | U | 6/1981 |
| JP | S58161904 | U | 9/1983 |
| JP | S60827 | Y2 | 1/1985 |
| JP | S61256915 | A | 11/1986 |
| JP | S6471804 | A | 3/1989 |
| JP | 02009318 | | 1/1990 |

(56) References Cited

FOREIGN PATENT DOCUMENTS

| | | | |
|---|---|---|---|
| JP | H029318 | A | 1/1990 |
| JP | H02198629 | A | 8/1990 |
| JP | H03979 | U | 1/1991 |
| JP | H0323863 | U | 3/1991 |
| JP | 6285368 | B2 | 10/1994 |
| JP | 08309099 | A | 11/1996 |
| JP | 5342054 | B2 | 8/2013 |
| JP | 2014196207 | A | 10/2014 |
| KR | 20040095440 | A | 11/2004 |
| KR | 200380383 | Y1 | 3/2005 |
| KR | 100726421 | B1 | 6/2007 |
| KR | 20130018756 | A | 2/2013 |
| KR | 20130079244 | A | 7/2013 |
| KR | 20160011341 | A | 2/2016 |
| WO | 8505008 | A1 | 11/1985 |
| WO | 8505038 | A1 | 11/1985 |
| WO | 9811776 | A1 | 3/1998 |
| WO | 9838865 | A1 | 9/1998 |
| WO | 9962817 | A1 | 12/1999 |
| WO | 0010695 | A1 | 3/2000 |
| WO | 0035495 | A1 | 6/2000 |
| WO | 0065910 | A1 | 11/2000 |
| WO | 0069775 | A1 | 11/2000 |
| WO | 03051407 | A1 | 6/2003 |
| WO | 2015098730 | A1 | 7/2015 |

OTHER PUBLICATIONS

Calderon et al. "Chlorine Dioxide absorption by potatoes in a packed bed," Poster, Orlando, FL, Jan. 6, 2015.
Chen. "A Focus on Chlorine Dioxide: The Promising Food Preservative," Journal of Experimental Food Chemistry, 2017, 3(1), 1000e107.
Crawford, et al., "Decomposition Rate Studies in the Gaseous Chlorine Dioxide-Water System", APPI, 1968, 51 (5), pp. 226-230.
DeVries. "Chlorine Dioxide Trial Strawberries," Well-Pict, Oxnard, VA, Nov. 11, 2010.
FoodDefend, FruitGard, Brochure, Aug. 21, 2014 (2 pages).
Gomez-Lopez, et al., "Chlorine dioxide for minimally processed produce preservation: a review", Trends in Food & Science Technology, 2009, 20, 17-26.
Grevens et al. "Evaluation of FruitGard and standard post-harvest fungicides for control of potato pink rot and silver scurf under storage conditions," Poster, University of Wisconsin, Madison, WI, Jan. 5, 2015.
Lorcheim. "Reducing Food Recalls with Microbial Fumigation of Food Processing Facilities," Food Protection Trends, Sep.-Oct. 2013, 334-336.
Mahovic, et al., "Applications of Chlorine Dioxide Gas for Control of Bacterial Soft Rot in Tomatoes", Plant Disease, 2007, 91(10), 1316-1320.
McHale, et al., "The Explosive Decomposition of Chlorine Dioxide", Journal of Physical Chemistry. 1968, 72(6), pp. 1849-1856.
Netramai, , "Utilization of Chlorine Dioxide Gas in Food Packaging Applications.", Thesis. Michigan State University. 2011.
O'Connell. "On 'Gard': New option emerges for rot control in potato storage," Spudman, Jul./Aug. 2018, pp. 16-17.
Olsen, et al., "Efficacy of chlorine dioxide for disease control on stored potatoes", American Journal of Potato Research, 2003, 80, 387-395.
Olsen, et al., "The use of chlorine dioxide in potato storage", University of Idaho, College of Agriculture, 2000, Bulletin 825.
Rao, et al., "Perchlorate Formation by Ozone Oxidation of Aqueous Chlorine/Oxy-Chlorine Species: Role of ClxOy Radicals", Environmental Science and Technology. 2010, 44, pp. 2961-2967.
Scruggs et al. "Cultural, Chemical, and Alternative Control Strategies for Rhizopus Soft Rot of Sweetpotato," Plant Disease, 2016, 100(8), 1532-1540.
Simpson, et al., "A focus on Chlorine Dioxide: The 'Ideal' Biocide", 2000, Houston, Tex. Unichem Intl. Inc., 20 pages, Available from:www.clo2.com/reading/waste/corrosion.html, accessed on Sep. 19, 2008.
Smith et al. "Distribution and chemical fate of 36Cl-Chlorine dioxide gas during the fumigation of tomatoes and cantaloupe," Journal of Agricultural and Food Chemistry, 2014, 62, 11756-11766.
Smith et al. "Chloroxyanion Residues in Cantaloupe and Tomatoes after Chlorine Dioxide Gas Sanitation," Journal of Agricultural and Food Chemistry, 2015, 63, 9640-9649.
Spinks, et al., "Photodecomposition of Chlorine Dioxide", ACS, 1934, 56(2), pp. 264-270.
Sy. Evaluation of Chlorine dioxide gas as a sanitizer for fresh fruits and vegetables. Masters Thesis, University of Georgia, 2004, 127 pages.
Sy et al. Evaluation of Gaseous Chlorine Dioxide as a Sanitizer for Killing *Salmonella, Escherichia coli* O157:H7, *Listeria monocytogenes*, and Yeasts and Molds on Fresh and Fresh-Cut Produce, Journal of Food Protection, 2005, 68(6), 1176-1187.
Tenney. Z Series Coil Cleaner, Tri Fold Brochure, Newnan, GA, Mar. 19, 2013 (2 pages).
Tenney, ICA TriNova, FoodDefend Interventions, Presentation, Ft. Pierce, FL, Oct. 27, 2016.
Tenney, ICA TriNova, Safety Data Sheet, FruitGard Maintenance Part A, Sep. 18, 2013.
Tenney, ICA TriNova, Safety Data Sheet, FruitGard Maintenance Part B, Jun. 18, 2013.
Tenney, ICA TriNova, Safety Data Sheet, FruitGard Wipeout Part A, Sep. 18, 2013.
Tenney, ICA TriNova, Safety Data Sheet, FruitGard Wipeout Part B, Jun. 18, 2013.
Tenney. Z Series brochure, Marietta, GA, Sep. 29, 2008 (1 page).
Trinetta, et al., "Evaluation of Chlorine Dioxide Gas Residues on Selected Food Produce", Journal of Food Science, 2011, 76(1), T11-T15.
Tsai, et al., "Prevention of Potato Spoilage During Storage by Chlorine Dioxide", Journal of Food Science, 2001, 66 (3), 472-477.
Vandekinderen, et al., "Effects of tantalum oxide films on stability and optical memory in electrochromic tungsten oxide films", International Journal of Food Microbiology, 2009, 131, 138-144.
Wu et al. "A simple gaseous chlorine dioxide method for microbial decontamination on potatoes during storage," Poster, University of Maine, Aug. 4, 2008.
Wu et al. "A simple instrument-free gaseous chlorine dioxide method for microbial decontamination of potatoes during storage." Food Microbiology, 2010, 27, 179-184.
Xin, et al., "Highly Selective Spectrophotometric Determination of Chlorine Dioxide in Water using Rhodamine B", Analyst. 1995, 120, pp. 1199-1200.
Food and Agriculture Organization of the United Nations. "The State of Food and Agriculture, Moving Forward on Food Loss and Waste Reduction," 2019, 182 pages.
US Environmental Protection Agency, "Wasted Food Measurement Methodology Scoping Memo," Jul. 2020, 100 pages.
US Environmental Protection Agency, "From Farm to Kitchen: The Environmental Impacts of US Food Waste," Nov. 2021, 113 pages.
CEC, 2017, Characterization and Management of Food loss and Waste in North America, Montreal, Canada: Commission for Environmental Cooperation, 48 pages.

METHODS AND DEVICES FOR TREATING A RAW AGRICULTURAL PRODUCT WITH A TREATMENT GAS

CROSS-REFERENCE TO RELATED APPLICATIONS

This application claims the benefit of priority to U.S. Provisional Application No. 63/428,530 filed Nov. 29, 2022, which is hereby incorporated herein by reference in its entirety.

BACKGROUND

Over one-third of the food produced in the United States is never eaten (Food and Agriculture Organization of the United Nations, 2019, The State of Food and Agriculture 2019; Commission for Environmental Cooperation, 2017, Characterization and Management Food Loss and Waste in North America). Food waste is the single most common material landfilled and incinerated in the United States (U.S. Environmental Protection Agency, 2020, Wasted Food Measurement Methodology Scoping Memo). Between 70-90% of the food lost or wasted in the Unites States is edible (edibility is based on the type or part of food, not whether the food was spoiled when wasted (U.S. Environmental Protection Agency, 2021, From Farm to Kitchen: The Environmental Impacts of US Food Waste, Part 1). Fruits and vegetables are the most commonly wasted foods in the US, accounting for 30-40% of the food loss and waste in the US. Id.

The greatest environmental benefits can be achieved through prevention of food loss and waste rather than recycling (U.S. Environmental Protection Agency, 2021, From Farm to Kitchen: The Environmental Impacts of U.S. Food Waste, Part 1). Further, focusing on reducing food loss and waste of the most resource-intensive foods, such as fruits and vegetables, can yield the greatest environmental benefits. Id.

Accordingly, methods to reduce food loss and waste of raw agricultural products are still needed. The methods discussed herein address these and other needs.

SUMMARY

In accordance with the purposes of the disclosed devices and methods, as embodied and broadly described herein, the disclosed subject matter relates to methods and devices for treating a raw agricultural product with a treatment gas.

For examples, disclosed herein is a device for controlled delivery of a treatment gas to treat a raw agricultural product within a treatment zone having a volume. The device comprises a reactor fluidly connected to the treatment zone. The treatment gas is produced in the reactor and the treatment zone is configured to receive the treatment gas from the reactor upon application of a pressure differential. The raw agricultural product is treated with the treatment gas in the treatment zone. The raw agricultural product has a surface and the surface has a reactivity with the treatment gas, the reactivity of the surface of the raw agricultural product with the treatment gas being the surface reactivity. The device is configured to deliver a dose of the treatment gas at a relative velocity to the treatment zone. The dose of the treatment gas and the relative velocity are selected in view of the surface reactivity of the raw agricultural product to be treated. For example, when the raw agricultural product has a low surface reactivity, then the dose is from 1 to 1000 ppmv and the relative velocity is from 0.01 to 0.1 feet per minute; when the raw agricultural product has a moderate surface reactivity, then the dose is from 0.1 to 100 ppmv and the relative velocity is from 0.05 to 0.25 feet per minute; and when the raw agricultural product has a high surface reactivity, then the dose is from 0.01 to 10 ppmv and the relative velocity is from 0.05 to 0.5 feet per minute; wherein surface reactivity of the raw agricultural product is as defined in Table 1.

In some examples, the reactor is fluidly connected to the treatment zone via a first duct, the first duct creating a path for fluid flow between the reactor and the treatment zone.

In some examples, the reactor, the treatment zone, the first duct, or a combination thereof further comprises a sealable port configured to fluidly isolate the reactor from the treatment zone upon sealing the sealable port.

In some examples, the pressure differential comprises a positive pressure differential and the device further comprises a motive source fluidly connected to the reactor. In some examples, the motive source is fluidly connected to the reactor via a second duct, the second duct creating a path for fluid flow between the reactor and the motive source. In some examples, the reactor, the motive source, the second duct, or a combination thereof further comprises a sealable port configured to fluidly isolate the reactor from the motive source upon sealing the sealable port. In some examples, the motive source comprises a blower, a fan, a gas cylinder, or a combination thereof.

In some examples, the pressure differential comprises a negative pressure differential and the device further comprises a motive source fluidly connected to the treatment zone. In some examples, the motive source is connected to the treatment zone via a second duct, the second duct creating a path for fluid flow between the treatment zone and the motive source. In some examples, the treatment zone, the motive source, the second duct, or a combination thereof further comprises a sealable port configured to fluidly isolate the treatment zone from the motive source upon sealing the sealable port. In some examples, the motive source comprises a vacuum source.

In some examples, the absolute value of the pressure differential is from greater than 0 to 1 pounds per square inch (psi).

In some examples, the treatment zone has a volume of from 0.1 cubic feet to 8000 cubic feet. In some examples, the treatment zone has a volume of 380 cubic inches.

In some examples, the device further comprises a treatment chamber, wherein the treatment chamber comprises an interior surface and the treatment zone is at least partially enclosed by the interior surface of the treatment chamber. In some examples, the treatment zone is fully enclosed by the interior surface of the treatment chamber.

In some examples, the treatment chamber comprises an interior surface and at least a portion of the interior surface of the treatment chamber is perforated. In some examples, the treatment chamber is configured to receive the treatment gas from the reactor through the perforated portion of the interior surface such that the treatment gas diffuses into the treatment chamber via the perforated portion of the interior surface. In some examples, the raw agricultural product is located on the perforated portion of the interior surface of the treatment chamber.

In some examples, the reactor, the treatment chamber, the first duct, and the second duct independently comprise a rigid material or a flexible material.

In some examples, the reactor, the treatment chamber, the first duct, and the second duct, or a combination thereof comprise(s) an inert material.

In some examples, the raw agricultural product comprises a single item that is the raw agricultural product.

In some examples, the raw agricultural product comprises a plurality of items that are the raw agricultural products.

In some examples, the raw agricultural product is further contained within a gas permeable container within the treatment zone.

In some examples, the treatment zone has a temperature of from 0 °C to 32 °C.

In some examples, the treatment gas comprises chlorine dioxide, carbon dioxide, or a combination thereof.

In some examples, the device is configured such that the raw agricultural product is contacted with the treatment gas within the treatment zone for an amount of time of from 5 minutes to 48 hours.

In some examples, the treatment gas is produced from a precursor in the reactor at a rate of from 0.1 milligram (mg) of treatment gas per day per gram (g) of precursor initially present to 600 mg of gas/day/g of precursor initially present.

In some examples, the treatment zone has a humidity of from 20% to 100%, wherein the humidity is non-condensing.

In some examples, the device is configured to select the humidity of the treatment zone in view of the surface reactivity of the raw agricultural product. In some examples, when the raw agricultural product as a low surface reactivity, then the humidity of the treatment zone is from 60%-100%; when the raw agricultural product has a moderate surface reactivity, then the humidity of the treatment zone is from 40%-80%; and when the raw agricultural product has a high surface reactivity, then the humidity of the treatment zone is from 20%-60%; wherein the humidity is non-condensing.

In some examples, the reactor further comprises a bed comprising dry particles of a precursor and dry particles of a proton generating species and producing the treatment gas in the reactor comprises directing air through the bed.

In some examples, the bed comprises a mixture of the dry particles of the precursor and the dry particles of the proton generating species.

In some examples, the bed comprises a layered bed comprising alternating layers of a layer of the dry particles comprising the precursor and a layer of the dry particles comprising the proton generating species. In some examples, the total number of layers in the layered bed is 3 or more.

In some examples, the treatment gas is produced at a rate that is controlled by controlling the presence or absence of air flowing though the bed, the amount of time the air flows through the bed, the amount of the dry particles comprising the precursor in the bed, the amount of the dry particles comprising the proton-generating species in the bed, the temperature, or a combination thereof.

In some examples, the air has a humidity of from 50% to 80%.

In some examples, the reactor further comprises dry particles of a precursor and dry particles of a proton generating species enclosed within an enclosing material and producing the treatment gas in the reactor comprises directing air through the reactor. In some examples, the enclosing material is substantially impervious to liquid water. In some examples, the enclosing material comprises membrane comprising a polyethylene or paper filter. In some examples, the enclosing material comprises TYVEK® and GORTEX®. In some examples, the enclosing material is a sachet comprising three layers of membrane material forming a two-compartment sachet to separate the dry particles of the proton-generating species from the dry particles of the precursor.

In some examples, the treatment gas is produced at a rate that is controlled by controlling the presence or absence of air flowing though the reactor, the amount of time the air flows through the reactor, the amount of the dry particles comprising the precursor enclosed in the enclosing material, the amount of the dry particles comprising the proton-generating species enclosed within the enclosing material, the temperature, the humidity of the air flowing through the reactor, the type of enclosing material, the thickness of the enclosing material, or a combination thereof.

In some examples, the air has a humidity of from 50% to 80%.

In some examples, the reactor further comprises a mixer containing dry particles of a precursor and dry particles of a proton generating species and wherein producing the treatment gas in the reactor comprises dynamically mixing the dry particles of the precursor and the dry particles of the proton generating species in the mixer. In some examples, the treatment gas is produced at a rate that is varied by varying the amount of time the dry particles comprising the precursor and the dry particles comprising the proton-generating species are dynamically mixed, the rate at which the dry particles comprising the precursor and the dry particles comprising the proton-generating species are dynamically mixed, or a combination thereof. In some examples, the mixer is selected from the group consisting of a tumbler, a vibratory mixer, a rotary mixer, a marinator mixer, and a stirrer. In some examples, the mixer is selected from the group consisting of a tumbler, a rotary mixer, a marinator mixer, and a stirrer and wherein the dry particles comprising the precursor and dry particles comprising the proton-generating species are dynamically mixed at a rate of from 1 revolution per day (RPD) to 100 revolutions per minute (RPM). In some examples, the mixer is a vibratory mixer and the dry particles comprising the precursor and dry particles comprising the proton-generating species are dynamically mixed at a rate of from 1 Hertz (Hz) to 20 kilohertz (kHz). In some examples, the amount of time that the dry particles comprising the precursor and dry particles comprising the proton-generating species are dynamically mixed is from 1 minute to 24 hours.

In some examples, the reactor further comprises a means for milling, crushing, abrading, or a combination thereof the dry particles comprising the precursor and dry particles comprising the proton-generating species.

In some examples, the mixer further contains an abrasive particle and producing the treatment gas in the reactor further comprises dynamically mixing the abrasive particle with the dry particles comprising the precursor and dry particles comprising the proton-generating species.

In some examples, the mixer further contains a deliquescent and producing the treatment gas in the reactor further comprises dynamically mixing the deliquescent with the dry particles comprising the precursor and dry particles comprising the proton-generating species.

In some examples, the mixer further contains a desiccant and producing the treatment gas in the reactor further comprises dynamically mixing the desiccant with the dry particles comprising the precursor and dry particles comprising the proton-generating species.

In some examples, the dry particles comprising the precursor comprise a chlorine dioxide precursor and the treatment gas comprises chlorine dioxide; the dry particles comprising the precursor comprise a carbon dioxide precursor and the treatment gas comprises carbon dioxide; or a combination thereof.

In some examples, the dry particles comprising the precursor further comprise a porous carrier selected from the group consisting of zeolite crystals, silica, pumice, diatomaceous earth, bentonite, and clay, and wherein the precursor is impregnated in the porous carrier.

In some examples, the dry particles comprising the precursor include from 1% to 30% by weight of the precursor.

In some examples, the dry particles comprising the precursor comprise a carbon dioxide precursor and the carbon dioxide precursor comprises a carbon-containing compound selected from the group consisting of carbonates, bicarbonates, sesquicarbonates, and combinations thereof. In some examples, the carbon-containing compound is selected from the group consisting of sodium carbonate, sodium bicarbonate, sodium sesquicarbonate, and combinations thereof.

In some examples, the dry particles comprising the precursor comprise a chlorine dioxide precursor and the chlorine dioxide precursor comprises a chlorine dioxide-producing compound selected from the group consisting of a metal chlorite, a metal chlorate, chloric acid, hypochlorous acid, and combinations thereof. In some examples, the metal chlorite comprises sodium chlorite, barium chlorite, calcium chlorite, lithium chlorite, potassium chlorite, magnesium chlorite, or combinations thereof; or wherein the metal chlorate comprises sodium chlorate, lithium chlorate, potassium chlorate, magnesium chlorate, barium chlorate, or combinations thereof.

In some examples, the dry particles comprising the proton-generating species further comprise a porous carrier selected from the group consisting of zeolite crystals, silica, pumice, diatomaceous earth, bentonite, and clay, and wherein the proton-generating species is impregnated in the porous carrier.

In some examples, the dry particles comprising the proton-generating species include from 10% to 40% by weight of the proton-generating species.

In some examples, the proton-generating species comprises an organic acid, an inorganic acid, a metal salt, or a combination thereof. In some examples, the proton-generating species comprises an organic acid and/or an inorganic acid selected from the group consisting of acetic acid, citric acid, hydrochloric acid, phosphoric acid, propionic acid, sulfuric acid, and combinations thereof. In some examples, the proton-generating species comprises a metal salt selected from the group consisting of ferric chloride, ferric sulfate, $CaCl_2$, $ZnSO_4$, $ZnCl_2$, $CoSO_4$, $CoCl_2$, $MnSO_4$, $MnCl_2$, $CuSO_4$, $CuCl_2$, $MgSO_4$, sodium acetate, sodium citrate, sodium sulfate, sodium bisulfate, hydrogen phosphate, disodium hydrogen phosphate, and combinations thereof.

In some examples, producing the treatment gas in the reactor comprises mixing a solution of a precursor and a solution of a proton generating species. In some examples, the precursor comprises a carbon dioxide precursor and the carbon dioxide precursor comprises a carbon-containing compound selected from the group consisting of carbonates, bicarbonates, sesquicarbonates, and combinations thereof. In some examples, the carbon-containing compound is selected from the group consisting of sodium carbonate, sodium bicarbonate, sodium sesquicarbonate, and combinations thereof. In some examples, the precursor comprises a chlorine dioxide precursor and the chlorine dioxide precursor comprises a chlorine dioxide-producing compound selected from the group consisting of a metal chlorite, a metal chlorate, chloric acid, hypochlorous acid, and combinations thereof. In some examples, the metal chlorite comprises sodium chlorite, barium chlorite, calcium chlorite, lithium chlorite, potassium chlorite, magnesium chlorite, or combinations thereof; or wherein the metal chlorate comprises sodium chlorate, lithium chlorate, potassium chlorate, magnesium chlorate, barium chlorate, or combinations thereof. In some examples, the proton-generating species comprises an organic acid, an inorganic acid, a metal salt, or a combination thereof. In some examples, the proton-generating species comprises an organic acid and/or an inorganic acid selected from the group consisting of acetic acid, citric acid, hydrochloric acid, phosphoric acid, propionic acid, sulfuric acid, and combinations thereof. In some examples, the proton-generating species comprises a metal salt selected from the group consisting of ferric chloride, ferric sulfate, $CaCl_2$, $ZnSO_4$, $ZnCl_2$, $CoSO_4$, $CoCl_2$, $MnSO_4$, $MnCl_2$, $CuSO_4$, $CuCl_2$, $MgSO_4$, sodium acetate, sodium citrate, sodium sulfate, sodium bisulfate, hydrogen phosphate, disodium hydrogen phosphate, and combinations thereof. In some examples, the treatment gas comprises chlorine dioxide and the chlorine dioxide gas is generated by mixing a sodium chlorite solution and hydrochloric acid solution.

In some examples, the device is further configured to recycle the treatment gas from the treatment zone.

In some examples, the device comprises a display case.

In some examples, the device further comprises a hydrocooler, a liquid ice injector, a forced air cooler, a vacuum cooler, or a combination thereof.

In some examples, the device further comprises a means for forced air circulation, cooling, hydration, sanitation, or a combination thereof.

In some examples, the device further comprises a sensory control that incorporates feedback, feedforward, and/or time appropriate logic controllers.

In some examples, the device further comprises a computing device comprising a processor and a memory operably coupled to the processor, the memory further having computer-executable instructions stored thereon that, when executed by the processor, cause the processor to: receive a measurement from the sensory control and incorporate feedback, feedforward and/or time appropriate control of a parameter based thereon.

Also disclosed herein are methods of treating a raw agricultural product with a treatment gas within a treatment zone. The methods comprise producing the treatment gas in a reactor, the reactor being fluidly connected to the treatment zone. The methods further comprise applying a pressure differential to direct the treatment gas from the reactor to the treatment zone. The raw agricultural product is treated with the treatment gas in the treatment zone. The raw agricultural product has a surface and the surface has a reactivity with the treatment gas, the reactivity of the surface of the raw agricultural product with the treatment gas being the surface reactivity. A dose of the treatment gas is delivered to the treatment zone at a relative velocity. The method further comprises selecting the dose of the treatment gas and the relative velocity in view of the surface reactivity of the raw agricultural product to be treated; wherein: when the raw agricultural product has a low surface reactivity, then the dose is from 1 to 1000 ppmv and the relative velocity is from 0.01 to 0.1 feet per minute; when the raw agricultural product has a moderate surface reactivity, then the dose is from 0.1 to 100 ppmv and the relative velocity is from 0.05 to 0.25 feet per minute; and when the raw agricultural product has a high surface reactivity, then the dose is from 0.01 to 10 ppmv and the relative velocity is from 0.05 to 0.5 feet per minute; wherein surface reactivity of the raw agricultural product is as defined in Table 1.

In some examples, the method comprises using any of the devices disclosed herein.

In some examples, the absolute value of the pressure differential is from greater than 0 to 1 psi.

In some examples, the treatment zone has a volume of from 0.1 cubic feet to 8000 cubic feet.

In some examples, the raw agricultural product comprises a single item that is the raw agricultural product.

In some examples, the raw agricultural product comprises a plurality of items that are the raw agricultural product.

In some examples, the raw agricultural product is further contained within a gas permeable container within the treatment zone.

In some examples, the treatment zone has a temperature of from 0 °C to 32 °C.

In some examples, the treatment gas comprises chlorine dioxide, carbon dioxide, or a combination thereof.

In some examples, the raw agricultural product is contacted with the treatment gas within the treatment zone for an amount of time of from 5 minutes to 48 hours.

In some examples, the method comprises producing the treatment gas from a precursor at a rate of from 0.1 milligram (mg) of treatment gas per day per gram (g) of precursor initially present to 600 mg of gas/day/g of precursor initially present.

In some examples, the treatment zone has a humidity of from 20% to 100%, wherein the humidity is non-condensing.

In some examples, the method further comprises selecting the humidity of the treatment zone in view of the surface reactivity of the raw agricultural product. In some examples, when the raw agricultural product as a low surface reactivity, then the humidity of the treatment zone is from 60%-100%; when the raw agricultural product has a moderate surface reactivity, then the humidity of the treatment zone is from 40%-80%; and when the raw agricultural product has a high surface reactivity, then the humidity of the treatment zone is from 20%-60%; wherein the humidity is non-condensing.

In some examples, the reactor further comprises a bed comprising dry particles of a precursor and dry particles of a proton generating species and producing the treatment gas in the reactor comprises directing air through the bed. In some examples, the bed comprises a mixture of the dry particles of the precursor and the dry particles of the proton generating species. In some examples, the bed comprises a layered bed comprising alternating layers of a layer of the dry particles comprising the precursor and a layer of the dry particles comprising the proton generating species. In some examples, the total number of layers in the layered bed is 3 or more. In some examples, the method further comprises controlling or adjusting the rate at which the treatment gas is produced by controlling or adjusting: the presence or absence of air flowing though the bed, the amount of time the air flows through the bed, the amount of the dry particles comprising the precursor in the bed, the amount of the dry particles comprising the proton-generating species in the bed, the temperature, or a combination thereof.

In some examples, the air has a humidity of from 50% to 80%.

In some examples, the reactor further comprises dry particles of a precursor and dry particles of a proton generating species enclosed within an enclosing material and producing the treatment gas in the reactor comprises directing air through the reactor. In some examples, the enclosing material is substantially impervious to liquid water. In some examples, the enclosing material comprises membrane comprising a polyethylene or paper filter. In some examples, the enclosing material comprises TYVEK® and GORTEX®. In some examples, the enclosing material is a sachet comprising three layers of membrane material forming a two-compartment sachet to separate the dry particles of the proton-generating species from the dry particles of the precursor. In some examples, the method further comprises controlling or adjusting the rate at which the treatment gas is produced by controlling or adjusting: the presence or absence of air flowing though the reactor, the amount of time the air flows through the reactor, the amount of the dry particles comprising the precursor enclosed in the enclosing material, the amount of the dry particles comprising the proton-generating species enclosed within the enclosing material, the temperature, the humidity of the air flowing through the reactor, the type of enclosing material, the thickness of the enclosing material, or a combination thereof.

In some examples, the air has a humidity of from 50% to 80%.

In some examples, the reactor further comprises a mixer containing dry particles of a precursor and dry particles of a proton generating species and wherein producing the treatment gas in the reactor comprises dynamically mixing the dry particles of the precursor and the dry particles of the proton generating species in the mixer. In some examples, the method further comprises controlling or adjusting the rate at which the treatment gas is produced by controlling or adjusting: the amount of time the dry particles comprising the precursor and the dry particles comprising the proton-generating species are dynamically mixed, the rate at which the dry particles comprising the precursor and the dry particles comprising the proton-generating species are dynamically mixed, or a combination thereof.

In some examples, the mixer is selected from the group consisting of a tumbler, a vibratory mixer, a rotary mixer, a marinator mixer, and a stirrer. In some examples, the mixer is selected from the group consisting of a tumbler, a rotary mixer, a marinator mixer, and a stirrer and wherein the method comprises dynamically mixing the dry particles comprising the precursor and dry particles comprising the proton-generating species at a rate of from 1 revolution per day (RPD) to 100 revolutions per minute (RPM). In some examples, the mixer is a vibratory mixer and the method comprise dynamically mixing the dry particles comprising the precursor and dry particles comprising the proton-generating species at a rate of from 1 Hertz (Hz) to 20 kilohertz (kHz).

In some examples, the amount of time that the dry particles comprising the precursor and dry particles comprising the proton-generating species are dynamically mixed is from 1 minute to 24 hours.

In some examples, the method further comprises milling, crushing, abrading, or a combination thereof the dry particles comprising the precursor and dry particles comprising the proton-generating species.

In some examples, the mixer further contains an abrasive particle and producing the treatment gas in the reactor further comprises dynamically mixing the abrasive particle with the dry particles comprising the precursor and dry particles comprising the proton-generating species.

In some examples, the mixer further contains a deliquescent and producing the treatment gas in the reactor further comprises dynamically mixing the deliquescent with the dry particles comprising the precursor and dry particles comprising the proton-generating species.

In some examples, the mixer further contains a desiccant and producing the treatment gas in the reactor further comprises dynamically mixing the desiccant with the dry particles comprising the precursor and dry particles comprising the proton-generating species.

In some examples, the dry particles comprising the precursor comprise a chlorine dioxide precursor and the treatment gas comprises chlorine dioxide; the dry particles comprising the precursor comprise a carbon dioxide precursor and the treatment gas comprises carbon dioxide; or a combination thereof.

In some examples, the dry particles comprising the precursor further comprise a porous carrier selected from the group consisting of zeolite crystals, silica, pumice, diatomaceous earth, bentonite, and clay, and wherein the precursor is impregnated in the porous carrier.

In some examples, the dry particles comprising the precursor include from 1% to 30% by weight of the precursor.

In some examples, the dry particles comprising the precursor comprise a carbon dioxide precursor and the carbon dioxide precursor comprises a carbon-containing compound selected from the group consisting of carbonates, bicarbonates, sesquicarbonates, and combinations thereof. In some examples, the carbon-containing compound is selected from the group consisting of sodium carbonate, sodium bicarbonate, sodium sesquicarbonate, and combinations thereof.

In some examples, the dry particles comprising the precursor comprise a chlorine dioxide precursor and the chlorine dioxide precursor comprises a chlorine dioxide-producing compound selected from the group consisting of a metal chlorite, a metal chlorate, chloric acid, hypochlorous acid, and combinations thereof. In some examples, the metal chlorite comprises sodium chlorite, barium chlorite, calcium chlorite, lithium chlorite, potassium chlorite, magnesium chlorite, or combinations thereof; or wherein the metal chlorate comprises sodium chlorate, lithium chlorate, potassium chlorate, magnesium chlorate, barium chlorate, or combinations thereof. In some examples, the dry particles comprising the proton-generating species further comprise a porous carrier selected from the group consisting of zeolite crystals, silica, pumice, diatomaceous earth, bentonite, and clay, and wherein the proton-generating species is impregnated in the porous carrier.

In some examples, the dry particles comprising the proton-generating species include from 10% to 40% by weight of the proton-generating species. In some examples, the proton-generating species comprises an organic acid, an inorganic acid, a metal salt, or a combination thereof. In some examples, the proton-generating species comprises an organic acid and/or an inorganic acid selected from the group consisting of acetic acid, citric acid, hydrochloric acid, phosphoric acid, propionic acid, sulfuric acid, and combinations thereof. In some examples, the proton-generating species comprises a metal salt selected from the group consisting of ferric chloride, ferric sulfate, $CaCl_2$, $ZnSO_4$, $ZnCl_2$, $CoSO_4$, $CoCl_2$, $MnSO_4$, $MnCl_2$, $CuSO_4$, $CuCl_2$, $MgSO_4$, sodium acetate, sodium citrate, sodium sulfate, sodium bisulfate, hydrogen phosphate, disodium hydrogen phosphate, and combinations thereof.

In some examples, producing the treatment gas in the reactor comprises mixing a solution of a precursor and a solution of a proton generating species. In some examples, the precursor comprises a carbon dioxide precursor and the carbon dioxide precursor comprises a carbon-containing compound selected from the group consisting of carbonates, bicarbonates, sesquicarbonates, and combinations thereof. In some examples, the carbon-containing compound is selected from the group consisting of sodium carbonate, sodium bicarbonate, sodium sesquicarbonate, and combinations thereof. In some examples, the precursor comprises a chlorine dioxide precursor and the chlorine dioxide precursor comprises a chlorine dioxide-producing compound selected from the group consisting of a metal chlorite, a metal chlorate, chloric acid, hypochlorous acid, and combinations thereof. In some examples, the metal chlorite comprises sodium chlorite, barium chlorite, calcium chlorite, lithium chlorite, potassium chlorite, magnesium chlorite, or combinations thereof; or wherein the metal chlorate comprises sodium chlorate, lithium chlorate, potassium chlorate, magnesium chlorate, barium chlorate, or combinations thereof. In some examples, the proton-generating species comprises an organic acid, an inorganic acid, a metal salt, or a combination thereof. In some examples, the proton-generating species comprises an organic acid and/or an inorganic acid selected from the group consisting of acetic acid, citric acid, hydrochloric acid, phosphoric acid, propionic acid, sulfuric acid, and combinations thereof. In some examples, the proton-generating species comprises a metal salt selected from the group consisting of ferric chloride, ferric sulfate, $CaCl_2$, $ZnSO_4$, $ZnCl_2$, $CoSO_4$, $CoCl_2$, $MnSO_4$, $MnCl_2$, $CuSO_4$, $CuCl_2$, $MgSO_4$, sodium acetate, sodium citrate, sodium sulfate, sodium bisulfate, hydrogen phosphate, disodium hydrogen phosphate, and combinations thereof. In some examples, the treatment gas comprises chlorine dioxide and the chlorine dioxide gas is generated by mixing a sodium chlorite solution and hydrochloric acid solution.

In some examples, the method further comprises recycling the treatment gas from the treatment zone.

Additional advantages of the disclosed devices and methods will be set forth in part in the description which follows, and in part will be obvious from the description. The advantages of the disclosed devices and methods will be realized and attained by means of the elements and combinations particularly pointed out in the appended claims. It is to be understood that both the foregoing general description and the following detailed description are exemplary and explanatory only and are not restrictive of the disclosed devices and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The patent or application file contains at least one drawing executed in color. Copies of this patent or patent application publication with color drawing(s) will be provided by the Office upon request and payment of the necessary fee.

The accompanying figures, which are incorporated in and constitute a part of this specification, illustrate several aspects of the disclosure, and together with the description, serve to explain the principles of the disclosure.

DETAILED DESCRIPTION

Figure 1:
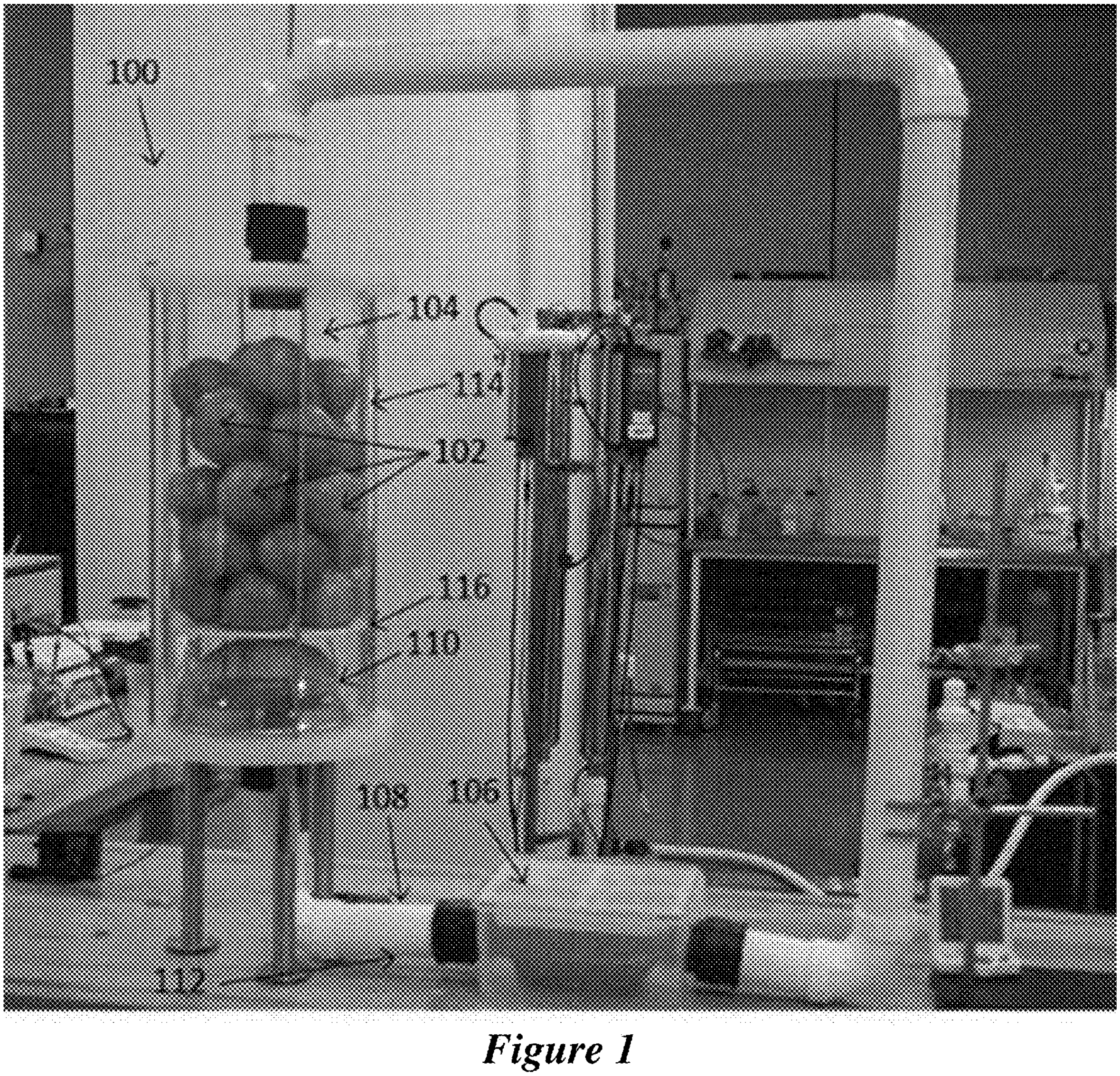
FIG. 1 is a photograph of an example device as disclosed herein according to one implementation.

The devices and methods described herein may be understood more readily by reference to the following detailed description of specific aspects of the disclosed subject matter and the examples included therein.

DEFINITIONS

Throughout the description and claims of this specification the word "comprise" and other forms of the word, such as "comprising" and "comprises," means "including but not limited to," and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

"Exemplary" means "an example of" and is not intended to convey an indication of a preferred or ideal embodiment. "Such as" is not used in a restrictive sense, but for explanatory purposes.

Values can be expressed herein as an "average" value. "Average" generally refers to the statistical mean value.

By "substantially" is meant within 5%, e.g., within 4%, 3%, 2%, or 1%.

It is understood that throughout this specification the identifiers "first" and "second" are used solely to aid the reader in distinguishing the various components, features, or steps of the disclosed subject matter. The identifiers "first" and "second" are not intended to imply any particular order, amount, preference, or importance to the components or steps modified by these terms.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, antimicrobials include, for example, antibacterials, antifungals, and antivirals. As used herein, "antimicrobial" refers to the ability to treat or control (e.g., reduce, prevent, treat, or eliminate) the growth of a microbe at any concentration. Similarly, the terms "antibacterial," "antifungal," and "antiviral" refer to the ability to treat or control the growth of bacteria, fungi, and viruses at any concentration, respectively.

The term "inhibit" refers to a decrease in an activity, response, condition, disease, or other biological parameter. This can include but is not limited to the complete ablation of the activity, response, condition, or disease. This can also include, for example, a 10% reduction in the activity, response, condition, or disease as compared to the native or control level. Thus, the reduction can be a 10, 20, 30, 40, 50, 60, 70, 80, 90, 100%, or any amount of reduction in between as compared to native or control levels.

As used herein, "reduce" or other forms of the word, such as "reducing" or "reduction," refers to lowering of an event or characteristic (e.g., microbe population/infection). It is understood that the reduction is typically in relation to some standard or expected value. For example, "reducing microbial infection" means reducing the spread of a microbial infection relative to a standard or a control.

As used herein, "prevent" or other forms of the word, such as "preventing" or "prevention," refers to stopping a particular event or characteristic, stabilizing or delaying the development or progression of a particular event or characteristic, or minimizing the chances that a particular event or characteristic will occur. "Prevent" does not require comparison to a control as it is typically more absolute than, for example, "reduce." As used herein, something could be reduced but not prevented, but something that is reduced could also be prevented. Likewise, something could be prevented but not reduced, but something that is prevented could also be reduced.

As used herein, "treat" or other forms of the word, such as "treated" or "treatment," refers to administration of a composition or performing a method in order to reduce, prevent, inhibit, or eliminate a particular characteristic or event (e.g., microbe growth, spoilage, rot, decay, etc.). The term "control" is used synonymously with the term "treat." The term "treating" as used herein includes, but is not limited to, "oxidizing," "sanitizing," "disinfecting" and "sterilizing."

"Food loss and waste" is defined as food intended for human consumption that is not ultimately consumed by humans. The terms "food loss and waste," "food waste," and "wasted food" are used interchangeably to describe food loss and waste herein. Generally, studies on food loss and waste define "food loss" as food that is not consumed due to unintentional limitations in production or supply. For example, food might be left unharvested or unutilized due to weather, low market demand, or failures in storage, transportation, or processing. The term "food waste" generally refers to food that is not consumed due to inefficiency or choice at the retail and consumption stage. In this report the term "consumption" (or the "consumption" stage of the food supply chain) is used to denote the receipt of food by consumers for use at home or away from home. This term is used regardless of whether the food is ultimately eaten (i.e., it is not used to mean the biological ingestion of food).

Devices and Methods

Disclosed herein are devices and methods for controlled delivery of a treatment gas to treat a raw agricultural product, for example by contacting the raw agricultural product with the treatment gas. The methods and devices as disclosed herein can, for example, inhibit growth of organisms such as bacteria, fungi, viruses, etc. on the raw agricultural product; inhibit spoilage, rot, and/or decay of the raw agricultural product; or a combination thereof. The methods can devices disclosed herein can, for example, extend the shelf life and/or safety of the raw agricultural product.

The methods and devices as disclosed herein can select and/or vary parameters (e.g., air flow, temperature, relative humidity, concentration of the treatment gas, etc.) in view of a variety of factors (such as the identity of the raw agricultural product, the surface reactivity of the raw agricultural product, the number and/or arrangement of the raw agricultural product, or a combination thereof) in order to achieve the desired level of treatment with the treatment gas.

Figure 2:
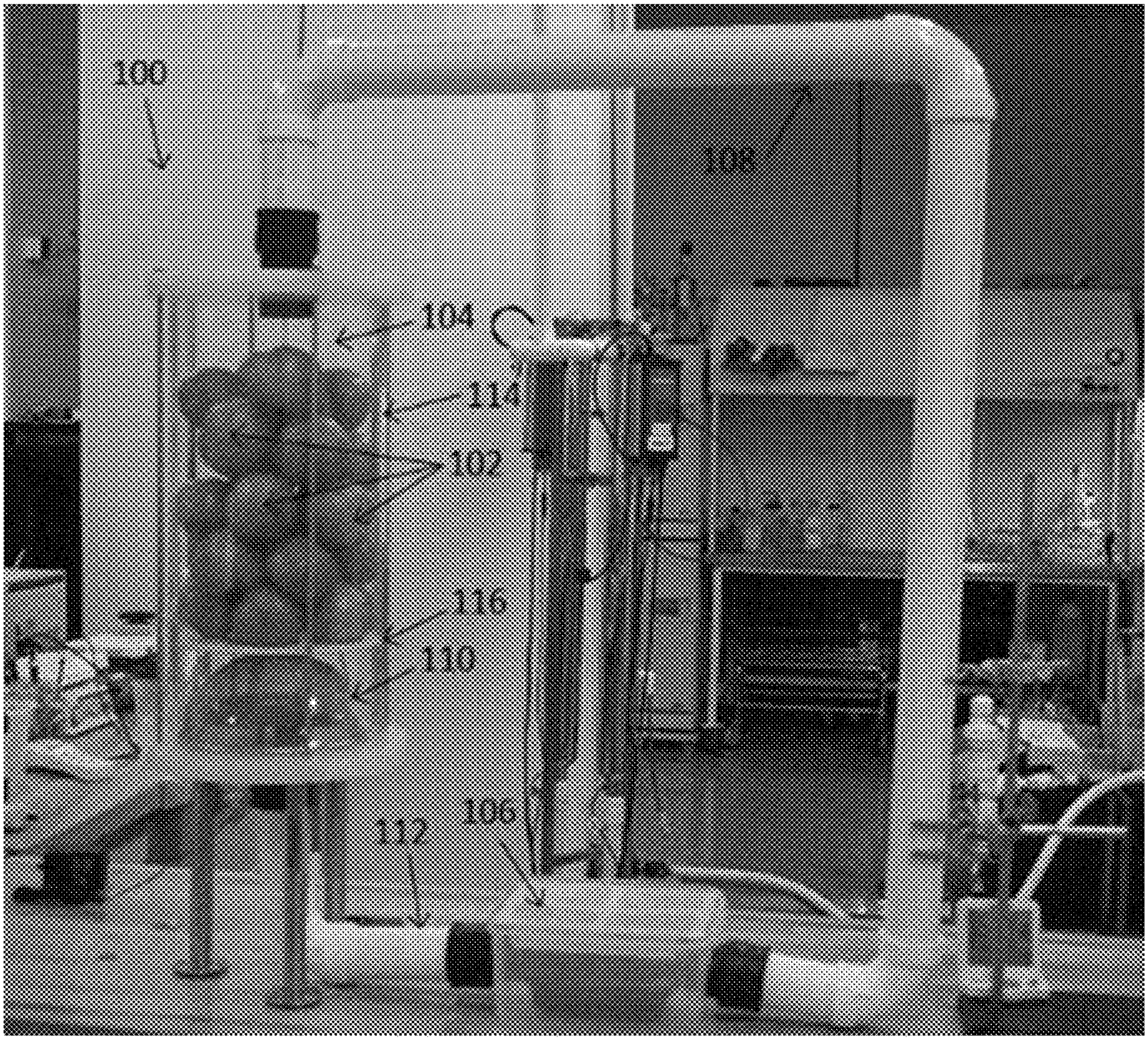
FIG. 2 is a photograph of an example device as disclosed herein according to one implementation.

Referring to the drawings and initially to FIG. 1 and FIG. 2, disclosed herein are devices 100 for controlled delivery of a treatment gas to treat a raw agricultural product 102 within a treatment zone 104 having a volume, the devices 100 comprising: a reactor 106 fluidly connected to the treatment zone 104; wherein the treatment gas is produced in the reactor 106 and the treatment zone 104 is configured to receive the treatment gas from the reactor 106 upon application of a pressure differential; wherein the raw agricultural product 102 is treated with the treatment gas in the treatment zone 104; wherein the raw agricultural product 102 has a surface and the surface has a reactivity with the treatment gas, the reactivity of the surface of the raw agricultural product 102 with the treatment gas being the surface reactivity; and wherein the device is configured to deliver a dose of the treatment gas at a relative velocity to the treatment zone 104.

The reactor 106 can, for example, include a composition configured to produce the treatment gas.

In some examples, the reactor 106 is fluidly connected to the treatment zone 104 via a first duct 108, the first duct 108 creating a path for fluid flow between the reactor 106 and the treatment zone 104. In some examples, the reactor 106, the treatment zone 104, the first duct 108, or a combination thereof further comprises a sealable port configured to fluidly isolate the reactor 106 from the treatment zone 104 upon sealing the sealable port.

In some examples, the device 100 can further comprise a motive source 110 fluidly connected to the reactor 106. In some examples, the pressure differential comprises a positive pressure differential and the motive source 110 can comprise a blower, a fan, a gas cylinder, a pump, or a combination thereof. In some examples, the pressure differential comprises a negative pressure differential and the motive source 110 comprises a vacuum source or a pump.

The motive source 110 is fluidly connected to the reactor 106 via a second duct 112, the second duct 112 creating a path for fluid flow between the reactor 106 and the motive source 110. In some examples, the reactor 106, the motive source 110, the second duct 112, or a combination thereof further comprises a sealable port configured to fluidly isolate the reactor 106 from the motive source 110 upon sealing the sealable port.

In some examples, the device 100 can further comprise a treatment chamber 114, wherein the treatment chamber 114 comprises an interior surface and the treatment zone 104 is at least partially enclosed by the interior surface of the treatment chamber 114. In some examples, the treatment zone 104 is fully enclosed by the interior surface of the treatment chamber 114.

In some examples, the treatment chamber 114 comprises an interior surface and at least a portion of the interior surface of the treatment chamber is perforated 116. In some examples, the treatment chamber 114 is configured to receive the treatment gas from the reactor 106 through the perforated portion of the interior surface such that the treatment gas diffuses into the treatment chamber via the perforated portion 116 of the interior surface. In some examples, the raw agricultural product is located on the perforated portion 116 of the interior surface of the treatment chamber 114.

Figure 3:
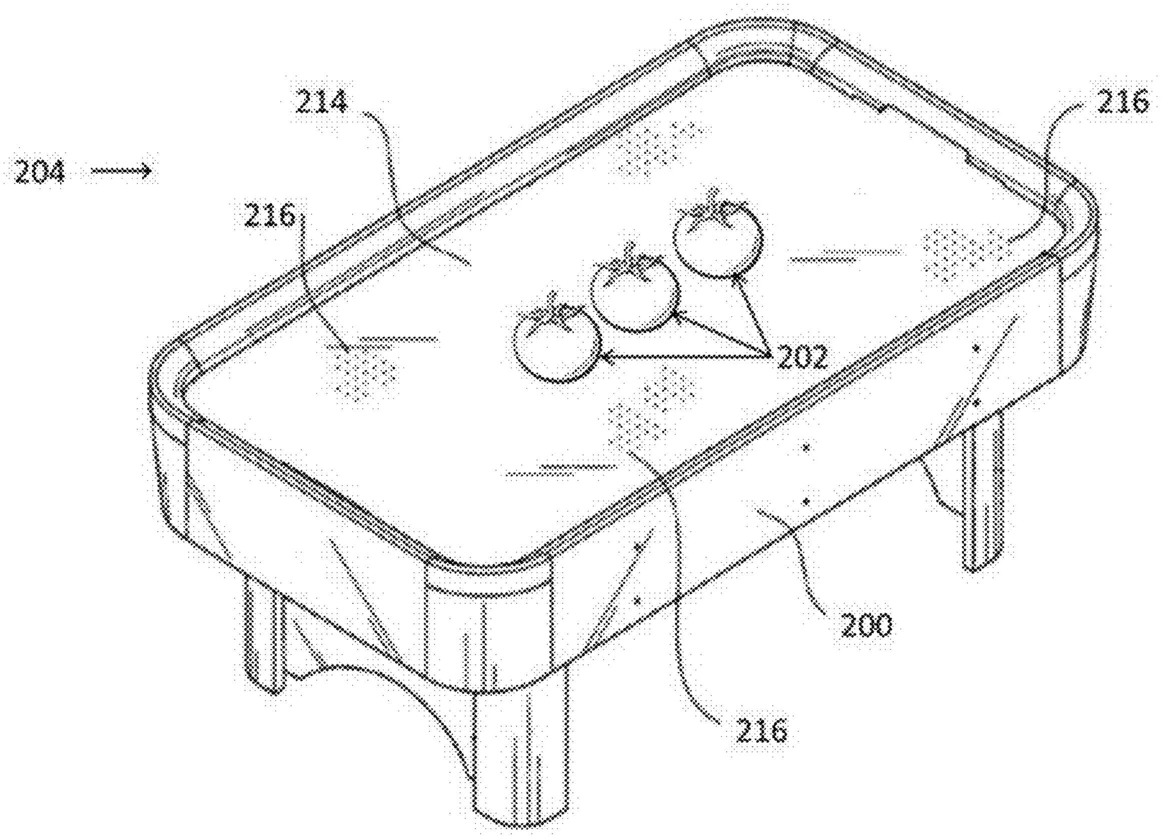
FIG. 3 is a perspective view of an example device as disclosed herein according to one implementation.
Figure 4:
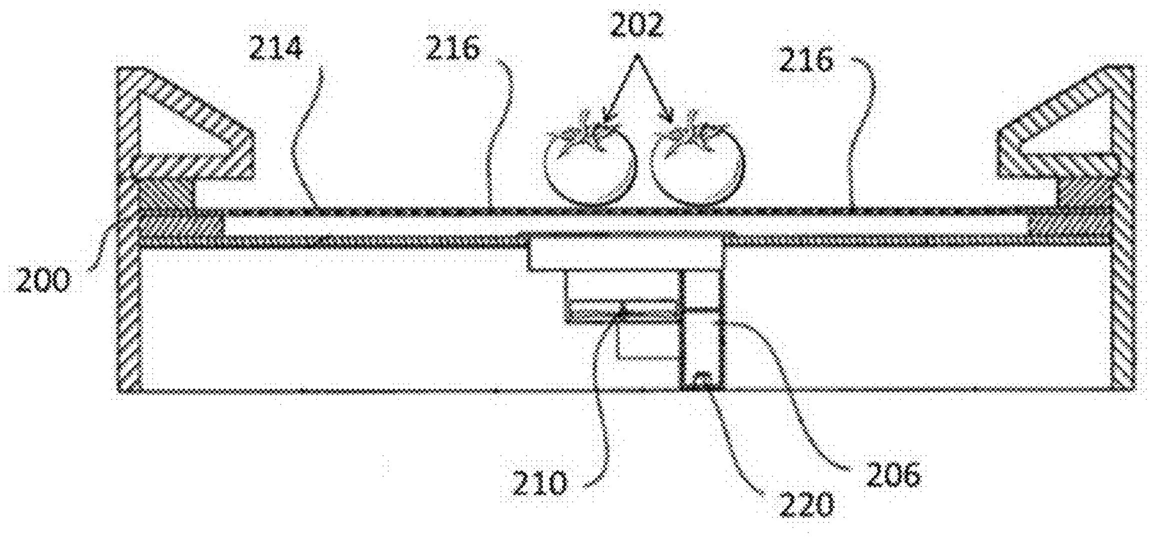
FIG. 4 is a cross-sectional view of the example device as shown in FIG. 3.
Figure 5:
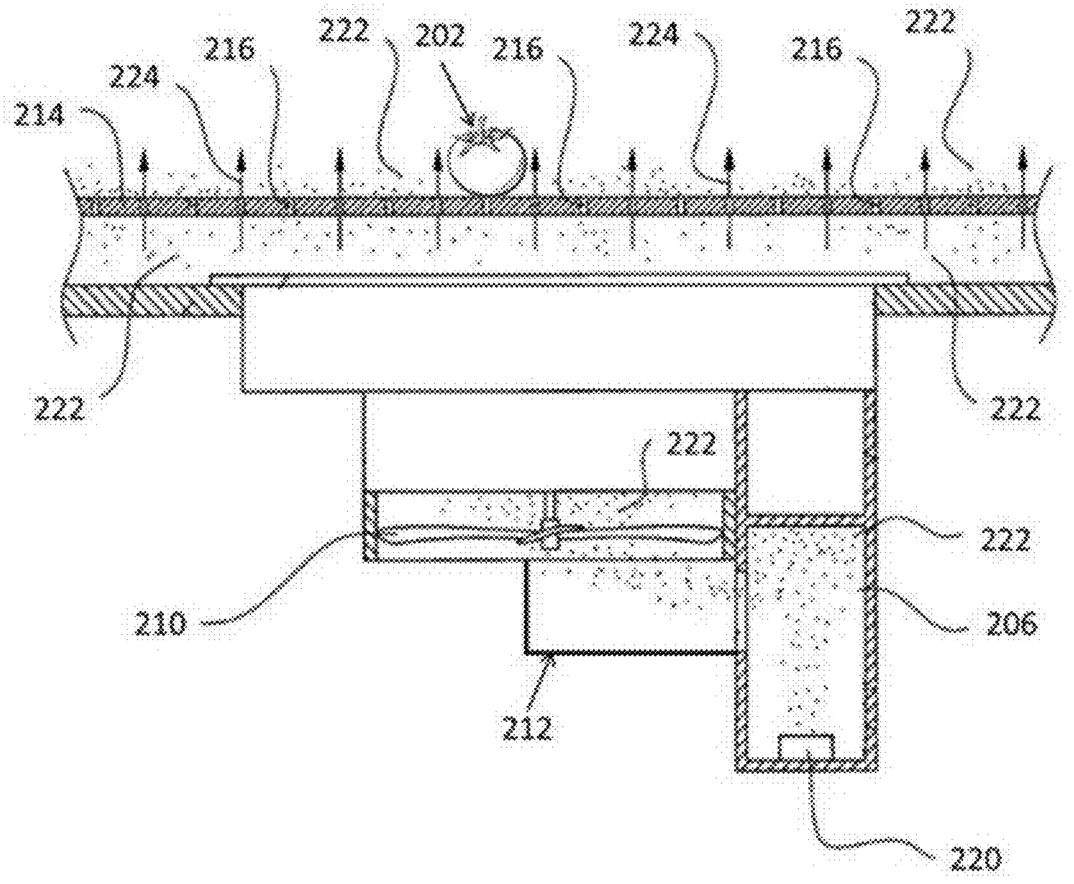
FIG. 5 is a locally enlarged operational view of the example device as shown in FIG. 3 and FIG. 4.

Referring now to FIG. 3-FIG. 5, also disclosed herein are devices 200 for controlled delivery of a treatment gas 222 to treat a raw agricultural product within a treatment zone 204 having a volume, the devices 200 comprising: a reactor 206 fluidly connected to the treatment zone 204; wherein the treatment gas 222 is produced in the reactor 206 and the treatment zone 204 is configured to receive the treatment gas 222 from the reactor 206 upon application of a pressure differential 224; wherein the raw agricultural product 202 is treated with the treatment gas 222 in the treatment zone 204; wherein the raw agricultural product 202 has a surface and the surface has a reactivity with the treatment gas 222, the reactivity of the surface of the raw agricultural product 202 with the treatment gas 222 being the surface reactivity; and wherein the device is configured to deliver a dose of the treatment gas 222 at a relative velocity to the treatment zone 204.

The reactor 206 can, for example, include a composition 220 configured to produce the treatment gas 222.

In some examples, the reactor 206 is fluidly connected to the treatment zone 204 via a first duct, the first duct creating a path for fluid flow between the reactor 206 and the treatment zone 204. In some examples, the reactor 206, the treatment zone 204, the first duct, or a combination thereof further comprises a sealable port configured to fluidly isolate the reactor 206 from the treatment zone 204 upon sealing the sealable port.

In some examples, the device 200 can further comprise a motive source 210 fluidly connected to the reactor 206. In some examples, the pressure differential comprises a positive pressure differential and the motive source 210 can comprise a blower, a fan, a gas cylinder, or a combination thereof.

The motive source 210 is fluidly connected to the reactor 206 via a second duct 212, the second duct 212 creating a path for fluid flow between the reactor 206 and the motive source 210. In some examples, the reactor, the motive source, the second duct, or a combination thereof further comprises a sealable port configured to fluidly isolate the reactor from the motive source upon sealing the sealable port.

In some examples, the device 200 can further comprise a treatment chamber 214, wherein the treatment chamber 214 comprises an interior surface and the treatment zone 204 is at least partially enclosed by the interior surface of the treatment chamber 214.

In some examples, the treatment chamber 214 comprises an interior surface and at least a portion of the interior surface of the treatment chamber is perforated, e.g., at least a portion of the treatment chamber 214 comprises a plurality of perforations 216. In some examples, the treatment chamber is configured to receive the treatment gas 222 from the reactor 206 through the perforated portion of the interior surface such that the treatment gas 222 diffuses into the treatment chamber via the plurality of perforations 216.

In some examples, the raw agricultural product 202 is located on the perforated portion of the interior surface of the treatment chamber.

In operation, referring to FIG. 5 with reference to FIG. 3 and FIG. 4, the motive source 210 creates a pressure differential 224 which propels the treatment gas 222 from the reactor 206 through the plurality of perforations 216 into the treatment zone 204, to thereby deliver a dose of the treatment gas 222 at a relative velocity to the treatment zone, such that the raw agricultural product 202 is treated with the treatment gas 222 in the treatment zone 204.

In any of the devices disclosed herein, the reactor, the treatment zone, the treatment chamber, the first duct, and/or the second duct can each independently have any shape, such as a polyhedron (e.g., a platonic solid, a prism, a pyramid), a cylinder, a hemicylinder, an elliptical cylinder, a hemi-elliptical cylinder, a sphere, a hemisphere, a cone, a semicone, etc. For example, the reactor, the treatment zone, the treatment chamber, the first duct, and/or the second duct can each independently have a regular shape, an irregular shape, an isotropic shape, an anisotropic shape, or a combination thereof.

In some examples, the treatment chamber can comprise a conduit having a lumen, wherein at least a portion of the treatment zone comprises at least a portion of the lumen, as shown in FIG. 1 and FIG. 2. In some examples, the treatment chamber can comprise a column or cylindrical chamber and the treatment zone can comprise a column or cylindrical shape, as shown in FIG. 1 and FIG. 2.

In some examples, the treatment chamber can comprise a table and the treatment zone can comprise a volume above said table, as shown in FIG. 3-FIG. 5.

In any of the devices disclosed herein, the reactor, the treatment chamber, the first duct, and/or the second duct can each independently comprise any suitable material, such as a rigid material or a flexible material. In some examples, the reactor, the treatment chamber, the first duct, and/or the second duct, or a combination thereof can each independently comprise an inert material, such as a polymer (e.g., polyethylene, polytetrafluoroethylene (PTFE), polycarbonate, PC-ABS, etc.) or a metal (e.g., stainless steel).

In some examples, the device can comprise a display case, such as a display case designed to optimize shelf life, quality, safety, and presentation of a perishable raw agricultural product. For example, the treatment chamber can comprise a display case, such as those known in the art for perishable raw agricultural products.

In some examples, the device can further comprise a hydrocooler, a liquid ice injector, a forced air cooler, a vacuum cooler, or a combination thereof, for example as a means for controlling and/or adjusting the temperature and/or the humidity of the treatment zone.

In some examples, the device can further comprise a means for forced air circulation, cooling, hydration, sanitation, or a combination thereof, for example to control and/or adjust one or more parameters, such as the temperature of the treatment zone, the dose of the treatment gas, the relative velocity of the treatment gas, the time that the raw agricultural product is contacted with the treatment gas, the humidity in the treatment zone, or a combination thereof.

In some examples, any of the devices disclosed herein can be configured to deliver a dose of the treatment gas at a relative velocity to the treatment zone, the dose being the initial concentration of the treatment gas adjacent the raw agricultural product in the treatment zone. The dose of the treatment gas and the relative velocity can, for example, be selected in view of the surface reactivity of the raw agricultural product to be treated, wherein the selected dose of the treatment gas and the relative velocity are sufficient to treat the raw agricultural product.

Also disclosed herein are methods of use of any of the device disclosed herein, for example to treat the raw agricultural product with the treatment gas.

Also disclosed herein are methods of treating a raw agricultural product with a treatment gas within a treatment zone, the method comprising: producing the treatment gas in a reactor, the reactor being fluidly connected to the treatment zone; and applying a pressure differential to direct the treatment gas from the reactor to the treatment zone; wherein the raw agricultural product is treated with the treatment gas in the treatment zone; wherein the raw agricultural product has a surface and the surface has a reactivity with the treatment gas, the reactivity of the surface of the raw agricultural product with the treatment gas being the surface reactivity. The methods further comprise delivering a dose of the treatment gas to the treatment zone at a relative velocity, the dose being the initial concentration of the treatment gas adjacent the raw agricultural product in the treatment zone. The methods further comprise selecting the dose of the treatment gas and the relative velocity in view of the surface reactivity of the raw agricultural product to be treated, wherein the selected dose of the treatment gas and the relative velocity are sufficient to treat the raw agricultural product.

In some examples, the methods can be carried out in whole or in part with any of the devices as disclosed herein. For example, the methods can comprise using any of the devices disclosed herein to treat the raw agricultural product with the treatment gas.

In any of the devices or methods disclosed herein, the dose of the treatment gas and the relative velocity are selected view of the surface reactivity of the raw agricultural product to be treated. The surface reactivity of the raw agricultural product is as defined in Table 1, where the crop groups listed in Table 1 include hemp as well as those codified in 40 CFR § 180.41. In general, the rougher and moister the surface of the raw agricultural product, the higher the surface reactivity (e.g., the most reactive surfaces are rough and moist, such as strawberries).

TABLE 1

Raw agricultural product surface reactivities based on crop groups.

| Crop Group or Subgroup* | | | Surface |
|---|---|---|---|
| Number | Description | Representative Commodities | reactivity |
| 1 | Root and tuber vegetables | Carrot, potato, radish, sugar beet | Low |
| 2 | Leaves of Root and Tuber Vegetables (Human Food or Animal Feed) | Turnip greens | High |
| 3 | Bulb Vegetables (*Allium* spp.) | Garlic, onion, shallot | Low |
| 4 | Leafy Vegetables (Except *Brassica* Vegetables) | Celery, head lettuce, leaf lettuce, spinach | High |

TABLE 1-continued

Raw agricultural product surface reactivities based on crop groups.

| Crop Group or Subgroup* | | | Surface |
|---|---|---|---|
| Number | Description | Representative Commodities | reactivity |
| 5A | *Brassica* leafy vegetables - Head and stem *Brassica* subgroup | Broccoli, cauliflower, brussels sprouts, cabbage | Moderate |
| 5B | *Brassica* leafy vegetables - Leafy *Brassica* subgroup | Collards, kale, mustard greens | High |
| 6A | Legume vegetables - Edible-podded legume vegetables subgroup | Runner bean, snow pea, sugar snap pea | Low |
| 6B | Legume vegetables - Succulent shelled pea and bean subgroup | Lima bean, black-eyed pea, green pea, pigeon pea | Low |
| 6C | Legume vegetables - Dried shelled pea and bean (except soybean) subgroup | Dried kidney bean, dried lentil | Low |
| 7 | Foliage of legume vegetables | Foliage of any cultivar of bean (*Phaseolus* spp.), field pea (*Pisum* spp.), and soybean | High |
| 8 | Fruiting vegetables | Tomato, bell pepper, eggplant, okra | Low |
| 9 | Cucurbit vegetables | Cantaloupe, Cucumber, muskmelon, pumpkin, summer squash, winter squash | High |
| 10 | Citrus Fruit | Orange, lemon, grapefruit | Moderate |
| 11 | Pome Fruits | Apple, Pear | Moderate |
| 12-12A | Stone Fruit - Cherry subgroup | Cherry (sweet or tart) | Low |
| 12-12B | Stone Fruit - Peach subgroup | Peach, nectarine | Moderate |
| 12-12C | Stone Fruit - Plum subgroup | Apricot, Plum | Low |
| 13A | Berries - Caneberry (blackberry and raspberry) subgroup | Blackberry, raspberry | High |
| 13B | Berries - bushberry subgroup | Blueberry, currant, elderberry | Low |
| 13-07A | Berries - caneberry subgroup | Blackberry, raspberry | High |
| 13-07B | Berries - bushberry subgroup | Blueberry, currant, elderberry | Low |
| 13-07C | Berries - large shrub/tree berry subgroup | Elderberry, mulberry | Low |
| 13-07E | Berries - small fruit vine climbing subgroup, except grape | Fuzzy kiwifruit | High |
| 13-07F | Berries - small fruit vine climbing subgroup, except fuzzy kiwifruit | Grape | Low |
| 13-07G | Berries - low growing berry subgroup | Strawberry | High |
| 13-07H | Berries - low growing berry subgroup, except strawberry | Cranberry | Low |
| 14 | Tree nuts | Almond, pecan | Moderate |
| 15 | Cereal Grains | Corn, rice, sorghum, wheat | Low |
| 16 | Forage, Fodder, and Straw of Cereal Grains | Forage, Fodder, and Straw of corn, wheat, etc. | Low |
| 17 | Grass forage, fodder, and hay | Bermuda grass, bluegrass, fescue | Moderate |
| 18 | Nongrass animal feeds (forage, fodder, straw, and hay) | Alfalfa, clover | Moderate |
| 20 | Oilseed | Rapeseed, sunflower seed, cottonseed | Low |
| 21 | Edible fungi | White button mushroom, oyster mushroom, shiitake mushroom | Moderate |
| 22 | Stalk, Stem, and Leaf Petiole Vegetable | Asparagus, celery | Moderate |
| 23A | Tropical and Subtropical Fruit, edible peel - small fruit | olive | Low |
| 23B | Tropical and Subtropical Fruit, edible peel - medium to large fruit | Fig, guava | Moderate |
| 23C | Tropical and Subtropical Fruit, edible peel - palm fruit | date | Moderate |
| 24A | Tropical and subtropical fruit, small fruit, inedible peel | lychee | Moderate |
| 24B | Tropical and subtropical fruit, medium to large fruit, smooth, inedible peel | Avocado, pomegranate, banana | Moderate |
| 24C | Tropical and subtropical fruit, medium to large fruit, rough or hairy, inedible peel | pineapple | Moderate |
| 24D | Tropical and subtropical fruit, cactus, inedible peel | Dragon fruit, prickly pear | Low |

TABLE 1-continued

Raw agricultural product surface reactivities based on crop groups.

| Crop Group or Subgroup* | | | Surface |
|---|---|---|---|
| Number | Description | Representative Commodities | reactivity |
| 24E | Tropical and subtropical fruit, vine, inedible peel | passionfruit | Low |
| 25A | Herb, fresh leaves | Basil (fresh leaves), mint (fresh leaves) | High |
| 25B | Herb, dried leaves | Basil (dried leaves), mint (dried leaves) | High |
| 26 | Spice | Dill seed, Celery Seed | Low |
| — | Hemp | Hemp | High |

*40 CFR § 180.41

Examples of raw agricultural products include, but are not limited to hemp, those described in 40 CFR § 180.41, and the representative commodities listed in Table 1. Examples of raw agricultural products include, but are not limited to, potatoes (e.g., Idaho baking potatoes, fingerling potatoes), onions, carrots, apples (e.g., Pink Lady apples, Fuji apples, Gala apples, Honeycrisp apples), strawberries, citrus fruits, jackfruits, starfruits, avocados, mangoes, and bananas.

The raw agricultural product can, for example, include a fruit, a vegetable, a grain, or a combination thereof. In some examples, the raw agricultural product comprises a potato, an onion, a carrot, or a combination thereof. In some examples, the raw agricultural product comprises an apple, a strawberry, or a combination thereof.

In some examples, the raw agricultural product comprises a single item that is the raw agricultural product. In some examples, the raw agricultural product comprises a plurality of items that are the raw agricultural products.

In some examples, the raw agricultural is further contained within a gas permeable container within the treatment zone. The gas permeable container can, for example, comprise a perforated plastic clamshell (e.g., such as those often used to contain berries), a perforated bag (e.g., such as those often used to contain grapes, apples, potatoes, and/or citrus fruits). In some examples, the gas permeable container can comprise a porous woven or nonwoven material. In some examples, the gas permeable container can comprise a polymer material such as polyethylene, polypropylene, polyester (e.g., polyethylene terephthalate (PET)), cellulose (e.g., paper), or a combination thereof.

In any of the devices or methods disclosed herein, the dose of the treatment gas and the relative velocity are selected view of the surface reactivity of the raw agricultural product to be treated. In general, the surface reactivity is directly related to the relative velocity needed and inversely related to the dose needed to sufficiently to treat the raw agricultural product. For example, the more reactive the surface of the raw agricultural product, the lower the dose and higher the relative velocity needed to sufficiently to treat the raw agricultural product.

For example: when the raw agricultural product has a low surface reactivity, then the dose can be from 1 to 1000 ppmv (parts per million of the treatment gas by volume of the treatment zone) and the relative velocity can be from 0.01 to 0.1 feet per minute; when the raw agricultural product has a moderate surface reactivity, then the dose can be from 0.1 to 100 ppmv and the relative velocity can be from 0.05 to 0.25 feet per minute; and when the raw agricultural product has a high surface reactivity, then the dose can be from 0.01 to 10 ppmv and the relative velocity can be from 0.05 to 0.5 feet per minute.

In some examples, when the raw agricultural product has a low surface reactivity, then the dose can be 1 ppmv (parts per million of the treatment gas by volume of the treatment zone) or more (e.g., 2 ppmv or more, 3 ppmv or more, 4 ppmv or more, 5 ppmv or more, 10 ppmv or more, 15 ppmv or more, 20 ppmv or more, 25 ppmv or more, 30 ppmv or more, 35 ppmv or more, 40 ppmv or more, 45 ppmv or more, 50 ppmv or more, 55 ppmv or more, 60 ppmv or more, 65 ppmv or more, 70 ppmv or more, 75 ppmv or more, 80 ppmv or more, 85 ppmv or more, 90 ppmv or more, 95 ppmv or more, 100 ppmv or more, 110 ppmv or more, 120 ppmv or more, 130 ppmv or more, 140 ppmv or more, 150 ppmv or more, 175 ppmv or more, 200 ppmv or more, 225 ppmv or more, 250 ppmv or more, 275 ppmv or more, 300 ppmv or more, 350 ppmv or more, 400 ppmv or more, 450 ppmv or more, 500 ppmv or more, 550 ppmv or more, 600 ppmv or more, 650 ppmv or more, 700 ppmv or more, 750 ppmv or more, 800 ppmv or more, 850 ppmv or more, or 900 ppmv or more). In some examples, when the raw agricultural product has a low surface reactivity, then the dose can be 1000 ppmv or less (e.g., 950 ppmv or less, 900 ppmv or less, 850 ppmv or less, 800 ppmv or less, 750 ppmv or less, 700 ppmv or less, 650 ppmv or less, 600 ppmv or less, 550 ppmv or less, 500 ppmv or less, 450 ppmv or less, 400 ppmv or less, 350 ppmv or less, 300 ppmv or less, 275 ppmv or less, 250 ppmv or less, 225 ppmv or less, 200 ppmv or less, 175 ppmv or less, 150 ppmv or less, 140 ppmv or less, 120 ppmv or less, 110 ppmv or less, 100 ppmv or less, 95 ppmv or less, 90 ppmv or less, 85 ppmv or less, 80 ppmv or less, 75 ppmv or less, 70 ppmv or less, 65 ppmv or less, 60 ppmv or less, 55 ppmv or less, 50 ppmv or less, 45 ppmv or less, 40 ppmv or less, 35 ppmv or less, 30 ppmv or less, 25 ppmv or less, 20 ppmv or less, 15 ppmv or less, 10 ppmv or less, or 5 ppmv or less). The dose, when the raw agricultural product has a low surface reactivity, can range from any of the minimum values described above to any of the maximum values described above. For example, when the raw agricultural product has a low surface reactivity, then the dose can be from 1 to 1000 ppmv (e.g., from 1 ppmv to 500 ppmv, from 500 ppmv to 1000 ppmv, from 1 ppmv to 200 ppmv, from 200 ppmv to 400 ppmv, from 400 ppmv to 600 ppmv, from 600 ppmv to 800 ppmv, from 800 ppmv to 1000 ppmv, from 1 ppmv to 900 ppmv, from 1 ppmv to 800 ppmv, from 1 ppmv to 700 ppmv, from 1 ppmv to 600 ppmv, from 1 ppmv to 400 ppmv, from 10 ppmv to 1000 ppmv, from 100 ppmv to 1000 ppmv, from 200 ppmv to 1000 ppmv, from 300 ppmv to 1000 ppmv, from 400 ppmv to 1000 ppmv, from 600 to 1000 ppmv, from 5 ppmv to 1000 ppmv, from 1 ppmv to 950 ppmv, from 5 ppmv to 950 ppmv, from 10 ppmv to 900 ppmv, from 100 ppmv to 800 ppmv, or from 200 ppmv to 600 ppmv).

In some examples, when the raw agricultural product has a moderate surface reactivity, then the dose can be 0.1 ppmv or more (e.g., 0.2 ppmv or more, 0.3 ppmv or more, 0.4 ppmv or more, 0.5 ppmv or more, 0.6 ppmv or more, 0.7 ppmv or more, 0.8 ppmv or more, 0.9 ppmv or more, 1 ppmv or more, 1.25 ppmv or more, 1.5 ppmv or more, 1.75 ppmv or more, 2 ppmv or more, 2.25 ppmv or more, 2.5 ppmv or more, 3 ppmv or more, 3.5 ppmv or more, 4 ppmv or more, 4.5 ppmv or more, 5 ppmv or more, 6 ppmv or more, 7 ppmv or more, 8 ppmv or more, 9 ppmv or more, 10 ppmv or more, 15 ppmv or more, 20 ppmv or more, 25 ppmv or more, 30 ppmv or more, 35 ppmv or more, 40 ppmv or more, 45 ppmv or more, 50 ppmv or more, 55 ppmv or more, 60 ppmv or more, 65 ppmv or more, 70 ppmv or more, 75 ppmv or more, 80 ppmv or more, 85 ppmv or more, or 90 ppmv or more). In some examples, when the raw agricultural product has a moderate surface reactivity, then the dose can be 100 ppmv or less (e.g., 95 ppmv or less, 90 ppmv or less, 85 ppmv or less, 80 ppmv or less, 75 ppmv or less, 70 ppmv or less, 65 ppmv or less, 60 ppmv or less, 55 ppmv or less, 50 ppmv or less, 45 ppmv or less, 40 ppmv or less, 35 ppmv or less, 30 ppmv or less, 25 ppmv or less, 20 ppmv or less, 15 ppmv or less, 10 ppmv or less, 9 ppmv or less, 8 ppmv or less, 7 ppmv or less, 6 ppmv or less, 5 ppmv or less, 4.5 ppmv or less, 4 ppmv or less, 3.5 ppmv or less, 3 ppmv or less, 2.5 ppmv or less, 2.25 ppmv or less, 2 ppmv or less, 1.75 ppmv or less, 1.5 ppmv or less, 1.25 ppmv or less, 1 ppmv or less, 0.9 ppmv or less, 0.8 ppmv or less, 0.7 ppmv or less, 0.6 ppmv or less, or 0.5 ppmv or less). The dose, when the raw agricultural product has a moderate surface reactivity, can range from any of the minimum values described above to any of the maximum values described above. For example, when the raw agricultural product has a moderate surface reactivity, then the dose can be from 0.1 to 100 ppmv (e.g., from 0.1 ppmv to 50 ppmv, from 50 ppmv to 100 ppmv, from 0.1 ppmv to 20 ppmv, from 20 ppmv to 40 ppmv, from 40 ppmv to 60 ppmv, from 60 ppmv to 80 ppmv, from 80 ppmv to 100 ppmv, from 0.1 ppmv to 90 ppmv, from 0.1 ppmv to 80 ppmv, from 0.1 ppmv to 70 ppmv, from 0.1 ppmv to 60 ppmv, from 0.1 ppmv to 40 ppmv, from 1 ppmv to 100 ppmv, from 5 ppmv to 100 ppmv, from 10 ppmv to 100 ppmv, from 20 ppmv to 100 ppmv, from 30 ppmv to 100 ppmv, from 40 ppmv to 100 ppmv, from 60 ppmv to 100 ppmv, from 0.1 ppmv to 95 ppmv, from 1 ppmv to 100 ppmv, from 1 ppmv to 95 ppmv, from 5 ppmv to 90 ppmv, from 10 ppmv to 80 ppmv, from 15 ppmv to 70 ppmv, or from 20 ppmv to 60 ppmv).

In some examples, when the raw agricultural product has a high surface reactivity, then the dose can be 0.01 ppmv or more (e.g., 0.02 ppmv or more, 0.03 ppmv or more, 0.04 ppmv or more, 0.05 ppmv or more, 0.06 ppmv or more, 0.07 ppmv or more, 0.08 ppmv or more, 0.09 ppmv or more, 0.1 ppmv or more, 0.15 ppmv or more, 0.2 ppmv or more, 0.25 ppmv or more, 0.3 ppmv or more, 0.35 ppmv or more, 0.4 ppmv or more, 0.45 ppmv or more, 0.5 ppmv or more, 0.6 ppmv or more, 0.7 ppmv or more, 0.8 ppmv or more, 0.9 ppmv or more, 1 ppmv or more, 1.25 ppmv or more, 1.5 ppmv or more, 1.75 ppmv or more, 2 ppmv or more, 2.25 ppmv or more, 2.5 ppmv or more, 3 ppmv or more, 3.5 ppmv or more, 4 ppmv or more, 4.5 ppmv or more, 5 ppmv or more, 5.5 ppmv or more, 6 ppmv or more, 6.5 ppmv or more, 7 ppmv or more, 7.5 ppmv or more, 8 ppmv or more, 8.5 ppmv or more, or 9 ppmv or more). In some examples, when the raw agricultural product has a high surface reactivity, then the dose can be 10 ppmv or less (e.g., 9 ppmv or less, 8.5 ppmv or less, 8 ppmv or less, 7.5 ppmv or less, 7 ppmv or less, 6.5 ppmv or less, 6 ppmv or less, 5.5 ppmv or less, 5 ppmv or less, 4.5 ppmv or less, 4 ppmv or less, 3.5 ppmv or less, 3 ppmv or less, 2.5 ppmv or less, 2.25 ppmv or less, 2 ppmv or less, 1.75 ppmv or less, 1.5 ppmv or less, 1.25 ppmv or less, 1 ppmv or less, 0.9 ppmv or less, 0.8 ppmv or less, 0.7 ppmv or less, 0.6 ppmv or less, 0.5 ppmv or less, 0.45 ppmv or less, 0.4 ppmv or less, 0.35 ppmv or less, 0.3 ppmv or less, 0.25 ppmv or less, 0.2 ppmv or less, 0.15 ppmv or less, 0.1 ppmv or less, 0.09 ppmv or less, 0.08 ppmv or less, 0.07 ppmv or less, 0.06 ppmv or less, or 0.05 ppmv or less). The dose, when the raw agricultural product has a high surface reactivity, can range from any of the minimum values described above to any of the maximum values described above. For example, when the raw agricultural product has a high surface reactivity, then the dose can be from 0.01 to 10 ppmv (e.g., from 0.01 ppmv to 5 ppmv, from 5 ppmv to 10 ppmv, from 0.01 ppmv to 2 ppmv, from 2 ppmv to 4 ppmv, from 4 ppmv to 6 ppmv, from 6 ppmv to 8 ppmv, from 8 ppmv to 10 ppmv, from 0.01 ppmv to 9 ppmv, from 0.01 ppmv to 8 ppmv, from 0.01 ppmv to 7 ppmv, from 0.01 ppmv to 6 ppmv, from 0.01 ppmv to 4 ppmv, from 0.1 ppmv to 10 ppmv, from 0.5 ppmv to 10 ppmv, from 1 ppmv to 10 ppmv, from 2 ppmv to 10 ppmv, from 3 ppmv to 10 ppmv, from 4 ppmv to 10 ppmv, from 6 ppmv to 10 ppmv, from 0.01 ppmv to 9.5 ppmv, from 0.1 ppmv to 10 ppmv, from 0.1 ppmv to 9.5 ppmv, from 0.5 ppmv to 9 ppmv, from 1 ppmv to 8 ppmv, from 1.5 ppmv to 7 ppmv, or from 2 ppmv to 6 ppmv).

In some examples, when the raw agricultural product has a low surface reactivity, then the relative velocity can be 0.01 feet per minute or more (e.g., 0.02 feet per minute or more, 0.03 feet per minute or more, 0.04 feet per minute or more, 0.05 feet per minute or more, 0.06 feet per minute or more, 0.07 feet per minute or more, 0.08 feet per minute or more, or 0.09 feet per minute or more). In some examples, when the raw agricultural product has a low surface reactivity, then the relative velocity can be 0.1 feet per minute or less (e.g., 0.09 feet per minute or less, 0.08 feet per minute or less, 0.07 feet per minute or less, 0.06 feet per minute or less, 0.05 feet per minute or less, 0.04 feet per minute or less, 0.03 feet per minute or less, or 0.02 feet per minute or less). The relative velocity, when the raw agricultural product has a low surface reactivity, can range from any of the minimum values described above to any of the maximum values described above. For example, when the raw agricultural product has a low surface reactivity, then the relative velocity can be from 0.01 to 0.1 feet per minute (e.g., from 0.01 to 0.05 feet per minute, from 0.05 to 0.1 feet per minute, from 0.01 to 0.02 feet per minute, from 0.02 to 0.04 feet per minute, from 0.04 to 0.06 feet per minute, from 0.06 to 0.08 feet per minute, from 0.08 to 0.1 feet per minute, from 0.01 to 0.09 feet per minute, from 0.01 to 0.08 feet per minute, from 0.01 to 0.07 feet per minute, from 0.01 to 0.06 feet per minute, from 0.01 to 0.04 feet per minute, from 0.02 to 0.1 feet per minute, from 0.03 to 0.1 feet per minute, from 0.04 to 0.1 feet per minute, from 0.06 to 0.1 feet per minute, from 0.02 to 0.09 feet per minute, from 0.03 to 0.08 feet per minute, or from 0.04 to 0.07 feet per minute).

In some examples, when the raw agricultural product has a moderate surface reactivity, then the relative velocity can be 0.05 feet per minute or more (e.g., 0.06 feet per minute or more, 0.07 feet per minute or more, 0.08 feet per minute or more, 0.09 feet per minute or more, 0.1 feet per minute or more, 0.11 feet per minute or more, 0.12 feet per minute or more, 0.13 feet per minute or more, 0.14 feet per minute or more, 0.15 feet per minute or more, 0.16 feet per minute or more, 0.17 feet per minute or more, 0.18 feet per minute or more, 0.19 feet per minute or more, 0.20 feet per minute or more, 0.21 feet per minute or more, 0.22 feet per minute or more, or 0.23 feet per minute or more). In some examples, when the raw agricultural product has a moderate surface reactivity, then the relative velocity can be 0.25 feet per minute or less (e.g., 0.24 feet per minute or less, 0.23 feet per minute or less, 0.22 feet per minute or less, 0.21 feet per minute or less, 0.20 feet per minute or less, 0.19 feet per minute or less, 0.18 feet per minute or less, 0.17 feet per minute or less, 0.16 feet per minute or less, 0.15 feet per minute or less, 0.14 feet per minute or less, 0.13 feet per minute or less, 0.12 feet per minute or less, 0.11 feet per minute or less, 0.1 feet per minute or less, 0.09 feet per minute or less, 0.08 feet per minute or less, or 0.07 feet per minute or less). The relative velocity, when the raw agricultural product has a moderate surface reactivity, can range from any of the minimum values described above to any of the maximum values described above. For example, when the raw agricultural product has a moderate surface reactivity, then the relative velocity can be from 0.05 to 0.25 feet per minute (e.g., 0.05 to 0.15 feet per minute, from 0.15 to 0.25 feet per minute, from 0.05 to 0.1 feet per minute, from 0.1 to 0.15 feet per minute, from 0.15 to 0.2 feet per minute, from 0.2 to 0.25 feet per minute, from 0.05 to 0.24 feet per minute, from 0.05 to 0.23 feet per minute, from 0.05 to 0.22 feet per minute, from 0.05 to 0.21 feet per minute, from 0.05 to 0.19 feet per minute, from 0.05 to 0.18 feet per minute, from 0.06 to 0.25 feet per minute, from 0.07 to 0.25 feet per minute, from 0.08 to 0.25 feet per minute, from 0.09 to 0.25 feet per minute, from 0.11 to 0.25 feet per minute, from 0.12 to 0.25 feet per minute, from 0.06 to 0.24 feet per minute, from 0.07 to 0.23 feet per minute, from 0.08 to 0.22 feet per minute, from 0.09 to 0.21 feet per minute, or from 0.1 to 0.2 feet per minute).

In some examples, when the raw agricultural product has a high surface reactivity, then the relative velocity can be 0.05 feet per minute or more (e.g., 0.06 feet per minute or more, 0.07 feet per minute or more, 0.08 feet per minute or more, 0.09 feet per minute or more, 0.1 feet per minute or more, 0.11 feet per minute or more, 0.12 feet per minute or more, 0.13 feet per minute or more, 0.14 feet per minute or more, 0.15 feet per minute or more, 0.16 feet per minute or more, 0.17 feet per minute or more, 0.18 feet per minute or more, 0.19 feet per minute or more, 0.20 feet per minute or more, 0.21 feet per minute or more, 0.22 feet per minute or more, 0.23 feet per minute or more, 0.24 feet per minute or more, 0.25 feet per minute or more, 0.3 feet per minute or more, 0.35 feet per minute or more, or 0.4 feet per minute or more). In some examples, when the raw agricultural product has a high surface reactivity, then the relative velocity can be 0.5 feet per minute or less (e.g., 0.45 feet per minute or less, 0.4 feet per minute or less, 0.35 feet per minute or less, 0.3 feet per minute or less, 0.25 feet per minute or less, 0.24 feet per minute or less, 0.23 feet per minute or less, 0.22 feet per minute or less, 0.21 feet per minute or less, 0.20 feet per minute or less, 0.19 feet per minute or less, 0.18 feet per minute or less, 0.17 feet per minute or less, 0.16 feet per minute or less, 0.15 feet per minute or less, 0.14 feet per minute or less, 0.13 feet per minute or less, 0.12 feet per minute or less, 0.11 feet per minute or less, 0.1 feet per minute or less, 0.09 feet per minute or less, 0.08 feet per minute or less, or 0.07 feet per minute or less). The relative velocity, when the raw agricultural product has a high surface reactivity, can range from any of the minimum values described above to any of the maximum values described above. For example, when the raw agricultural product has a high surface reactivity, then the relative velocity can be from 0.05 to 0.5 feet per minute (e.g., from 0.05 to 0.25 feet per minute, from 0.25 to 0.5 feet per minute, from 0.05 to 0.1 feet per minute, from 0.1 to 0.15 feet per minute, from 0.15 to 0.2 feet per minute, from 0.2 to 0.25 feet per minute, from 0.25 to 0.3 feet per minute, from 0.3 to 0.35 feet per minute, from 0.35 to 0.4 feet per minute, from 0.4 to 0.45 feet per minute, from 0.45 to 0.5 feet per minute, from 0.05 to 0.45 feet per minute, from 0.05 to 0.4 feet per minute, from 0.05 to 0.35 feet per minute, from 0.05 to 0.3 feet per minute, from 0.05 to 0.2 feet per minute, from 0.06 to 0.5 feet per minute, from 0.07 to 0.5 feet per minute, from 0.08, to 0.5 feet per minute, from 0.09 to 0.5 feet per minute, from 0.1 to 0.5 feet per minute, from 0.15 to 0.5 feet per minute, from 0.2 to 0.5 feet per minute, from 0.3 to 0.5 feet per minute, from 0.06 to 0.45 feet per minute, from 0.7 to 0.4 feet per minute, from 0.8 to 0.35 feet per minute, or from 0.1 to 0.25 feet per minute).

In some examples, when the raw agricultural product has a low surface reactivity, then the dose can be 1 ppmv (parts per million of the treatment gas by volume of the treatment zone) or more (e.g., 2 ppmv or more, 3 ppmv or more, 4 ppmv or more, 5 ppmv or more, 10 ppmv or more, 15 ppmv or more, 20 ppmv or more, 25 ppmv or more, 30 ppmv or more, 35 ppmv or more, 40 ppmv or more, 45 ppmv or more, 50 ppmv or more, 55 ppmv or more, 60 ppmv or more, 65 ppmv or more, 70 ppmv or more, 75 ppmv or more, 80 ppmv or more, 85 ppmv or more, 90 ppmv or more, 95 ppmv or more, 100 ppmv or more, 110 ppmv or more, 120 ppmv or more, 130 ppmv or more, 140 ppmv or more, 150 ppmv or more, 175 ppmv or more, 200 ppmv or more, 225 ppmv or more, 250 ppmv or more, 275 ppmv or more, 300 ppmv or more, 350 ppmv or more, 400 ppmv or more, 450 ppmv or more, 500 ppmv or more, 550 ppmv or more, 600 ppmv or more, 650 ppmv or more, 700 ppmv or more, 750 ppmv or more, 800 ppmv or more, 850 ppmv or more, or 900 ppmv or more) and the relative velocity can be 0.01 feet per minute or more (e.g., 0.02 feet per minute or more, 0.03 feet per minute or more, 0.04 feet per minute or more, 0.05 feet per minute or more, 0.06 feet per minute or more, 0.07 feet per minute or more, 0.08 feet per minute or more, or 0.09 feet per minute or more).

In some examples, when the raw agricultural product has a low surface reactivity, then the dose can be 1000 ppmv or less (e.g., 950 ppmv or less, 900 ppmv or less, 850 ppmv or less, 800 ppmv or less, 750 ppmv or less, 700 ppmv or less, 650 ppmv or less, 600 ppmv or less, 550 ppmv or less, 500 ppmv or less, 450 ppmv or less, 400 ppmv or less, 350 ppmv or less, 300 ppmv or less, 275 ppmv or less, 250 ppmv or less, 225 ppmv or less, 200 ppmv or less, 175 ppmv or less, 150 ppmv or less, 140 ppmv or less, 120 ppmv or less, 110 ppmv or less, 100 ppmv or less, 95 ppmv or less, 90 ppmv or less, 85 ppmv or less, 80 ppmv or less, 75 ppmv or less, 70 ppmv or less, 65 ppmv or less, 60 ppmv or less, 55 ppmv or less, 50 ppmv or less, 45 ppmv or less, 40 ppmv or less, 35 ppmv or less, 30 ppmv or less, 25 ppmv or less, 20 ppmv or less, 15 ppmv or less, 10 ppmv or less, or 5 ppmv or less) and the relative velocity can be 0.1 feet per minute or less (e.g., 0.09 feet per minute or less, 0.08 feet per minute or less, 0.07 feet per minute or less, 0.06 feet per minute or less, 0.05 feet per minute or less, 0.04 feet per minute or less, 0.03 feet per minute or less, or 0.02 feet per minute or less).

When the raw agricultural product has a low surface reactivity, the dose and the relative velocity can independently range from any of the minimum values described above to any of the maximum values described above. For example, when the raw agricultural product has a low surface reactivity, then the dose can be from 1 to 1000 ppmv (e.g., from 1 ppmv to 500 ppmv, from 500 ppmv to 1000 ppmv, from 1 ppmv to 200 ppmv, from 200 ppmv to 400 ppmv, from 400 ppmv to 600 ppmv, from 600 ppmv to 800 ppmv, from 800 ppmv to 1000 ppmv, from 1 ppmv to 900 ppmv, from 1 ppmv to 800 ppmv, from 1 ppmv to 700 ppmv, from 1 ppmv to 600 ppmv, from 1 ppmv to 400 ppmv, from 10 ppmv to 1000 ppmv, from 100 ppmv to 1000 ppmv, from 200 ppmv to 1000 ppmv, from 300 ppmv to 1000 ppmv, from 400 ppmv to 1000 ppmv, from 600 to 1000 ppmv, from 5 ppmv to 1000 ppmv, from 1 ppmv to 950 ppmv, from 5 ppmv to 950 ppmv, from 10 ppmv to 900 ppmv, from 100 ppmv to 800 ppmv, or from 200 ppmv to 600 ppmv) and the relative velocity can be from 0.01 to 0.1 feet per minute (e.g., from 0.01 to 0.05 feet per minute, from 0.05 to 0.1 feet per minute, from 0.01 to 0.02 feet per minute, from 0.02 to 0.04 feet per minute, from 0.04 to 0.06 feet per minute, from 0.06 to 0.08 feet per minute, from 0.08 to 0.1 feet per minute, from 0.01 to 0.09 feet per minute, from 0.01 to 0.08 feet per minute, from 0.01 to 0.07 feet per minute, from 0.01 to 0.06 feet per minute, from 0.01 to 0.04 feet per minute, from 0.02 to 0.1 feet per minute, from 0.03 to 0.1 feet per minute, from 0.04 to 0.1 feet per minute, from 0.06 to 0.1 feet per minute, from 0.02 to 0.09 feet per minute, from 0.03 to 0.08 feet per minute, or from 0.04 to 0.07 feet per minute).

In some examples, when the raw agricultural product has a moderate surface reactivity, then the dose can be 0.1 ppmv or more (e.g., 0.2 ppmv or more, 0.3 ppmv or more, 0.4 ppmv or more, 0.5 ppmv or more, 0.6 ppmv or more, 0.7 ppmv or more, 0.8 ppmv or more, 0.9 ppmv or more, 1 ppmv or more, 1.25 ppmv or more, 1.5 ppmv or more, 1.75 ppmv or more, 2 ppmv or more, 2.25 ppmv or more, 2.5 ppmv or more, 3 ppmv or more, 3.5 ppmv or more, 4 ppmv or more, 4.5 ppmv or more, 5 ppmv or more, 6 ppmv or more, 7 ppmv or more, 8 ppmv or more, 9 ppmv or more, 10 ppmv or more, 15 ppmv or more, 20 ppmv or more, 25 ppmv or more, 30 ppmv or more, 35 ppmv or more, 40 ppmv or more, 45 ppmv or more, 50 ppmv or more, 55 ppmv or more, 60 ppmv or more, 65 ppmv or more, 70 ppmv or more, 75 ppmv or more, 80 ppmv or more, 85 ppmv or more, or 90 ppmv or more) and the relative velocity can be 0.05 feet per minute or more (e.g., 0.06 feet per minute or more, 0.07 feet per minute or more, 0.08 feet per minute or more, 0.09 feet per minute or more, 0.1 feet per minute or more, 0.11 feet per minute or more, 0.12 feet per minute or more, 0.13 feet per minute or more, 0.14 feet per minute or more, 0.15 feet per minute or more, 0.16 feet per minute or more, 0.17 feet per minute or more, 0.18 feet per minute or more, 0.19 feet per minute or more, 0.20 feet per minute or more, 0.21 feet per minute or more, 0.22 feet per minute or more, or 0.23 feet per minute or more). In some examples, when the raw agricultural product has a moderate surface reactivity, then the dose can be 100 ppmv or less (e.g., 95 ppmv or less, 90 ppmv or less, 85 ppmv or less, 80 ppmv or less, 75 ppmv or less, 70 ppmv or less, 65 ppmv or less, 60 ppmv or less, 55 ppmv or less, 50 ppmv or less, 45 ppmv or less, 40 ppmv or less, 35 ppmv or less, 30 ppmv or less, 25 ppmv or less, 20 ppmv or less, 15 ppmv or less, 10 ppmv or less, 9 ppmv or less, 8 ppmv or less, 7 ppmv or less, 6 ppmv or less, 5 ppmv or less, 4.5 ppmv or less, 4 ppmv or less, 3.5 ppmv or less, 3 ppmv or less, 2.5 ppmv or less, 2.25 ppmv or less, 2 ppmv or less, 1.75 ppmv or less, 1.5 ppmv or less, 1.25 ppmv or less, 1 ppmv or less, 0.9 ppmv or less, 0.8 ppmv or less, 0.7 ppmv or less, 0.6 ppmv or less, or 0.5 ppmv or less) and the relative velocity can be 0.25 feet per minute or less (e.g., 0.24 feet per minute or less, 0.23 feet per minute or less, 0.22 feet per minute or less, 0.21 feet per minute or less, 0.20 feet per minute or less, 0.19 feet per minute or less, 0.18 feet per minute or less, 0.17 feet per minute or less, 0.16 feet per minute or less, 0.15 feet per minute or less, 0.14 feet per minute or less, 0.13 feet per minute or less, 0.12 feet per minute or less, 0.11 feet per minute or less, 0.1 feet per minute or less, 0.09 feet per minute or less, 0.08 feet per minute or less, or 0.07 feet per minute or less). When the raw agricultural product has a moderate surface reactivity, the dose and the relative velocity can independently range from any of the minimum values described above to any of the maximum values described above. For example, when the raw agricultural product has a moderate surface reactivity, then the dose can be from 0.1 to 100 ppmv (e.g., from 0.1 ppmv to 50 ppmv, from 50 ppmv to 100 ppmv, from 0.1 ppmv to 20 ppmv, from 20 ppmv to 40 ppmv, from 40 ppmv to 60 ppmv, from 60 ppmv to 80 ppmv, from 80 ppmv to 100 ppmv, from 0.1 ppmv to 90 ppmv, from 0.1 ppmv to 80 ppmv, from 0.1 ppmv to 70 ppmv, from 0.1 ppmv to 60 ppmv, from 0.1 ppmv to 40 ppmv, from 1 ppmv to 100 ppmv, from 5 ppmv to 100 ppmv, from 10 ppmv to 100 ppmv, from 20 ppmv to 100 ppmv, from 30 ppmv to 100 ppmv, from 40 ppmv to 100 ppmv, from 60 ppmv to 100 ppmv, from 0.1 ppmv to 95 ppmv, from 1 ppmv to 100 ppmv, from 1 ppmv to 95 ppmv, from 5 ppmv to 90 ppmv, from 10 ppmv to 80 ppmv, from 15 ppmv to 70 ppmv, or from 20 ppmv to 60 ppmv) and the relative velocity can be from 0.05 to 0.25 feet per minute (e.g., 0.05 to 0.15 feet per minute, from 0.15 to 0.25 feet per minute, from 0.05 to 0.1 feet per minute, from 0.1 to 0.15 feet per minute, from 0.15 to 0.2 feet per minute, from 0.2 to 0.25 feet per minute, from 0.05 to 0.24 feet per minute, from 0.05 to 0.23 feet per minute, from 0.05 to 0.22 feet per minute, from 0.05 to 0.21 feet per minute, from 0.05 to 0.19 feet per minute, from 0.05 to 0.18 feet per minute, from 0.06 to 0.25 feet per minute, from 0.07 to 0.25 feet per minute, from 0.08 to 0.25 feet per minute, from 0.09 to 0.25 feet per minute, from 0.11 to 0.25 feet per minute, from 0.12 to 0.25 feet per minute, from 0.06 to 0.24 feet per minute, from 0.07 to 0.23 feet per minute, from 0.08 to 0.22 feet per minute, from 0.09 to 0.21 feet per minute, or from 0.1 to 0.2 feet per minute).

In some examples, when the raw agricultural product has a high surface reactivity, then the dose can be 0.01 ppmv or more (e.g., 0.02 ppmv or more, 0.03 ppmv or more, 0.04 ppmv or more, 0.05 ppmv or more, 0.06 ppmv or more, 0.07 ppmv or more, 0.08 ppmv or more, 0.09 ppmv or more, 0.1 ppmv or more, 0.15 ppmv or more, 0.2 ppmv or more, 0.25 ppmv or more, 0.3 ppmv or more, 0.35 ppmv or more, 0.4 ppmv or more, 0.45 ppmv or more, 0.5 ppmv or more, 0.6 ppmv or more, 0.7 ppmv or more, 0.8 ppmv or more, 0.9 ppmv or more, 1 ppmv or more, 1.25 ppmv or more, 1.5 ppmv or more, 1.75 ppmv or more, 2 ppmv or more, 2.25 ppmv or more, 2.5 ppmv or more, 3 ppmv or more, 3.5 ppmv or more, 4 ppmv or more, 4.5 ppmv or more, 5 ppmv or more, 5.5 ppmv or more, 6 ppmv or more, 6.5 ppmv or more, 7 ppmv or more, 7.5 ppmv or more, 8 ppmv or more, 8.5 ppmv or more, or 9 ppmv or more) and the relative velocity can be 0.05 feet per minute or more (e.g., 0.06 feet per minute or more, 0.07 feet per minute or more, 0.08 feet per minute or more, 0.09 feet per minute or more, 0.1 feet per minute or more, 0.11 feet per minute or more, 0.12 feet per minute or more, 0.13 feet per minute or more, 0.14 feet per minute or more, 0.15 feet per minute or more, 0.16 feet per minute or more, 0.17 feet per minute or more, 0.18 feet per minute or more, 0.19 feet per minute or more, 0.20 feet per minute or more, 0.21 feet per minute or more, 0.22 feet per minute or more, 0.23 feet per minute or more, 0.24 feet per minute or more, 0.25 feet per minute or more, 0.3 feet per minute or more, 0.35 feet per minute or more, or 0.4 feet per minute or more).

In some examples, when the raw agricultural product has a high surface reactivity, then the dose can be 10 ppmv or less (e.g., 9 ppmv or less, 8.5 ppmv or less, 8 ppmv or less, 7.5 ppmv or less, 7 ppmv or less, 6.5 ppmv or less, 6 ppmv or less, 5.5 ppmv or less, 5 ppmv or less, 4.5 ppmv or less, 4 ppmv or less, 3.5 ppmv or less, 3 ppmv or less, 2.5 ppmv or less, 2.25 ppmv or less, 2 ppmv or less, 1.75 ppmv or less, 1.5 ppmv or less, 1.25 ppmv or less, 1 ppmv or less, 0.9 ppmv or less, 0.8 ppmv or less, 0.7 ppmv or less, 0.6 ppmv or less, 0.5 ppmv or less, 0.45 ppmv or less, 0.4 ppmv or less, 0.35 ppmv or less, 0.3 ppmv or less, 0.25 ppmv or less, 0.2 ppmv or less, 0.15 ppmv or less, 0.1 ppmv or less, 0.09 ppmv or less, 0.08 ppmv or less, 0.07 ppmv or less, 0.06 ppmv or less, or 0.05 ppmv or less) and the relative velocity can be 0.5 feet per minute or less (e.g., 0.45 feet per minute or less, 0.4 feet per minute or less, 0.35 feet per minute or less, 0.3 feet per minute or less, 0.25 feet per minute or less, 0.24 feet per minute or less, 0.23 feet per minute or less, 0.22 feet per minute or less, 0.21 feet per minute or less, 0.20 feet per minute or less, 0.19 feet per minute or less, 0.18 feet per minute or less, 0.17 feet per minute or less, 0.16 feet per minute or less, 0.15 feet per minute or less, 0.14 feet per minute or less, 0.13 feet per minute or less, 0.12 feet per minute or less, 0.11 feet per minute or less, 0.1 feet per minute or less, 0.09 feet per minute or less, 0.08 feet per minute or less, or 0.07 feet per minute or less).

When the raw agricultural product has a high surface reactivity, the dose and the relative velocity can independently range from any of the minimum values described above to any of the maximum values described above. For example, when the raw agricultural product has a high surface reactivity, then the dose can be from 0.01 to 10 ppmv (e.g., from 0.01 ppmv to 5 ppmv, from 5 ppmv to 10 ppmv, from 0.01 ppmv to 2 ppmv, from 2 ppmv to 4 ppmv, from 4 ppmv to 6 ppmv, from 6 ppmv to 8 ppmv, from 8 ppmv to 10 ppmv, from 0.01 ppmv to 9 ppmv, from 0.01 ppmv to 8 ppmv, from 0.01 ppmv to 7 ppmv, from 0.01 ppmv to 6 ppmv, from 0.01 ppmv to 4 ppmv, from 0.1 ppmv to 10 ppmv, from 0.5 ppmv to 10 ppmv, from 1 ppmv to 10 ppmv, from 2 ppmv to 10 ppmv, from 3 ppmv to 10 ppmv, from 4 ppmv to 10 ppmv, from 6 ppmv to 10 ppmv, from 0.01 ppmv to 9.5 ppmv, from 0.1 ppmv to 10 ppmv, from 0.1 ppmv to 9.5 ppmv, from 0.5 ppmv to 9 ppmv, from 1 ppmv to 8 ppmv, from 1.5 ppmv to 7 ppmv, or from 2 ppmv to 6 ppmv) and the relative velocity can be from 0.05 to 0.5 feet per minute (e.g., from 0.05 to 0.25 feet per minute, from 0.25 to 0.5 feet per minute, from 0.05 to 0.1 feet per minute, from 0.1 to 0.15 feet per minute, from 0.15 to 0.2 feet per minute, from 0.2 to 0.25 feet per minute, from 0.25 to 0.3 feet per minute, from 0.3 to 0.35 feet per minute, from 0.35 to 0.4 feet per minute, from 0.4 to 0.45 feet per minute, from 0.45 to 0.5 feet per minute, from 0.05 to 0.45 feet per minute, from 0.05 to 0.4 feet per minute, from 0.05 to 0.35 feet per minute, from 0.05 to 0.3 feet per minute, from 0.05 to 0.2 feet per minute, from 0.06 to 0.5 feet per minute, from 0.07 to 0.5 feet per minute, from 0.08, to 0.5 feet per minute, from 0.09 to 0.5 feet per minute, from 0.1 to 0.5 feet per minute, from 0.15 to 0.5 feet per minute, from 0.2 to 0.5 feet per minute, from 0.3 to 0.5 feet per minute, from 0.06 to 0.45 feet per minute, from 0.7 to 0.4 feet per minute, from 0.8 to 0.35 feet per minute, or from 0.1 to 0.25 feet per minute).

In some examples, the treatment zone can have a temperature of 0 °C or more (e.g., 5 °C or more, 10 °C or more, 15 °C or more, 20 °C or more, 25 °C or more, or 30 °C or more). In some examples, the temperature of the treatment zone can be 32 °C or less (e.g., 30 °C or less, 25 °C or less, 20 °C or less, 15 °C or less, 10 °C or less, or 5 °C or less). The temperature of the treatment zone can range from any of the minimum values described above to any of the maximum values described above. For example, the temperature of the treatment zone can be from 0 °C to 32 °C (e.g., from 0 °C to 15 °C, from 15 °C to 32 °C, from 0 °C to 5 °C, from 5 °C to 10 °C, from 10 °C to 20 °C, from 20 °C to 32 °C, from 5 °C to 32 °C, from 0 °C to 30 °C, or from 5 °C to 30 °C).

The device can, in some examples, be configured to select or control the temperature of the treatment zone. For example, the device can further comprise a means for selecting or controlling the temperature of the treatment zone, such as a hydrocooler, a liquid ice injector, a forced air cooler, a vacuum cooler, or a combination thereof. In some examples, the methods can further comprise selecting or controlling the temperature of the treatment zone. The temperature of the treatment zone can be selected in view of a variety of features, for example, the identity and/or surface reactivity of the raw agricultural product, the dose of the treatment gas, the relative velocity of the treatment gas, the time that the raw agricultural product is contacted with the treatment gas, the humidity in the treatment zone, or a combination thereof.

In some examples, the treatment zone can have a humidity of 20% or more, wherein the humidity is non-condensing (e.g., 25% or more, 30% or more, 35% or more, 40% or more, 45% or more, 50% or more, 60% or more, 70% or more, 80% or more, or 90% or more). In some examples, the treatment zone can have a humidity of 100% or less, wherein the humidity is non-condensing (e.g., 95% or less, 90% or less, 85% or less, 80% or less, 75% or less, 70% or less, 60% or less, 50% or less, 40% or less, or 30% or less). The amount of humidity in the treatment zone can range from any of the minimum values described above to any of the maximum values described above. For example, the treatment zone can have a humidity of from 20% to 100%, wherein the humidity is non-condensing (e.g., from 20% to 60%, from 60% to 100%, from 20% to 40%, from 40% to 60%, from 60% to 80%, from 80% to 100%, or from 50% to 80%).

The device can, in some examples, be configured to select or control the humidity of the treatment zone. For example, the device can further comprise a means for selecting or controlling the humidity of the treatment zone. In some examples, the methods can further comprise selecting or controlling the humidity of the treatment zone. The humidity of the treatment zone can be selected in view of a variety of features, for example, the identity and/or surface reactivity of the raw agricultural product, the dose of the treatment gas, the relative velocity of the treatment gas, the time that the raw agricultural product is contacted with the treatment gas, the temperature in the treatment zone, or a combination thereof.

In some examples, the humidity of the treatment zone is selected in view of the surface reactivity of the raw agricultural product. For example, the selected humidity can be inversely related to the surface reactivity. For example, the more reactive the surface of the raw agricultural product, the lower the selected humidity of the treatment zone. In some examples, when the raw agricultural product as a low surface reactivity, then the humidity is from 60%-100%; when the raw agricultural product has a moderate surface reactivity, then the humidity is from 40%-80%; and when the raw agricultural product has a high surface reactivity, then the humidity is from 20%-60%; wherein the humidity is non-condensing.

In some examples, when the raw agricultural product as a low surface reactivity, then the humidity of the treatment zone is 60% or more, wherein the humidity is non-condensing (e.g., 65% or more, 70% or more, 75% or more, 80% or more, 85% or more, or 90% or more). In some examples, when the raw agricultural product as a low surface reactivity, then the humidity of the treatment zone is 100% or less, wherein the humidity is non-condensing (e.g., 95% or less, 90% or less, 85% or less, 80% or less, or 75% or less). When the raw agricultural product as a low surface reactivity, then the humidity of the treatment zone can range from any of the minimum values described above to any of the maximum values described above, wherein the humidity is non-condensing. For example, when the raw agricultural product as a low surface reactivity, then the humidity of the treatment zone can be from 60%-100%, wherein the humidity is non-condensing (e.g., from 60% to 80%, from 80% to 100%, from 60% to 70%, from 70% to 80%, from 80% to 90%, from 90% to 100%, from 60% to 95%, from 60% to 90%, from 60% to 85%, from 60% to 75%, from 65% to 100%, from 70% to 100%, from 85% to 100%, from 65% to 95%, from 70% to 90%, or from 75% to 85%).

In some examples, when the raw agricultural product has a moderate surface reactivity, then the humidity of the treatment zone is 40% or more, wherein the humidity is non-condensing (e.g., 45% or more, 50% or more, 55% or more, 60% or more, 65% or more, or 70% or more). In some examples, when the raw agricultural product has a moderate surface reactivity, then the humidity of the treatment zone is 80% or less, wherein the humidity is non-condensing (e.g., 75% or less, 70% or less, 65% or less, 60% or less, 55% or less, or 50% or less). When the raw agricultural product has a moderate surface reactivity, then the humidity of the treatment zone can range from any of the minimum values described above to any of the maximum values described above, wherein the humidity is non-condensing. For example, when the raw agricultural product has a moderate surface reactivity, then the humidity of the treatment zone is from 40% to 80%, wherein the humidity is non-condensing (e.g., from 40% to 60%, from 60% to 80%, from 40% to 50%, from 50% to 60%, from 60% to 70%, from 70% to 80%, from 40% to 75%, from 40% to 70%, from 40% to 55%, from 45% to 80%, from 50% to 80%, from 55% to 80%, from 65% to 80%, from 45% to 75%, from 50% to 70%, or from 55% to 65%).

In some examples, when the raw agricultural product has a high surface reactivity, then the humidity of the treatment zone is 20% or more, wherein the humidity is non-condensing (e.g., 25% or more, 30% or more, 35% or more, 40% or more, 45% or more, or 50% or more). In some examples, when the raw agricultural product has a high surface reactivity, then the humidity of the treatment zone is 60% or less, wherein the humidity is non-condensing (e.g., 55% or less, 50% or less, 45% or less, 40% or less, 35% or less, or 30% or less). When the raw agricultural product has a high surface reactivity, then the humidity of the treatment zone can range from any of the minimum values described above to any of the maximum values described above, wherein the humidity is non-condensing. For example, when the raw agricultural product has a high surface reactivity, then the humidity of the treatment zone is from 20%-60%, wherein the humidity is non-condensing (e.g., from 20% to 40%, from 40% to 60%, from 20% to 30%, from 30% to 40%, from 40% to 50%, from 50% to 60%, from 20% to 55%, from 20% to 50%, from 20% to 45%, from 20% to 35%, from 25% to 60%, from 30% to 60%, from 35% to 60%, from 45% to 60%, from 25% to 55%, from 30% to 50%, or from 35% to 45%).

In some examples, the raw agricultural product is contacted with the treatment gas within the treatment zone for an amount of time of 5 minutes or more (e.g., 10 minutes or more, 15 minutes or more, 20 minutes or more, 25 minutes or more, 30 minutes or more, 35 minutes or more, 40 minutes or more, 45 minutes or more, 50 minutes or more, 55 minutes or more, 1 hour or more, 1.25 hours or more, 1.5 hours or more, 1.75 hours or more, 2 hours or more, 2.25 hours or more, 2.5 hours or more, 3 hours or more, 3.5 hours or more, 4 hours or more, 4.5 hours or more, 5 hours or more, 5.5 hours or more, 6 hours or more, 7 hours or more, 8 hours or more, 9 hours or more, 10 hours or more, 11 hours or more, 12 hours or more, 14 hours or more, 16 hours or more, 18 hours or more, 20 hours or more, 22 hours or more, 24 hours or more, 26 hours or more, 28 hours or more, 30 hours or more, 32 hours or more, 34 hours or more, 36 hours or more, 38 hours or more, 40 hours or more, 42 hours or more, or 44 hours or more). In some examples, the raw agricultural product is contacted with the treatment gas within the treatment zone for an amount of time of 48 hours or less (e.g., 46 hours or less, 44 hours or less, 42 hours or less, 40 hours or less, 38 hours or less, 36 hours or less, 34 hours or less, 32 hours or less, 30 hours or less, 28 hours or less, 26 hours or less, 24 hours or less, 22 hours or less, 20 hours or less, 18 hours or less, 16 hours or less, 14 hours or less, 12 hours or less, 11 hours or less, 10 hours or less, 9 hours or less, 8 hours or less, 7 hours or less, 6 hours or less, 5.5 hours or less, 5 hours or less, 4.5 hours or less, 4 hours or less, 3.5 hours or less, 3 hours or less, 2.5 hours or less, 2.25 hours or less, 2 hours or less, 1.75 hours or less, 1.5 hours or less, 1.25 hours or less, 1 hour or less, 55 minutes or less, 50 minutes or less, 45 minutes or less, 40 minutes or less, 35 minutes or less, 30 minutes or less, 25 minutes or less, 20 minutes or less, 15 minutes or less, or 10 minutes or less). The amount of time that the raw agricultural product is contacted with the treatment gas within the treatment zone can range from any of the minimum values discussed above to any of the maximum values discussed above. For example, the raw agricultural product is contacted with the treatment gas within the treatment zone for an amount of time of from 5 minutes to 48 hours (e.g., from 5 minutes to 24 hours, from 24 hours to 48 hours, from 5 minutes to 1 hour, from 1 hour to 6 hours, from 6 hours to 12 hours, from 12 hours to 24 hours, from 24 hours to 36 hours, from 36 hours to 48 hours, from 5 minutes to 42 hours, from 5 minutes to 36 hours, from 5 minutes to 30 hours, from 5 minutes to 18 hours, from 5 minutes to 12 hours, from 10 minutes to 48 hours, from 15 minutes to 48 hours, from 30 minutes to 48 hours, from 1 hour to 48 hours, from 2 hours to 48 hours, from 6 hours to 48 hours, from 12 hours to 48 hours, from 18 hours to 48 hours, from 10 minutes to 42 hours, from 15 minutes to 36 hours, from 30 minutes to 30 hours, or from 1 hour to 24 hours).

The device can, for example, the configured to such that the raw agricultural product is contacted with the treatment gas within the treatment zone for the desired amount of time. For example, the device can further comprise a means for selecting or controlling the amount of time that the raw agricultural product is contacted with the treatment gas within the treatment zone. In some examples, the methods can further comprise selecting or controlling the amount of time that raw agricultural product is contacted with the treatment gas within the treatment zone.

The amount of time that the raw agricultural product is contacted with the treatment gas in the treatment zone can be selected in view of a variety of features, for example, the identity and/or surface reactivity of the raw agricultural product, the dose of the treatment gas, the relative velocity of the treatment gas, the temperature in the treatment zone, the humidity of the treatment zone, or a combination thereof.

In some examples, the treatment gas can comprise chlorine dioxide, carbon dioxide, or a combination thereof.

The treatment gas can be produced in the reactor using any means or method known in the art. In some examples, the devices can further comprise a composition disposed within the reactor, the composition being configured to produce the treatment gas. In some examples, the methods can further comprise producing the treatment gas from a composition disposed within the reactor. In some examples, the methods can further comprise disposing the composition within the reactor.

In some examples, the treatment gas can be produced a precursor. The precursor can be provided in any form that allows the precursor to react with protons (e.g., from a proton-generating species) to produce the treatment gas.

In some embodiments, the precursor can, for example, comprise a chlorine dioxide precursor and the treatment gas can comprise chlorine dioxide; the precursor can comprise a carbon dioxide precursor and the treatment gas can comprise carbon dioxide; or a combination thereof.

The chlorine dioxide precursor can be selected from any composition capable of producing chlorine dioxide gas. The chlorine dioxide precursor can, for example, comprise a chlorine dioxide-producing compound selected from the group consisting of a metal chlorite, a metal chlorate, chloric acid, hypochlorous acid, and combinations thereof. Examples of metal chlorites include, but are not limited to, sodium chlorite, barium chlorite, calcium chlorite, lithium chlorite, potassium chlorite, magnesium chlorite, and combinations thereof. Examples of metal chlorates include, but are not limited to, sodium chlorate, lithium chlorate, potassium chlorate, magnesium chlorate, barium chlorate, and combinations thereof. In some examples, the chlorine dioxide precursor is impregnated in a porous carrier such as zeolite crystals as described above and as described in U.S. Pat. Nos. 5,567,405; 5,573,743; 5,730,948; 5,776,850; 5,853,689; 5,885,543; 6,174,508; 6,379,643; 6,423,289; 7,347,994; 7,922,992; and 9,382,116, which are incorporated by reference in their entirety.

The carbon dioxide precursor can be selected from any composition capable of producing carbon dioxide gas. The carbon dioxide precursor can, for example, comprise a carbon-containing compound selected from the group consisting of carbonates, bicarbonates, sesquicarbonates, and combinations thereof. Examples of carbon-containing compounds include, but are not limited to, sodium carbonate, sodium bicarbonate, sodium sesquicarbonate, and combinations thereof. In some examples, the carbon dioxide precursor is impregnated in a porous carrier such as zeolite crystals as described above and as described in U.S. Pat. Nos. 7,992,992 and 8,709,396, which are hereby incorporated herein by reference in their entirety.

In some examples, the treatment gas is produced by contacting the precursor with a proton generating species. A proton-generating species as disclosed herein can be any composition capable of generating protons to react with the precursor to generate the treatment gas. The proton-generating species can be provided in any form that allows the release of protons.

The proton-generating species can, for example, comprise an organic acid, an inorganic acid, a metal salt, or a combination thereof. In some examples, the organic acid and/or an inorganic acid can be selected from the group consisting of acetic acid, citric acid, hydrochloric acid, phosphoric acid, propionic acid, sulfuric acid, and combinations thereof. Examples of metal salts include, but are not limited to, ferric chloride, ferric sulfate, $CaCl_2$, $ZnSO_4$, $ZnCl_2$, $CoSO_4$, $CoCl_2$, $MnSO_4$, $MnCl_2$, $CuSO_4$, $CuCl_2$, $MgSO_4$, sodium acetate, sodium citrate, sodium sulfate, sodium bisulfate, hydrogen phosphate, disodium hydrogen phosphate, and combinations thereof. In some examples, the proton-generating species can comprise a volatile acid. In some examples, the proton-generating species is a metal salt that can also act as a water-retaining substance (e.g., $CaCl_2$, $MgSO_4$). In some examples, the proton-generating species can be part of the porous carrier.

In some examples, the proton-generating species is activated to produce protons by contacting the proton-generating species with a moisture-containing (or water-containing) fluid.

In some embodiments, the metal salt is ferric chloride, ferric sulfate, or a mixture thereof, and these iron salts can absorb water in addition to functioning as a proton-generating species. In some embodiments, the moisture-containing fluid is liquid water or an aqueous solution. In some embodiments, the moisture-containing fluid is a moisture-containing gas such as air or water vapor. In some embodiments, the protons produced by the proton-generating species react with the precursor to the treatment gas. The proton-generating species can also be activated other than by exposure to a moisture-containing fluid. In some embodiments, the proton-generating species can be activated and can release protons upon exposure to the water in the powders or impregnated porous carrier containing the precursor.

In some examples, producing the treatment gas in the reactor comprises mixing a solution of a precursor and a solution of a proton generating species. In some examples, the treatment gas comprises chlorine dioxide and the chlorine dioxide gas is produced in the reactor by mixing a sodium chlorite solution and hydrochloric acid solution.

The proton-generating species (whether impregnated in a porous carrier or not) and the precursor (whether impregnated in a porous carrier or not) can be mixed or otherwise combined. In some embodiments, the mixture is sprayed or coated on a surface. In some embodiments, the mixture is absorbed into a material such as a sponge, pad, mat, or the like. In some embodiments, the mixture can be placed in a reservoir, container, box, sachet, or the like, which can then be placed in the reactor.

In some examples, the treatment gas can be produced from a media configured to generate the treatment gas from the precursor. In some examples, the media comprises the precursor and the precursor reacts with protons in the air or in the media.

In some examples, the media comprises dry particles comprising the precursor. As used herein, the term "dry particles" indicates the particles have a water content of 20% or less (e.g., 15% or less, 10% or less, 5% or less, 4% or less, 3% or less, 2% or less, or 1% or less) by weight.

In some examples, the dry particles comprising the precursor are in the form of a powder. In some examples, the dry particles comprising the precursor can include a porous carrier wherein the precursor is impregnated in the porous carrier. In some examples, the porous carrier is inert. In some examples, the porous carrier has pores, channels, or the like located therein. Exemplary porous carriers include, but are not limited to, silica, pumice, diatomaceous earth, bentonite, clay, porous polymer, alumina, zeolite (e.g., zeolite crystals), or mixtures thereof. In some embodiments, the porous carrier is uniformly impregnated throughout the volume of the porous carrier via the pores, channels, and the like, with the precursor.

The porous carrier can have an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. For an anisotropic particle, the average particle size can refer to, for example, the average maximum dimension of the particle (e.g., the length of a rod shaped particle, the diagonal of a cube shaped particle, the bisector of a triangular shaped particle, etc.) Mean particle size can be measured using methods known in the art, such as sieving or microscopy.

In some examples, the porous carrier can have an average particle size, in its largest dimension, of 0.5 micrometers (microns, μm) or more (e.g., 1 μm or more, 2 μm or more, 3 μm or more, 4 μm or more, 5 μm or more, 10 μm or more, 15 μm or more, 20 μm or more, 25 μm or more, 30 μm or more, 35 μm or more, 40 μm or more, 50 μm or more, 60 μm or more, 70 μm or more, 80 μm or more, 90 μm or more, 100 μm or more, 125 μm or more, 150 μm or more, 175 μm or more, 200 μm or more, 225 μm or more, 250 μm or more, 300 μm or more, 350 μm or more, 400 μm or more, 450 μm or more, 500 μm or more, 600 μm or more, 700 μm or more, 800 μm or more, 900 μm or more, 1 millimeters (mm) or more, 2 mm or more, 3 mm or more, 4 mm or more, 5 mm or more, 6 mm or more, 7 mm or more, 8 mm or more, 9 mm or more, 10 mm or more, 15 mm or more, or 20 mm or more). In some examples, the porous carrier can have an average particle size of 25.4 mm (e.g., 1 inch) or less (e.g., 24 mm or less, 23 mm or less, 22 mm or less, 21 mm or less, 20 mm or less, 19 mm or less, 18 mm or less, 17 mm or less, 16 mm or less, 15 mm or less, 14 mm or less, 13 mm or less, 12 mm or less, 11 mm or less, 10 mm or less, 9 mm or less, 8 mm or less, 7 mm or less, 6 mm or less, 5 mm or less, 4 mm or less, 3 mm or less, 2 mm or less, 1 mm or less, 900 μm or less, 800 μm or less, 700 μm or less, 600 μm or less, 500 μm or less, 450 μm or less, 400 μm or less, 350 μm or less, 300 μm or less, 250 μm or less, 225 μm or less, 200 μm or less, 175 μm or less, 150 μm or less, 125 μm or less, 100 μm or less, 90 μm or less, 80 μm or less, 70 μm or less, 60 μm or less, 50 μm or less, 40 μm or less, 35 μm or less, 30 μm or less, 25 μm or less, 20 μm or less, 15 μm or less, 10 μm or less, or 5 μm or less). The average particle size of the porous carrier in their largest dimension can range from any of the minimum values described above to any of the maximum values described above. For example, the porous carrier can have an average particle size of from 0.5 μm to 25.4 mm (e.g., 0.5 μm to 1 mm, from 1 mm to 25.4 mm, from 0.5 μm to 100 μm, from 100 μm to 500 μm, from 500 μm to 1 mm, from 1 mm to 10 mm, from 10 mm to 25.4 mm, from 175 μm to 400 μm, or from 600 μm to 2 mm).

In some examples, the dry particles comprising the precursor include 1% or more by weight of the precursor (e.g., 2% or more, 3% or more, 4% or more, 5% or more, 6% or more, 7% or more, 8% or more, 9% or more, 10% or more, 15% or more, 20% or more, 25% or more, 30% or more, 35% or more, 40% or more, 45% or more, 50% or more, 60% or more, 70% or more, 80% or more, 90% or more, or 95% or more). In some examples, the dry particle comprising the precursor includes 100% or less by weight of the precursor (e.g., 95% or less, 90% or less, 85% or less, 80% or less, 75% or less, 70% or less, 65% or less, 60% or less, 55% or less, 50% or less, 40% or less, 30% or less, 20% or less, 15% or less, 10% or less, or 5% or less). In some embodiments, the dry particles comprising the precursor includes a porous carrier impregnated with a precursor and the porous carrier includes 1% or more by weight of the precursor (such as in the amounts provided above) and/or 50% or less by weight of the precursor (e.g., 40% or less, 30% or less, 20% or less, or 10% or less). The amount of precursor in the dry particles comprising the precursor can range from any of the minimum values described above to any of the maximum values described above. For example, the dry particle comprising the precursor can include from 1% to 100% by weight of the precursor (e.g., from 1% to 50%, from 50% to 100%, from 1% to 25%, from 25% to 50%, from 50% to 75%, from 75% to 100%, from 1% to 90%, from 1% to 30%).

In some examples, the porous carrier is impregnated with the precursor by using a porous carrier that has a low moisture (e.g., water) content. In some examples, the low moisture content is 20% or less (e.g., 15% or less, 10% or less, 5% or less, 4% or less, 3% or less, 2% or less, or 1% or less) by weight. In some examples, the porous carrier has an initial moisture content above 5% and thus can be dehydrated to produce a moisture content of 5% or less. In some examples, the dehydrated porous carrier is then immersed in or sprayed with an aqueous solution of the precursor at an elevated temperature (e.g., in the range from 120 °F to 190 °F) and the resulting slurry is thoroughly mixed. In some examples, the mixed slurry is then air-dried to a moisture level of 20% or less (e.g., 15% or less, 10% or less, 5% or less, 4% or less, 3% or less, 2% or less, or 1% or less) by weight to produce the impregnate (i.e., precursor impregnated in a porous carrier) disclosed herein. In some examples, the impregnate disclosed herein can be prepared without a drying step by calculating the amount of the aqueous solution of the precursor needed to achieve the desired final moisture level (e.g., 20% or less, 15% or less, 10% or less, 5% or less, 4% or less, 3% or less, 2% or less, or 1% or less) and adding this amount of the aqueous solution to the dehydrated porous carrier to impregnate the porous carrier, thereby forming the dry particles comprising the precursor.

In some examples, the precursor is impregnated into a porous carrier and treated with a base. In some examples, the base is any suitable base that can reduce the available protons and inhibit the reaction until the proton-generating species overcomes the base and reacts with the precursor, to enhance shelf stability and slow the reaction rate once the mixture is activated. Exemplary bases include, but are not limited to, potassium hydroxide, sodium hydroxide, calcium hydroxide, or a blend thereof. In some examples, the amount of base can be selected in view of a variety of factors, such as such as the desired amount of treatment gas produces and/or the desired rate at which the treatment gas is produced.

In some examples, the media further comprises a proton-generating species. The proton-generating species can be provided in any form that allows the release of protons. In some examples, the media further comprises dry particles comprising the proton-generating species. As used herein, the term "dry particles" indicates the particles have a water content of 20% or less (e.g., 15% or less, 10% or less, 5% or less, 4% or less, 3% or less, 2% or less, or 1% or less) by weight.

In some examples, the dry particles comprising the proton-generating species are in the form of a powder. In some examples, the dry particles comprising the proton-generating species can include a porous carrier wherein the proton-generating species is impregnated in the porous carrier. In some examples, the porous carrier is inert. In some examples, the porous carrier has pores, channels, or the like located therein. Exemplary porous carriers include, but are not limited to, silica, pumice, diatomaceous earth, bentonite, clay, porous polymer, alumina, zeolite (e.g., zeolite crystals), or mixtures thereof. In some embodiments, the porous carrier is uniformly impregnated throughout the volume of the porous carrier via the pores, channels, and the like, with the proton-generating species. In some examples, the porous carrier can have an average particle size, in their largest dimension, of 0.5 micrometers (microns, μm) or more (e.g., 1 μm or more, 2 μm or more, 3 μm or more, 4 μm or more, 5 μm or more, 10 μm or more, 15 μm or more, 20 μm or more, 25 μm or more, 30 μm or more, 35 μm or more, 40 μm or more, 50 μm or more, 60 μm or more, 70 μm or more, 80 μm or more, 90 μm or more, 100 μm or more, 125 μm or more, 150 μm or more, 175 μm or more, 200 μm or more, 225 μm or more, 250 μm or more, 300 μm or more, 350 μm or more, 400 μm or more, 450 μm or more, 500 μm or more, 600 μm or more, 700 μm or more, 800 μm or more, 900 μm or more, 1 millimeters (mm) or more, 2 mm or more, 3 mm or more, 4 mm or more, 5 mm or more, 6 mm or more, 7 mm or more, 8 mm or more, 9 mm or more, 10 mm or more, 15 mm or more, or 20 mm or more). In some examples, the porous carrier can have an average particle size of 25.4 mm (e.g., 1 inch) or less (e.g., 24 mm or less, 23 mm or less, 22 mm or less, 21 mm or less, 20 mm or less, 19 mm or less, 18 mm or less, 17 mm or less, 16 mm or less, 15 mm or less, 14 mm or less, 13 mm or less, 12 mm or less, 11 mm or less, 10 mm or less, 9 mm or less, 8 mm or less, 7 mm or less, 6 mm or less, 5 mm or less, 4 mm or less, 3 mm or less, 2 mm or less, 1 mm or less, 900 μm or less, 800 μm or less, 700 μm or less, 600 μm or less, 500 μm or less, 450 μm or less, 400 μm or less, 350 μm or less, 300 μm or less, 250 μm or less, 225 μm or less, 200 μm or less, 175 μm or less, 150 μm or less, 125 μm or less, 100 μm or less, 90 μm or less, 80 μm or less, 70 μm or less, 60 μm or less, 50 μm or less, 40 μm or less, 35 μm or less, 30 μm or less, 25 μm or less, 20 μm or less, 15 μm or less, 10 μm or less, or 5 μm or less), in their largest dimension. The average particle size of the porous carrier in their largest dimension can range from any of the minimum values described above to any of the maximum values described above. For example, the porous carrier can have an average particle size of from 0.5 μm to 25.4 mm (e.g., 0.5 μm to 1 mm, from 1 mm to 25.4 mm, from 0.5 μm to 100 μm, from 100 μm to 500 μm, from 500 μm to 1 mm, from 1 mm to 10 mm, from 10 mm to 25.4 mm, from 175 μm to 400 μm, or from 600 μm to 2 mm).

In some examples, the dry particles comprising the proton-generating species include 1% or more by weight of the proton-generating species (e.g., 2% or more, 3% or more, 4% or more, 5% or more, 6% or more, 7% or more, 8% or more, 9% or more, 10% or more, 15% or more, 20% or more, 25% or more, 30% or more, 35% or more, 40% or more, 45% or more, 50% or more, 60% or more, 70% or more, 80% or more, 90% or more, or 95% or more). In some examples, the dry particle comprising the proton-generating species includes 100% or less by weight of the proton-generating species (e.g., 95% or less, 90% or less, 85% or less, 80% or less, 75% or less, 70% or less, 65% or less, 60% or less, 55% or less, 50% or less, 40% or less, 30% or less, 20% or less, 15% or less, 10% or less, or 5% or less). In some embodiments, the dry particles comprising the proton-generating species includes a porous carrier impregnated with a proton-generating species and the porous carrier includes 1% or more by weight of the proton-generating species (such as in the amounts provided above) and/or 50% or less by weight of the proton-generating species (e.g., 40% or less, 30% or less, 20% or less, or 10% or less). The amount of proton-generating species in the dry particles comprising the proton-generating species can range from any of the minimum values described above to any of the maximum values described above. For example, the dry particles comprising the proton-generating species can include from 1% to 100% by weight of the proton-generating species (e.g., from 1% to 50%, from 50% to 100%, from 1% to 25%, from 25% to 50%, from 50% to 75%, from 75% to 100%, from 1% to 90%, or from 10% to 40%).

In some examples, the porous carrier is impregnated with the proton-generating species by using a porous carrier that has a low moisture (e.g., water) content. In some embodiments, the low moisture content is 20% or less (e.g., 15% or less, 10% or less, 5% or less, 4% or less, 3% or less, 2% or less, or 1% or less) by weight. In some embodiments, the porous carrier has an initial moisture content above 5% and thus can be dehydrated to produce a moisture content of 5% or less. In some embodiments, the dehydrated porous carrier is then immersed in or sprayed with an aqueous solution of the proton-generating species at an elevated temperature (e.g., in the range from 120 °F to 190 °F) and the resulting slurry is thoroughly mixed. In some embodiments, the mixed slurry is then air-dried to a moisture level of from 0% to 20% (e.g., 20% or less, 15% or less, 10% or less, 5% or less, 4% or less, 3% or less, 2% or less, or 1% or less) by weight to produce an impregnate (i.e., proton-generating species impregnated in a porous carrier). In some embodiments, the impregnate disclosed herein can be prepared without a drying step by calculating the amount of the aqueous solution of the proton-generating species needed to achieve the desired final moisture level (e.g., 20% or less, 15% or less, 10% or less, 5% or less, 4% or less, 3% or less, 2% or less, or 1% or less) and adding this amount of the aqueous solution to the dehydrated porous carrier to impregnate the porous carrier, thereby forming the dry particles comprising the proton-generating species.

In some examples, the media can further comprise a deliquescent. Examples of deliquescents include, but are not limited to, aluminum chloride, aluminum nitrate, ammonium bifluoride, cadmium nitrate, cesium hydroxide, calcium chloride, calcium iodide, cobalt(II) chloride, gold(III) chloride, iron(III) chloride, iron(III) nitrate, lithium iodide, lithium nitrate, magnesium chloride, magnesium iodide, manganese(II) sulfate, mesoxalic acid, potassium carbonate, potassium oxide, silver perchlorate, sodium formate, sodium nitrate, tachyhydrite, taurocholic acid, tellurium tetrachloride, tin(II) chloride, tin(II) sulfate, yttrium(III) chloride, zinc chloride, and combinations thereof. In some examples, the deliquescent is in the form of a powder. In some examples, the deliquescent can be impregnated in a porous carrier. In some examples, the porous carrier is inert. In some examples, the porous carrier has pores, channels, or the like located therein. In some examples, the porous carrier is uniformly impregnated throughout the volume of the porous carrier via the pores, channels, and the like, with the deliquescent. In some examples, the porous carrier impregnated with the deliquescent is separate from the porous carrier impregnated with the precursor and/or the porous carrier impregnated with the proton-generating species.

In some examples, the media can further comprise a desiccant. Examples of desiccants include, but are not limited to, activated alumina, benzophenone, bentonite clay, calcium oxide, calcium sulfate (Drierite), calcium sulfonate, copper(II) sulfate, lithium chloride, lithium bromide, magnesium sulfate, magnesium perchlorate, molecular sieves, potassium carbonate, potassium hydroxide, silica gel, sodium, sodium chlorate, sodium chloride, sodium hydroxide, sodium sulfate, sucrose, and combinations thereof. In some examples, the desiccant is in the form of a powder. In some examples, the desiccant can be impregnated in a porous carrier. In some examples, the porous carrier is inert. In some examples, the porous carrier has pores, channels, or the like located therein. In some examples, the porous carrier is uniformly impregnated throughout the volume of the porous carrier via the pores, channels, and the like, with the desiccant. In some examples, the porous carrier impregnated with the desiccant is separate from the porous carrier impregnated with the precursor and/or the porous carrier impregnated with the proton-generating species.

In some examples, the media can be disposed within the reactor as a bed. In some examples, producing the treatment gas in the reactor can comprise directing air to flow through the bed. For example, the device can be configured to direct air to flow through the bed to thereby produce the treatment gas. Although the devices and methods herein are described as using air, the devices and methods can encompass the use of other components (e.g., nitrogen). For example, the air can comprise an acidic gas compound such as hydrogen cyanide, hydrogen sulfide, hydrochloric acid, hydrogen fluoride, hydrogen iodide, hydrogen bromide, nitric acid vapor, chlorine, carbon disulfide, mercaptans, or a combination thereof.

In some examples, the bed of media can have an average total thickness of 1 centimeter (cm) or more (e.g., 1.5 cm or more, 2 cm or more, 2.5 cm or more, 3 cm or more, 3.5 cm or more, 4 cm or more, 4.5 cm or more, 5 cm or more, 6 cm or more, 7 cm or more, 8 cm or more, 9 cm or more, 10 cm or more, 15 cm or more, 20 cm or more, 25 cm or more, 30 cm or more, 35 cm or more, or 40 cm or more). In some examples, the average total thickness of the bed of media can be 50 cm or less (e.g., 45 cm or less, 40 cm or less, 35 cm or less, 30 cm or less, 25 cm or less, 20 cm or less, 15 cm or less, 10 cm or less, 9 cm or less, 8 cm or less, 7 cm or less, 6 cm or less, 5 cm or less, 4.5 cm or less, 4 cm or less, 3.5 cm or less, 3 cm or less, or 2.5 cm or less). The average total thickness of bed of the media in the reactor can range from any of the minimum values described above to any of the maximum values described above. For example, the average total thickness of the bed of media can be from 1 cm to 50 cm (e.g., from 1 cm to 25 cm, from 25 cm to 50 cm, from 1 cm to 40 cm, from 1 cm to 30 cm, from 1 cm to 20 cm, or from 2.5 cm to 10 cm).

In some examples, the media comprises dry particles comprising the precursor and dry particles comprising the proton generating species.

In some examples, the media is disposed within the reactor as a mixture of the dry particles of comprising the precursor and the dry particles comprising the proton generating species (e.g., the bed can comprise a mixture of the dry particles of comprising the precursor and the dry particles comprising the proton generating species).

In some examples, the media is disposed within the reactor as a layered bed comprising two or more alternating layers of the dry particles comprising the precursor and the dry particles comprising the proton-generating species. Methods of producing a gas at a controlled rate by directing air through a layered bed are described, for example, in US Patent Application 2019/0284049, which is hereby incorporated herein by reference for its description thereof. In some examples, the first layer in the bed contacted with the air is a layer of dry particles comprising the proton-generating species. In some examples, the layered bed comprises the alternating layers and further comprises at least one layer comprising a mixture of dry particles comprising the precursor and dry particles comprising the proton-generating species.

In some examples, the total number of layers in the layered bed is from 3 layers or more (e.g., 4 layers or more, 5 layers or more, 6 layers or more, 7 layers or more, 8 layers or more, 9 layers or more, 10 layers or more, 11 layers or more, 12 layers or more, 13 layers or more, 14 layers or more, 15 layers or more, 16 layers or more, 17 layers or more, 18 layers or more, 19 layers or more, 20 layers or more, 22 layers or more, 24 layers or more, 26 layers or more, 28 layers or more, 30 layers or more, 35 layers or more, or 40 layers or more). In some examples, the total number of layers in the layered bed is 48 layers or less (e.g., 46 layers or less, 44 layers or less, 42 layers or less, 40 layers or less, 38 layers or less, 36 layers or less, 34 layers or less, 32 layers or less, 30 layers or less, 28 layers or less, 26 layers or less, 24 layers or less, 22 layers or less, 20 layers or less, 19 layers or less, 18 layers or less, 17 layers or less, 16 layers or less, 15 layers or less, 14 layers or less, 13 layers or less, 12 layers or less, 11 layers or less, 10 layers or less, 9 layers or less, 8 layers or less, 7 layers or less, 6 layers or less, or 5 layers or less). The total number of layered in the layered bed can range from any of the minimum values described above to any of the maximum values described above. For example, the total number of layers in the layered bed can be from 3 layers to 48 layers (e.g., from 3 layers to 24 layers, from 24 layers to 48 layers, from 3 layers to 30 layers, from 3 layers to 20 layers, or from 4 layers to 16 layers).

In some examples, the bed can further include a porous woven or nonwoven layer before, after, and/or between one or more of the layers to separate the layers. The woven or nonwoven layer can be formed of a polymer material such as polyethylene, polypropylene or polyester (e.g., polyethylene terephthalate (PET)). For example, the porous separator layer can be a spun bond nonwoven polyester layer.

Each layer of the layered bed can have an average thickness, wherein the thickness of a layer is the dimension of the layer that the air traverses. For example, the average thickness of each of the layers of dry particles comprising the precursor in the layered bed can be 1 centimeter (cm) or more (e.g., 1.5 cm or more, 2 cm or more, 2.5 cm or more, 3 cm or more, 3.5 cm or more, 4 cm or more, 4.5 cm or more, 5 cm or more, 6 cm or more, 7 cm or more, 8 cm or more, 9 cm or more, 10 cm or more, 15 cm or more, 20 cm or more, 25 cm or more, 30 cm or more, 35 cm or more, or 40 cm or more). In some examples, the average thickness of each of the layers of dry particles comprising the precursor in the layered bed can be 50 cm or less (e.g., 45 cm or less, 40 cm or less, 35 cm or less, 30 cm or less, 25 cm or less, 20 cm or less, 15 cm or less, 10 cm or less, 9 cm or less, 8 cm or less, 7 cm or less, 6 cm or less, 5 cm or less, 4.5 cm or less, 4 cm or less, 3.5 cm or less, 3 cm or less, or 2.5 cm or less). The average thickness of each of the layers of dry particles comprising the precursor in the layered bed can range from any of the minimum values described above to any of the maximum values described above. For example, the average thickness of each of the layers of dry particles comprising the precursor in the layered bed can be from 1 cm to 50 cm (e.g., from 1 cm to 25 cm, from 25 cm to 50 cm, from 1 cm to 40 cm, from 1 cm to 30 cm, from 1 cm to 20 cm, or from 2.5 cm to 10 cm).

The average thickness of each of the layers of dry particles comprising the proton-generating species in the layered bed can be 1 centimeter (cm) or more (e.g., 1.5 cm or more, 2 cm or more, 2.5 cm or more, 3 cm or more, 3.5 cm or more, 4 cm or more, 4.5 cm or more, 5 cm or more, 6 cm or more, 7 cm or more, 8 cm or more, 9 cm or more, 10 cm or more, 15 cm or more, 20 cm or more, 25 cm or more, 30 cm or more, 35 cm or more, or 40 cm or more). In some examples, the average thickness of each of the layers of dry particles comprising the proton-generating species in the layered bed can be 50 cm or less (e.g., 45 cm or less, 40 cm or less, 35 cm or less, 30 cm or less, 25 cm or less, 20 cm or less, 15 cm or less, 10 cm or less, 9 cm or less, 8 cm or less, 7 cm or less, 6 cm or less, 5 cm or less, 4.5 cm or less, 4 cm or less, 3.5 cm or less, 3 cm or less, or 2.5 cm or less). The average thickness of each of the layers of dry particles comprising the proton-generating species in the layered bed can range from any of the minimum values described above to any of the maximum values described above. For example, the average thickness of each of the layers of dry particles comprising the proton-generating species in the layered bed can be from 1 cm to 50 cm (e.g., from 1 cm to 25 cm, from 25 cm to 50 cm, from 1 cm to 40 cm, from 1 cm to 30 cm, from 1 cm to 20 cm, or from 2.5 cm to 10 cm).

In some examples, the average thickness of each of the layers of dry particles comprising the precursor in the layered bed can be substantially the same as the average thickness of each of the layers of dry particles comprising the proton-generating species in the layered bed. For example, the average thickness of each of the layers in the layered bed can be 1 centimeter (cm) or more (e.g., 1.5 cm or more, 2 cm or more, 2.5 cm or more, 3 cm or more, 3.5 cm or more, 4 cm or more, 4.5 cm or more, 5 cm or more, 6 cm or more, 7 cm or more, 8 cm or more, 9 cm or more, 10 cm or more, 15 cm or more, 20 cm or more, 25 cm or more, 30 cm or more, 35 cm or more, or 40 cm or more). In some examples, the average thickness of each of the layers in the layered bed can be 50 cm or less (e.g., 45 cm or less, 40 cm or less, 35 cm or less, 30 cm or less, 25 cm or less, 20 cm or less, 15 cm or less, 10 cm or less, 9 cm or less, 8 cm or less, 7 cm or less, 6 cm or less, 5 cm or less, 4.5 cm or less, 4 cm or less, 3.5 cm or less, 3 cm or less, or 2.5 cm or less). The average thickness of each of the layers in the layered bed can range from any of the minimum values described above to any of the maximum values described above. For example, the average thickness of each of the layers in the layered bed can be from 1 cm to 50 cm (e.g., from 1 cm to 25 cm, from 25 cm to 50 cm, from 1 cm to 40 cm, from 1 cm to 30 cm, from 1 cm to 20 cm, or from 2.5 cm to 10 cm).

The media is generally stable and can be assembled into the reactor prior to use in an application. The composition for use in the reactor (e.g., the media) can be stored and shipped separately at humidity and/or air flow conditions designed to maintain stability.

For example, the dry particles comprising the precursor and the dry particles comprising the proton-generating species are generally stable and can be assembled into a layered bed and/or the reactor prior to use in an application. The dry particles comprising the precursor and the dry particles comprising the proton-generating species can be stored and shipped separately at minimal humidity. For example, the dry particles comprising the precursor and the dry particles comprising the proton-generating species can each be provided in separate sealed drums. The drums can be opened and the layered bed and/or the first filter can be prepared just prior to use. In some examples, such as those exemplified in U.S. Pat. No. 9,382,116, the layered bed can be prepared prior to shipment. Methods of maintaining the stability of the layered bed in storage are described in U.S. Pat. No. 9,382,116, which is incorporated by reference herein in its entirety.

The average particle size of the dry particles comprising the precursor, the average particle size of the dry particles comprising the proton-generating species, the presence or absence of air flowing through the bed, the amount of time the air flows through the bed, the amount of humidity in the air, the amount of precursor in the dry particles comprising the precursor, the amount of proton-generating species in the dry particles comprising the proton-generating species, the identity of the precursor, the identity of the proton-generating species, the amount of the dry particles comprising the precursor, the amount of the dry particles comprising the proton-generating species, the total number of layers in the layered bed, the average thickness of each of the layers of dry particles comprising the precursor in the layered bed, the average thickness of each of the layers of dry particles comprising the proton-generating species in the layered bed, the temperature of the air, the amount of base used to treat the porous carrier impregnated with the precursor, or a combination thereof, can be selected to control the total amount of treatment gas produced and/or the rate at which the treatment gas is produced. In some examples, the treatment gas is produced at a rate that is controlled by controlling the presence or absence of air flowing though the bed, the amount of time the air flows through the bed, the amount of the dry particles comprising the precursor in the bed, the amount of the dry particles comprising the proton-generating species in the bed, the temperature, or a combination thereof.

In some embodiments, the proton-generating species is provided in the same enclosure with the precursor. For example, the reactor can further comprise dry particles of a precursor and dry particles of a proton generating species enclosed within an enclosing material, and producing the treatment gas in the reactor comprises directing air through the reactor. In some embodiments, the enclosing material can include any enclosing material that is substantially impervious to liquid water. In some embodiments, the mixture is placed in a humidity-activated sachet and enclosed within an enclosing material such as a membrane. Exemplary membranes include, but are not limited to, a polyethylene or paper filter. Exemplary commercially available enclosing materials include, but are not limited to, TYVEK® and GORTEX®. In some embodiments, the enclosing material allows water vapor to enter the enclosure. In some embodiments, the enclosing material allows the treatment gas to be released from the enclosure and enter the treatment zone. In some embodiments, the enclosing material is a sachet comprising three layers of membrane material forming a two-compartment sachet to separate the proton-generating species (whether impregnated in a porous carrier or not) from the precursor (whether impregnated in a porous carrier or not). In some embodiments, the multiple layers of membrane material can be selected from different membrane materials, wherein the permeability of the outer membrane can determine how fast humidity can enter the sachet to activate the precursor and the proton-generating species. In some embodiments, the multiple layers of membrane material can be selected from different membrane materials, wherein the center membrane can determine how fast the protons from the proton-generating source can pass to the precursor to react and generate treatment gas.

The average particle size of the dry particles comprising the precursor, the average particle size of the dry particles comprising the proton-generating species, the presence or absence of air flowing through the reactor, the amount of time the air flows through the reactor, the amount of humidity in the air, the amount of precursor in the dry particles comprising the precursor, the amount of proton-generating species in the dry particles comprising the proton-generating species, the identity of the precursor, the identity of the proton-generating species, the amount of the dry particles comprising the precursor, the amount of the dry particles comprising the proton-generating species, the temperature of the air, the amount of base used to treat the porous carrier impregnated with the precursor, or a combination thereof, can be selected to control the total amount of treatment gas produced and/or the rate at which the treatment gas is produced. In some examples, the treatment gas is produced at a rate that is controlled by controlling the presence or absence of air flowing though the reactor, the amount of time the air flows through the reactor, the amount of the dry particles comprising the precursor enclosed in the enclosing material, the amount of the dry particles comprising the proton-generating species enclosed within the enclosing material, the temperature, the humidity of the air flowing through the reactor, the type of enclosing material, the thickness of the enclosing material, or a combination thereof.

In some examples, producing the treatment gas in the reactor can comprise flowing air through the reactor, for example thereby flowing air through the bed, the layered bed, or the enclosure (e.g., sachet) containing the media.

In some examples, the air can be directed to flow through the reactor at a flow rate. For example, the air can be directed to flow through the reactor at a flow rate of 0.1 cubic foot per minute (cfm) or more (e.g., 0.2 cfm or more, 0.3 cfm or more, 0.4 cfm or more, 0.5 cfm or more, 1 cfm or more, 1.5 cfm or more, 2 cfm or more, 2.5 cfm or more, 3 cfm or more, 3.5 cfm or more, 4 cfm or more, 4.5 cfm or more, 5 cfm or more, 6 cfm or more, 7 cfm or more, 8 cfm or more, 9 cfm or more, 10 cfm or more, 15 cfm or more, 20 cfm or more, 25 cfm or more, 30 cfm or more, 35 cfm or more, 40 cfm or more, 45 cfm or more, 50 cfm or more, 55 cfm or more, 60 cfm or more, 65 cfm or more, 70 cfm or more, 75 cfm or more, 80 cfm or more, 85 cfm or more, 90 cfm or more, 95 cfm or more, 100 cfm or more, 110 cfm or more, 120 cfm or more, 130 cfm or more, 140 cfm or more, 150 cfm or more, 160 cfm or more, 170 cfm or more, 180 cfm or more, 190 cfm or more, 200 cfm or more, 225 cfm or more, 250 cfm or more, 275 cfm or more, 300 cfm or more, 325 cfm or more, 350 cfm or more, 375 cfm or more, 400 cfm or more, 425 cfm or more, 450 cfm or more, 475 cfm or more, 500 cfm or more, 550 cfm or more, 600 cfm or more, 650 cfm or more, 700 cfm or more, 750 cfm or more, 800 cfm or more, 850 cfm or more, 900 cfm or more, or 950 cfm or more). In some examples, the air can be directed to flow through the reactor at a flow rate of 1,000 cubic feet per minute (cfm) or less (e.g., 950 cfm or less, 900 cfm or less, 850 cfm or less, 800 cfm or less, 750 cfm or less, 700 cfm or less, 650 cfm or less, 600 cfm or less, 550 cfm or less, 500 cfm or less, 475 cfm or less, 450 cfm or less, 425 cfm or less, 400 cfm or less, 375 cfm or less, 350 cfm or less, 325 cfm or less, 300 cfm or less, 275 cfm or less, 250 cfm or less, 225 cfm or less, 200 cfm or less, 190 cfm or less, 180 cfm or less, 170 cfm or less, 160 cfm or less, 150 cfm or less, 140 cfm or less, 130 cfm or less, 120 cfm or less, 110 cfm or less, 100 cfm or less, 95 cfm or less, 90 cfm or less, 85 cfm or less, 80 cfm or less, 75 cfm or less, 70 cfm or less, 65 cfm or less, 60 cfm or less, 55 cfm or less, 50 cfm or less, 45 cfm or less, 40 cfm or less, 35 cfm or less, 30 cfm or less, 25 cfm or less, 20 cfm or less, 15 cfm or less, 10 cfm or less, 9 cfm or less, 8 cfm or less, 7 cfm or less, 6 cfm or less, 5 cfm or less, 4.5 cfm or less, 4 cfm or less, 3.5 cfm or less, 3 cfm or less, 2.5 cfm or less, 2 cfm or less, 1.5 cfm or less, 1 cfm or less, or 0.5 cfm or less). The flow rate at which the air is directed to flow through the reactor can range from any of the minimum values described above to any of the maximum values described above. For example, the air can be directed to flow through the reactor at a flow rate of from 0.1 cfm to 1,000 cfm (e.g., from 0.1 cfm to 500 cfm, from 500 cfm to 1000 cfm, from 0.1 cfm to 200 cfm, from 200 cfm to 400 cfm, from 400 cfm to 600 cfm, from 600 cfm to 800 cfm, from 800 cfm to 1000 cfm, from 1 cfm to 1000 cfm, from 0.1 cfm to 950 cfm, from 1 cfm to 950 cfm, from 50 cfm to 900 cfm, from 100 cfm to 750 cfm, from 200 cfm to 600 cfm, or from 250 cfm to 500 cfm). The air flow across through the reactor can be created naturally or by a fan, a pump, or any other device capable of creating a pressure differential across the reactor to cause movement of the air.

In some examples, the air can have a humidity of 20% or more, wherein the humidity is non-condensing (e.g., 25% or more, 30% or more, 35% or more, 40% or more, 45% or more, 50% or more, 60% or more, 70% or more, 80% or more, or 90% or more). In some examples, the air can have a humidity of 100% or less, wherein the humidity is non-condensing (e.g., 95% or less, 90% or less, 85% or less, 80% or less, 75% or less, 70% or less, 60% or less, 50% or less, 40% or less, or 30% or less). The amount of humidity in the air flowed through the bed can range from any of the minimum values described above to any of the maximum values described above. For example, the air can have a humidity of from 20% to 100%, wherein the humidity is non-condensing (e.g., from 20% to 60%, from 60% to 100%, from 20% to 40%, from 40% to 60%, from 60% to 80%, from 80% to 100%, or from 50% to 80%).

In some examples, the air flows through the reactor for an amount of time of 1 minute or more (e.g., 5 minutes or more, 10 minutes or more, 15 minutes or more, 30 minutes or more, 45 minutes or more, 1 hour or more, 2 hours or more, 3 hours or more, 4 hours or more, 6 hours or more, 8 hours or more, 10 hours or more, 12 hours or more, 16 hours or more, 20 hours or more, 22 hours or more, 24 hours or more, 26 hours or more, 28 hours or more, 30 hours or more, 32 hours or more, 34 hours or more, 36 hours or more, 38 hours or more, 40 hours or more, 42 hours or more, or 46 hours or more). In some examples, the air flows through the reactor for an amount of time of 48 hours or less (e.g., 46 hours or less, 42 hours or less, 40 hours or less, 38 hours or less, 36 hours or less, 34 hours or less, 32 hours or less, 30 hours or less, 28 hours or less, 26 hours or less, 24 hours or less, 22 hours or less, 20 hours or less, 16 hours or less, 12 hours or less, 10 hours or less, 8 hours or less, 6 hours or less, 4 hours or less, 3 hours or less, 2 hours or less, 1 hour or less, 45 minutes or less, 30 minutes or less, 15 minutes or less, 10 minutes or less, or 5 minutes or less). The time that the air flows through the reactor can range from any of the minimum values described above to any of the maximum values described above. For example, the air can flow through the reactor for an amount of time of from 1 minute to 48 hours (e.g., from 1 minute to 24 hours, from 24 hours days to 48 hours, from 1 minute to 1 hour, from 1 hour to 1 day, from 1 day to 2 days, from 5 minutes to 48 hours, from 1 minute to 46 hours, or from 5 minutes to 48 hours).

In some examples, the air flows through the reactor for a first amount of time, after which the flow of air through the reactor ceases for a second amount of time. The second amount of time can be, for example, 1 minute or more (e.g., 5 minutes or more, 10 minutes or more, 15 minutes or more, 30 minutes or more, 45 minutes or more, 1 hour or more, 2 hours or more, 3 hours or more, 4 hours or more, 6 hours or more, 8 hours or more, 10 hours or more, 12 hours or more, 16 hours or more, 20 hours or more, 22 hours or more, 24 hours or more, 26 hours or more, 28 hours or more, 30 hours or more, 32 hours or more, 34 hours or more, 36 hours or more, 38 hours or more, 40 hours or more, 42 hours or more, or 46 hours or more). In some examples, the second amount of time can be 48 hours or less (e.g., 46 hours or less, 42 hours or less, 40 hours or less, 38 hours or less, 36 hours or less, 34 hours or less, 32 hours or less, 30 hours or less, 28 hours or less, 26 hours or less, 24 hours or less, 22 hours or less, 20 hours or less, 16 hours or less, 12 hours or less, 10 hours or less, 8 hours or less, 6 hours or less, 4 hours or less, 3 hours or less, 2 hours or less, 1 hour or less, 45 minutes or less, 30 minutes or less, 15 minutes or less, 10 minutes or less, or 5 minutes or less). The second amount of time can range from any of the minimum values described above to any of the maximum values described above. For example, the second amount of time can be from 1 minute to 48 hours (e.g., from 1 minute to 24 hours, from 24 hours days to 48 hours, from 1 minute to 1 hour, from 1 hour to 1 day, from 1 day to 2 days, from 5 minutes to 48 hours, from 1 minute to 46 hours, or from 5 minutes to 48 hours).

In some examples, after the second amount of time, the air flows through the reactor for a third amount of time. The third amount of time can be, for example, 1 minute or more (e.g., 5 minutes or more, 10 minutes or more, 15 minutes or more, 30 minutes or more, 45 minutes or more, 1 hour or more, 2 hours or more, 3 hours or more, 4 hours or more, 6 hours or more, 8 hours or more, 10 hours or more, 12 hours or more, 16 hours or more, 20 hours or more, 22 hours or more, 24 hours or more, 26 hours or more, 28 hours or more, 30 hours or more, 32 hours or more, 34 hours or more, 36 hours or more, 38 hours or more, 40 hours or more, 42 hours or more, or 46 hours or more). In some examples, the third amount of time can be 48 hours or less (e.g., 46 hours or less, 42 hours or less, 40 hours or less, 38 hours or less, 36 hours or less, 34 hours or less, 32 hours or less, 30 hours or less, 28 hours or less, 26 hours or less, 24 hours or less, 22 hours or less, 20 hours or less, 16 hours or less, 12 hours or less, 10 hours or less, 8 hours or less, 6 hours or less, 4 hours or less, 3 hours or less, 2 hours or less, 1 hour or less, 45 minutes or less, 30 minutes or less, 15 minutes or less, 10 minutes or less, or 5 minutes or less). The third amount of time can range from any of the minimum values described above to any of the maximum values described above. For example, the third amount of time can be from 1 minute to 48 hours (e.g., from 1 minute to 24 hours, from 24 hours days to 48 hours, from 1 minute to 1 hour, from 1 hour to 1 day, from 1 day to 2 days, from 5 minutes to 48 hours, from 1 minute to 46 hours, or from 5 minutes to 48 hours).

In some examples, likewise, after the third amount of time, the flow of air through the reactor ceases for a fourth amount of time, and after the fourth amount of time, the air flows through the reactor for a fifth amount of time. The flow of air through the reactor can be thus pulsed for any desired number of times, with the amount of time that the air flows through the reactor and the amount of time that the air ceases to flow through the reactor can independently be selected in view of a variety of factors, such as the desired amount of treatment gas produced and/or the desired rate at which the treatment gas is produced.

In some examples, the devices further comprise a mixer within the reactor, wherein the mixer contains dry particles comprising the precursor and dry particles comprising the proton generating species. In some examples, producing the treatment gas in the reactor can comprise dynamically mixing the dry particles comprising the precursor and the dry particles comprising the proton generating species in the mixer. Methods of producing a gas at a variable rate by dynamically mixing dry particles comprising a precursor and dry particles comprising a proton-generating species are described, for example, in U.S. Pat. No. 10,850,981, which is hereby incorporated herein by reference for its description thereof.

In some examples, the treatment gas can be produced at a rate that is varied by varying the amount of time the dry particles comprising the precursor and the dry particles comprising the proton-generating species are dynamically mixed, the rate at which the dry particles comprising the precursor and the dry particles comprising the proton-generating species are dynamically mixed, or a combination thereof.

In some examples, the dry particles comprising the precursor and dry particles comprising the proton-generating species are dynamically mixed in a mixer selected from the group consisting of a tumbler, a vibratory mixer, a rotary mixer, a marinator mixer, and a stirrer. In some examples, dynamically mixing the dry particles comprising the precursor and dry particles comprising the proton-generating species can comprise dynamically agitating the dry particles comprising the precursor and dry particles comprising the proton-generating species.

In some examples, the dry particles comprising the precursor and dry particles comprising the proton-generating species are dynamically mixed in a mixer selected from the group consisting of a tumbler, a rotary mixer, a marinator mixer, and a stirrer at a rate of 1 revolution per day (RPD) or more (e.g., 2 RPD or more, 3 RPD or more, 4 RPD or more, 6 RPD or more, 8 RPD or more, 12 RPD or more, 1 revolution per hour (RPH) or more, 2 RPH or more, 3 RPH or more, 4 RPH or more, 6 RPH or more, 12 RPH or more, 1 revolution per minute (RPM) or more, 5 RPM or more, 10 RPM or more, 15 RPM or more, 20 RPM or more, 25 RPM or more, 30 RPM or more, 35 RPM or more, 40 RPM or more, 45 RPM or more, 50 RPM or more, 60 RPM or more, 70 RPM or more, 80 RPM or more, or 90 RPM or more). In some examples, the dry particles comprising the precursor and dry particles comprising the proton-generating species are dynamically mixed in a mixer selected from the group consisting of a tumbler, a rotary mixer, a marinator mixer, and a stirrer at a rate of 100 RPM or less (e.g., 90 RPM or less, 80 RPM or less, 70 RPM or less, 60 RPM or less, 50 RPM or less, 45 RPM or less, 40 RPM or less, 35 RPM or less, 30 RPM or less, 25 RPM or less, 20 RPM or less, 15 RPM or less, 10 RPM or less, 5 RPM or less, 1 RPM or less, 12 RPH or less, 6 RPH or less, 4 RPH or less, 3 RPH or less, 2 RPH or less, 1 RPH or less, 12 RPD or less, 8 RPD or less, 6 RPD or less, 4 RPD or less, 3 RPD or less, or 2 RPD or less). The rate at which the dry particles comprising the precursor and dry particles comprising the proton-generating species are dynamically mixed in a mixer selected from the group consisting of a tumbler, a rotary mixer, a marinator mixer, and a stirrer can range from any of the minimum values described above to any of the maximum values described above. For example, the dry particles comprising the precursor and dry particles comprising the proton-generating species can be dynamically mixed in a mixer selected from the group consisting of a tumbler, a rotary mixer, a marinator mixer, and a stirrer at a rate of from 1 RPD to 100 RPM (e.g., from 1 RPD to 1 RPH, from 1 RPH to 1 RPM, from 1 RPM to 100 RPM, or from 4 RPD to 90 RPM).

In some examples, the dry particles comprising the precursor and dry particles comprising the proton-generating species are dynamically mixed in a vibratory mixer at a rate of 1 Hertz (Hz) or more (e.g., 25 Hz or more, 50 Hz or more, 75 Hz or more, 100 Hz or more, 150 Hz or more, 200 Hz or more, 250 Hz or more, 300 Hz or more, 350 Hz or more, 400 Hz or more, 450 Hz or more, 500 Hz or more, 600 Hz or more, 700 Hz or more, 800 Hz or more, 900 Hz or more, 1 kilohertz (kHz) or more, 2 kHz or more, 3 kHz or more, 4 kHz or more, 5 kHz or more, 10 kHz or more, or 15 kHz or more). In some examples, the dry particles comprising the precursor and dry particles comprising the proton-generating species are dynamically mixed in a vibratory mixer at a rate of 20 kHz or less (e.g., 15 kHz or less, 10 kHz or less, 5 kHz or less, 4 kHz or less, 3 kHz or less, 2 kHz or less, 1 kHz or less, 900 Hz or less, 800 Hz or less, 700 Hz or less, 600 Hz or less, 500 Hz or less, 450 Hz or less, 400 Hz or less, 350 Hz or less, 300 Hz or less, 250 Hz or less, 200 Hz or less, 150 Hz or less, 100 Hz or less, 75 Hz or less, 50 Hz or less, or 25 Hz or less). The rate at which the dry particles comprising the precursor and dry particles comprising the proton-generating species are dynamically mixed in a vibratory mixer can range from any of the minimum values described above to any of the maximum values described above. For example, the dry particles comprising the precursor and dry particles comprising the proton-generating species are dynamically mixed in a vibratory mixer at a rate of from 1 Hz to 20 kHz (e.g., from 1 Hz to 100 Hz, from 100 Hz to 1 kHz, from 1 kHz to 20 kHz, or from 10 Hz to 15 kHz).

In some examples, the amount of time that the dry particles comprising the precursor and dry particles comprising the proton-generating species are dynamically mixed is 1 minute or more (e.g., 5 minutes or more, 10 minutes or more, 15 minutes or more, 30 minutes or more, 45 minutes or more, 1 hour or more, 2 hours or more, 3 hours or more, 4 hours or more, 6 hours or more, 8 hours or more, 10 hours or more, 12 hours or more, 16 hours or more, 20 hours or more, 22 hours or more, 24 hours or more, 26 hours or more, 28 hours or more, 30 hours or more, 32 hours or more, 34 hours or more, 36 hours or more, 38 hours or more, 40 hours or more, 42 hours or more, or 46 hours or more). In some examples, the amount of time that the dry particles comprising the precursor and dry particles comprising the proton-generating species are dynamically mixed is 48 hours or less (e.g., 46 hours or less, 42 hours or less, 40 hours or less, 38 hours or less, 36 hours or less, 34 hours or less, 32 hours or less, 30 hours or less, 28 hours or less, 26 hours or less, 24 hours or less, 22 hours or less, 20 hours or less, 16 hours or less, 12 hours or less, 10 hours or less, 8 hours or less, 6 hours or less, 4 hours or less, 3 hours or less, 2 hours or less, 1 hour or less, 45 minutes or less, 30 minutes or less, 15 minutes or less, 10 minutes or less, or 5 minutes or less). The amount of time that the dry particles comprising the precursor and dry particles comprising the proton-generating species are dynamically mixed can range from any of the minimum values described above to any of the maximum values described above. For example, the amount of time that the dry particles comprising the precursor and dry particles comprising the proton-generating species are dynamically mixed can be 1 minute to 48 hours (e.g., from 1 minute to 24 hours, from 24 hours days to 48 hours, from 1 minute to 1 hour, from 1 hour to 1 day, from 1 day to 2 days, from 5 minutes to 48 hours, from 1 minute to 46 hours, or from 5 minutes to 48 hours).

In some examples, dynamically mixing the dry particles comprising the precursor and the dry particles comprising the proton-generating species comprises: providing a first portion of the dry particles comprising the precursor and the dry particles comprising the proton-generating species; dynamically mixing the first portion of the dry particles comprising the precursor and the dry particles comprising the proton-generating species to form a mixture; providing a second portion of the dry particles comprising the precursor; and dynamically mixing the second portion of the dry particles comprising the precursor and the mixture. In some examples, the methods can likewise further comprise providing a third portion of the dry particles comprising the precursor. In some examples, the methods can likewise further comprise providing a fourth portion of the dry particles comprising the precursor, or as many additional portions of dry particles comprising the precursor as are desired.

In some examples, dynamically mixing the dry particles comprising the precursor and the dry particles comprising the proton-generating species comprises: providing the dry particles comprising the precursor and a first portion of the dry particles comprising the proton-generating species; dynamically mixing the dry particles comprising the precursor and the first portion of the dry particles comprising the proton-generating species to form a mixture; providing a second portion of the dry particles comprising the proton-generating species; and dynamically mixing the second portion of the dry particles comprising the proton-generating species and the mixture. In some examples, the methods can likewise further comprise providing a third portion of the dry particles comprising the proton-generating species. In some examples, the methods can likewise further comprise providing a fourth portion of the dry particles comprising the proton-generating species, or as many additional portions of dry particles comprising the proton-generating species as are desired.

In some examples, the dry particles comprising the precursor are provided continuously over the amount of time that the dry particles comprising the precursor and dry particles comprising the proton-generating species are dynamically mixed such as by adding dry particles comprising the precursor to the mixer during mixing.

In some examples, the dry particles comprising the proton generating species are provided continuously over the amount of time that the dry particles comprising the precursor and dry particles comprising the proton-generating species are dynamically mixed such as by adding dry particles comprising the proton-generating species to the mixer during mixing.

In some examples, the dry particles comprising the precursor and dry particles comprising the proton-generating species are dynamically mixed for a first amount of time, after which the dry particles comprising the precursor and dry particles comprising the proton-generating species are static for a second amount of time. The second amount of time can be, for example, 1 minute or more (e.g., 5 minutes or more, 10 minutes or more, 15 minutes or more, 30 minutes or more, 45 minutes or more, 1 hour or more, 2 hours or more, 3 hours or more, 4 hours or more, 6 hours or more, 8 hours or more, 10 hours or more, 12 hours or more, 16 hours or more, 20 hours or more, 22 hours or more, 24 hours or more, 26 hours or more, 28 hours or more, 30 hours or more, 32 hours or more, 34 hours or more, 36 hours or more, 38 hours or more, 40 hours or more, 42 hours or more, or 46 hours or more). In some examples, the second amount of time can be 48 hours or less (e.g., 46 hours or less, 42 hours or less, 40 hours or less, 38 hours or less, 36 hours or less, 34 hours or less, 32 hours or less, 30 hours or less, 28 hours or less, 26 hours or less, 24 hours or less, 22 hours or less, 20 hours or less, 16 hours or less, 12 hours or less, 10 hours or less, 8 hours or less, 6 hours or less, 4 hours or less, 3 hours or less, 2 hours or less, 1 hour or less, 45 minutes or less, 30 minutes or less, 15 minutes or less, 10 minutes or less, or 5 minutes or less). The second amount of time can range from any of the minimum values described above to any of the maximum values described above. For example, the second amount of time can be from 1 minute to 48 hours (e.g., from 1 minute to 24 hours, from 24 hours days to 48 hours, from 1 minute to 1 hour, from 1 hour to 1 day, from 1 day to 2 days, from 5 minutes to 48 hours, from 1 minute to 46 hours, or from 5 minutes to 48 hours).

In some examples, after the second amount of time, the dry particles comprising the precursor and dry particles comprising the proton-generating species are dynamically mixed for a third amount of time. In some examples, likewise, after the third amount of time, the dry particles comprising the precursor and the dry particles comprising the proton-generating species are static for a fourth amount of time, and after the fourth amount of time, the dry particles comprising the precursor and the dry particles comprising the proton-generating species are dynamically mixed for a fifth amount of time. The dynamic mixing can be thus pulsed for any desired number of times, with the amount of time that the particles are dynamically mixed and the amount of time that the particles remain static can independently be selected in view of a variety of factors, such as the desired rate at which the treatment gas is produced.

In some examples, after the second amount of time a second amount of dry particles comprising the precursor are provided and the second amount of dry particles comprising the precursor are dynamically mixed with the first amount of the dry particles comprising the precursor and dry particles comprising the proton-generating species for a third amount of time. In some examples, likewise, a third amount of dry particles comprising the precursor can be provided and dynamically mixed. In some examples, the methods can likewise further comprise providing a fourth amount of the dry particles comprising the precursor, or as many additional amounts of dry particles comprising the precursor as are desired.

In some examples, after the second amount of time a second amount of dry particles comprising the proton-generating species are provided and the second amount of dry particles comprising the proton-generating species are dynamically mixed with the first amount of the dry particles comprising the precursor and dry particles comprising the proton-generating species for a third amount of time. In some examples, likewise a third amount of dry particles comprising the proton-generating species can be provided and dynamically mixed. In some examples, the methods can likewise further comprise providing a fourth amount of the dry particles comprising the proton-generating species, or as many additional amounts of dry particles comprising the proton-generating species as are desired.

The third amount of time can be, for example, 1 minute or more (e.g., 5 minutes or more, 10 minutes or more, 15 minutes or more, 30 minutes or more, 45 minutes or more, 1 hour or more, 2 hours or more, 3 hours or more, 4 hours or more, 6 hours or more, 8 hours or more, 10 hours or more, 12 hours or more, 16 hours or more, 20 hours or more, 22 hours or more, 24 hours or more, 26 hours or more, 28 hours or more, 30 hours or more, 32 hours or more, 34 hours or more, 36 hours or more, 38 hours or more, 40 hours or more, 42 hours or more, or 46 hours or more). In some examples, the third amount of time can be 48 hours or less (e.g., 46 hours or less, 42 hours or less, 40 hours or less, 38 hours or less, 36 hours or less, 34 hours or less, 32 hours or less, 30 hours or less, 28 hours or less, 26 hours or less, 24 hours or less, 22 hours or less, 20 hours or less, 16 hours or less, 12 hours or less, 10 hours or less, 8 hours or less, 6 hours or less, 4 hours or less, 3 hours or less, 2 hours or less, 1 hour or less, 45 minutes or less, 30 minutes or less, 15 minutes or less, 10 minutes or less, or 5 minutes or less). The third amount of time can range from any of the minimum values described above to any of the maximum values described above. For example, the third amount of time can be from 1 minute to 48 hours (e.g., from 1 minute to 24 hours, from 24 hours days to 48 hours, from 1 minute to 1 hour, from 1 hour to 1 day, from 1 day to 2 days, from 5 minutes to 48 hours, from 1 minute to 46 hours, or from 5 minutes to 48 hours).

In some examples, the reactor can further comprise a means for milling, crushing, abrading, or a combination thereof the dry particles comprising the precursor and dry particles comprising the proton-generating species. In some examples, the methods can further comprise milling, crushing, abrading, or a combination thereof the dry particles comprising the precursor and dry particles comprising the proton-generating species. In some examples, milling, crushing, abrading, or a combination thereof the dry particles comprising the precursor and dry particles comprising the proton-generating species can occur during the dynamic mixing. For example, the mixer can further contain an abrasive particle, wherein the mixer is configured to dynamically mix the abrasive particle with the dry particles comprising the precursor and dry particles comprising the proton-generating species. In some examples, the methods can further comprise dynamically mixing an abrasive particle with the dry particles comprising the precursor and dry particles comprising the proton-generating species. For example, during the reaction between the dry particles comprising the precursor and dry particles comprising the proton-generating species, salt byproduct can form on the surface of the dry particles. The salt byproduct buildup can, in some examples, cease the treatment gas generation before complete conversion of the reactants is obtained. Milling, crushing, abrading, or a combination thereof, the dry particles can scour the surface of the dry particles or crush the dry particles, thereby exposing reactive surfaces and allowing the conversion of the precursor to the treatment gas to continue.

In some examples, the mixer can further contain a deliquescent, wherein the mixer is configured to dynamically mix the deliquescent with the dry particles comprising the precursor and dry particles comprising the proton-generating species. In some examples, the methods can further comprise dynamically mixing a deliquescent with the dry particles comprising the precursor and dry particles comprising the proton-generating species. Examples of deliquescents include, but are not limited to, aluminum chloride, aluminum nitrate, ammonium bifluoride, cadmium nitrate, cesium hydroxide, calcium chloride, calcium iodide, cobalt (II) chloride, gold(III) chloride, iron(III) chloride, iron(III) nitrate, lithium iodide, lithium nitrate, magnesium chloride, magnesium iodide, manganese(II) sulfate, mesoxalic acid, potassium carbonate, potassium oxide, silver perchlorate, sodium formate, sodium nitrate, tachyhydrite, taurocholic acid, tellurium tetrachloride, tin(II) chloride, tin(II) sulfate, yttrium(III) chloride, zinc chloride, and combinations thereof. In some examples, the deliquescent is in the form of a powder. In some examples, the deliquescent can be impregnated in a porous carrier. In some examples, the porous carrier is inert. In some examples, the porous carrier has pores, channels, or the like located therein. In some examples, the porous carrier is uniformly impregnated throughout the volume of the porous carrier via the pores, channels, and the like, with the deliquescent. In some examples, the porous carrier impregnated with the deliquescent is separate from the porous carrier impregnated with the precursor and/or the porous carrier impregnated with the proton-generating species.

In some examples, the mixer can further contain a desiccant, wherein the mixer is configured to dynamically mix the desiccant with the dry particles comprising the precursor and dry particles comprising the proton-generating species. In some examples, the methods can further comprise dynamically mixing a desiccant with the dry particles comprising the precursor and dry particles comprising the proton-generating species. Examples of desiccants include, but are not limited to, activated alumina, benzophenone, bentonite clay, calcium oxide, calcium sulfate (Drierite), calcium sulfonate, copper(II) sulfate, lithium chloride, lithium bromide, magnesium sulfate, magnesium perchlorate, molecular sieves, potassium carbonate, potassium hydroxide, silica gel, sodium, sodium chlorate, sodium chloride, sodium hydroxide, sodium sulfate, sucrose, and combinations thereof. In some examples, the desiccant is in the form of a powder. In some examples, the desiccant can be impregnated in a porous carrier. In some examples, the porous carrier is inert. In some examples, the porous carrier has pores, channels, or the like located therein. In some examples, the porous carrier is uniformly impregnated throughout the volume of the porous carrier via the pores, channels, and the like, with the desiccant. In some examples, the porous carrier impregnated with the desiccant is separate from the porous carrier impregnated with the precursor and/or the porous carrier impregnated with the proton-generating species.

In some examples, the mixer can further contain inert particles, wherein the mixer is configured to dynamically mix the inert particles with the dry particles comprising the precursor and dry particles comprising the proton-generating species. In some examples, the methods can further comprise dynamically mixing inert particles with the dry particles comprising the precursor and dry particles comprising the proton-generating species. The inert particles can, for example, comprise porous carrier particles. Exemplary porous carriers include, but are not limited to, silica, pumice, diatomaceous earth, bentonite, clay, porous polymer, alumina, zeolite (e.g., zeolite crystals), or mixtures thereof.

The average particle size of the dry particles comprising the precursor, the average particle size of the dry particles comprising the proton-generating species, the amount of time the dry particles comprising the precursor and the dry particles comprising the proton-generating species are dynamically mixed, the rate at which the dry particles comprising the precursor and the dry particles comprising the proton-generating species are dynamically mixed, the amount of precursor in the dry particles comprising the precursor, the amount of proton-generating species in the dry particles comprising the proton-generating species, the identity of the precursor, the identity of the proton-generating species, the amount of the dry particles comprising the precursor, the amount of the dry particles comprising the proton-generating species, the type of mixing, the presence and amount of additional components (e.g., inert particles, abrasive particles, deliquescent, desiccant, water, water vapor), or a combination thereof, can be selected to control the total amount of gas produced and/or the rate at which the treatment gas is produced.

In any of the devices or methods described herein, the treatment gas can, for example, be produced at a rate of 0.1 milligram (mg) of treatment gas per day per gram (g) of precursor initially present or more (e.g., 0.5 mg of gas/day/g of precursor or more, 1 mg of gas/day/g of precursor or more, 2 mg of gas/day/g of precursor or more, 3 mg of gas/day/g of precursor or more, 4 mg of gas/day/g of precursor or more, 5 mg of gas/day/g of precursor or more, 10 mg of gas/day/g of precursor or more, 15 mg of gas/day/g of precursor or more, 20 mg of gas/day/g of precursor or more, 25 mg of gas/day/g of precursor or more, 30 mg of gas/day/g of precursor or more, 35 mg of gas/day/g of precursor or more, 40 mg of gas/day/g of precursor or more, 45 mg of gas/day/g of precursor or more, 50 mg of gas/day/g of precursor or more, 60 mg of gas/day/g of precursor or more 70 mg of gas/day/g of precursor or more, 80 mg of gas/day/g of precursor or more, 90 mg of gas/day/g of precursor or more, 100 mg of gas/day/g of precursor or more, 150 mg of gas/day/g of precursor or more, 200 mg of gas/day/g of precursor or more, 250 mg of gas/day/g of precursor or more, 300 mg of gas/day/g of precursor or more, 350 mg of gas/day/g of precursor or more, 400 mg of gas/day/g of precursor or more, 450 mg of gas/day/g of precursor or more, or 500 mg of gas/day/g of precursor or more). In some examples, the treatment gas is produced at a rate of 600 mg of gas per day per g of precursor initially present or less (e.g., 550 mg of gas/day/g of precursor or less, 500 mg of gas/day/g of precursor or less, 450 mg of gas/day/g of precursor or less, 400 mg of gas/day/g of precursor or less, 350 mg of gas/day/g of precursor or less, 300 mg of gas/day/g of precursor or less, 250 mg of gas/day/g of precursor or less, 200 mg of gas/day/g of precursor or less, 150 mg of gas/day/g of precursor or less, 100 mg of gas/day/g of precursor or less, 90 mg of gas/day/g of precursor or less, 80 mg of gas/day/g of precursor or less, 70 mg of gas/day/g of precursor or less, 60 mg of gas/day/g of precursor or less, 50 mg of gas/day/g of precursor or less, 45 mg of gas/day/g of precursor or less, 40 mg of gas/day/g of precursor or less, 35 mg of gas/day/g of precursor or less, 30 mg of gas/day/g of precursor or less, 25 mg of gas/day/g of precursor or less, 20 mg of gas/day/g of precursor or less, 15 mg of gas/day/g of precursor or less, 10 mg of gas/day/g of precursor or less, 5 mg of gas/day/g of precursor or less, 4 mg of gas/day/g of precursor or less, 3 mg of gas/day/g of precursor or less, 2 mg of gas/day/g of precursor or less, or 1 mg of gas/day/g of precursor or less). The rate the treatment gas is produced can range from any of the minimum values described above to any of the maximum values described above. For example, the treatment gas can be produced at a rate of from 0.1 milligram of gas per day per gram of precursor initially present to 600 milligrams of gas per day per gram of precursor (e.g., from 0.1 mg of gas/day/g of precursor to 300 mg of gas/day/g of precursor, from 300 mg of gas/day/g of precursor to 600 mg of gas/day/g of precursor, from 0.1 mg of gas/day/g of precursor to 200 mg of gas/day/g of precursor from 200 mg of gas/day/g of precursor to 400 mg of gas/day/g of precursor from 400 mg of gas/day/g of precursor to 600 mg of gas/day/g of precursor, from 0.1 mg of gas/day/g of precursor to 500 mg of gas/day/g of precursor, from 0.1 mg of gas/day/g of precursor to 100 mg of gas/day/g of precursor, or from 0.1 mg of gas/day/g of precursor to 60 mg of gas/day/g of precursor).

In any of the devices or methods disclosed herein, the absolute value of the pressure differential can, for example, be greater than 0 inches of water (e.g., 0.05 inches of water or more, 0.1 inches of water or more, 0.15 inches of water or more, 0.2 inches of water or more, 0.25 inches of water or more, 0.3 inches of water or more, 0.35 inches of water or more, 0.4 inches of water or more, 0.45 inches of water or more, 0.5 inches of water or more, 0.55 inches of water or more, 0.6 inches of water or more, 0.65 inches of water or more, 0.7 inches of water or more, 0.75 inches of water or more, 0.8 inches of water or more, 0.85 inches of water or more, 0.9 inches of water or more, 0.95 inches of water or more, 1 inches of water or more, 1.05 inches of water or more, 1.1 inches of water or more, 1.15 inches of water or more, 1.2 inches of water or more, 1.25 inches of water or more, 1.3 inches of water or more, 1.35 inches of water or more, 1.4 inches of water or more, or 1.45 inches of water or more). In some examples, the absolute value of the pressure differential can, for example, be 1.5 inches of water or less (e.g., 1.45 inches of water or less, 1.4 inches of water or less, 1.35 inches of water or less, 1.3 inches of water or less, 1.25 inches of water or less, 1.2 inches of water or less, 1.15 inches of water or less, 1.1 inches of water or less, 1.05 inches of water or less, 1 inches of water or less, 0.95 inches of water or less, 0.9 inches of water or less, 0.85 inches of water or less, 0.8 inches of water or less, 0.75 inches of water or less, 0.7 inches of water or less, 0.65 inches of water or less, 0.6 inches of water or less, 0.55 inches of water or less, 0.5 inches of water or less, 0.45 inches of water or less, 0.4 inches of water or less, 0.35 inches of water or less, 0.3 inches of water or less, 0.25 inches of water or less, 0.2 inches of water or less, 0.15 inches of water or less, 0.1 inches of water or less, or 0.05 inches of water or less). The absolute value of the pressure differential can range from any of the minimum values described above to any of the maximum values described above. For example, the absolute value of the pressure differential can be from greater than 0 to 1.5 inches of water (e.g., from greater than 0 to 0.75 inches of water, from 0.75 to 1.5 inches of water, from greater than 0 to 0.5 inches of water, from 0.5 to 1 inches of water, from 1 to 1.5 inches of water, from greater than 0 to 1.25 inches of water, from greater than 0 to 1 inches of water, from greater than 0 to 0.25 inches of water, from 0.1 to 1.5 inches of water, from 0.25 to 1.5 inches of water, from 0.5 to 1.5 inches of water, from 1.25 to 1.5 inches of water, from 0.1 to 1.4 inches of water, or from 0.25 to 1.25 inches of water).

In any of the devices or methods disclosed herein, the absolute value of the pressure differential can, for example, be greater than 0 pounds per square inch (psi) (e.g., 0.001 psi or more, 0.002 psi or more, 0.003 psi or more, 0.004 psi or more, 0.005 psi or more, 0.006 psi or more, 0.007 psi or more, 0.008 psi or more, 0.009 psi or more, 0.010 psi or more, 0.011 psi or more, 0.012 psi or more, 0.013 psi or more, 0.014 psi or more, 0.015 psi or more, 0.016 psi or more, 0.017 psi or more, 0.018 psi or more, 0.019 psi or more, 0.020 psi or more, 0.021 psi or more, 0.022 psi or more, 0.023 psi or more, 0.024 psi or more, 0.025 psi or more, 0.026 psi or more, 0.027 psi or more, 0.028 psi or more, 0.029 psi or more, 0.030 psi or more, 0.035 psi or more, 0.040 psi or more, 0.045 psi or more, 0.050 psi or more, 0.06 psi or more, 0.07 psi or more, 0.08 psi or more, 0.09 psi or more, 0.1 psi or more, 0.15 psi or more, 0.2 psi or more, 0.25 psi or more, 0.3 psi or more, 0.35 psi or more, 0.4 psi or more, 0.45 psi or more, 0.5 psi or more, 0.6 psi or more, 0.7 psi or more, 0.8 psi or more, or 0.9 psi or more). In some examples, the absolute value of the pressure differential can be 1 psi or less (e.g., 0.9 psi or less, 0.8 psi or less, 0.7 psi or less, 0.6 psi or less, 0.5 psi or less, 0.45 psi or less, 0.4 psi or less, 0.35 psi or less, 0.3 psi or less, 0.25 psi or less, 0.2 psi or less, 0.15 psi or less, 0.1 psi or less, 0.09 psi or less, 0.08 psi or less, 0.07 psi or less, 0.06 psi or less, 0.050 psi or less, 0.045 psi or less, 0.040 psi or less, 0.035 psi or less, 0.030 psi or less, 0.029 psi or less, 0.028 psi or less, 0.027 psi or less, 0.026 psi or less, 0.025 psi or less, 0.024 psi or less, 0.023 psi or less, 0.022 psi or less, 0.021 psi or less, 0.020 psi or less, 0.019 psi or less, 0.018 psi or less, 0.017 psi or less, 0.016 psi or less, 0.015 psi or less, 0.014 psi or less, 0.013 psi or less, 0.012 psi or less, 0.011 psi or less, 0.010 psi or less, 0.009 psi or less, 0.008 psi or less, 0.007 psi or less, 0.006 psi or less, 0.005 psi or less, 0.004 psi or less, 0.003 psi or less, or 0.002 psi or less). The absolute value of the pressure differential can range from any of the minimum values described above to any of the maximum values described above. For example, the absolute value of the pressure differential can be from greater than 0 to 1 psi (e.g., from greater than 0 to 0.5 psi, from 0.5 to 1 psi, from greater than 0 to 0.2 psi, from 0.2 to 0.4 psi, from 0.4 to 0.6 psi, from 0.6 to 0.8 psi, from 0.8 to 1 psi, from greater than 0 to 0.75 psi, from greater than 0 to 0.25 psi, from greater than 0 to 0.1 psi, from greater than 0 to 0.075 psi, from greater than 0 to 0.05 psi, from greater than 0 to 0.04 psi, from greater than 0 to 0.03 psi, from greater than 0 to 0.02 psi, from greater than 0 to 0.01 psi, from greater than 0 to 0.005 psi, from 0.001 to 1 psi, from 0.005 to 1 psi, from 0.01 to 1 psi, from 0.02 to 1 psi, from 0.03 to 1 psi, from 0.04 to 1 psi, from 0.05 to 1 psi, from 0.75 to 1 psi, from 0.1 to 1 psi, from 0.25 to 1 psi, from 0.75 to 1 psi, from 0.001 to 0.9 psi, or from 0.005 to 0.5 psi).

In some examples, the treatment zone in any of the devices or methods disclosed herein can have a volume of 0.1 cubic feet or more (e.g., 0.25 cubic feet or more, 0.5 cubic feet or more, 0.75 cubic feet or more, 1 cubic feet or more, 2 cubic feet or more, 3 cubic feet or more, 4 cubic feet or more, 5 cubic feet or more, 10 cubic feet or more, 15 cubic feet or more, 20 cubic feet or more, 25 cubic feet or more, 30 cubic feet or more, 35 cubic feet or more, 40 cubic feet or more, 45 cubic feet or more, 50 cubic feet or more, 55 cubic feet or more, 60 cubic feet or more, 65 cubic feet or more, 70 cubic feet or more, 75 cubic feet or more, 80 cubic feet or more, 85 cubic feet or more, 90 cubic feet or more, 95 cubic feet or more, 100 cubic feet or more, 125 cubic feet or more, 150 cubic feet or more, 175 cubic feet or more, 200 cubic feet or more, 225 cubic feet or more, 250 cubic feet or more, 300 cubic feet or more, 350 cubic feet or more, 400 cubic feet or more, 450 cubic feet or more, 500 cubic feet or more, 600 cubic feet or more, 700 cubic feet or more, 800 cubic feet or more, 900 cubic feet or more, 1000 cubic feet or more, 1250 cubic feet or more, 1500 cubic feet or more, 1750 cubic feet or more, 2000 cubic feet or more, 2250 cubic feet or more, 2500 cubic feet or more, 3000 cubic feet or more, 3500 cubic feet or more, 4000 cubic feet or more, 4500 cubic feet or more, 5000 cubic feet or more, 6000 cubic feet or more, or 7000 cubic feet or more). In some examples, the treatment zone can have a volume of 8000 cubic feet or less (e.g., 7000 cubic feet or less, 6000 cubic feet or less, 5000 cubic feet or less, 4500 cubic feet or less, 4000 cubic feet or less, 3500 cubic feet or less, 3000 cubic feet or less, 2500 cubic feet or less, 2250 cubic feet or less, 2000 cubic feet or less, 1750 cubic feet or less, 1500 cubic feet or less, 1250 cubic feet or less, 1000 cubic feet or less, 900 cubic feet or less, 800 cubic feet or less, 700 cubic feet or less, 600 cubic feet or less, 500 cubic feet or less, 450 cubic feet or less, 400 cubic feet or less, 350 cubic feet or less, 300 cubic feet or less, 250 cubic feet or less, 225 cubic feet or less, 200 cubic feet or less, 175 cubic feet or less, 150 cubic feet or less, 125 cubic feet or less, 100 cubic feet or less, 95 cubic feet or less, 90 cubic feet or less, 85 cubic feet or less, 80 cubic feet or less, 75 cubic feet or less, 70 cubic feet or less, 65 cubic feet or less, 60 cubic feet or less, 55 cubic feet or less, 50 cubic feet or less, 45 cubic feet or less, 40 cubic feet or less, 35 cubic feet or less, 30 cubic feet or less, 25 cubic feet or less, 20 cubic feet or less, 15 cubic feet or less, 10 cubic feet or less, 5 cubic feet or less, 4 cubic feet or less, 3 cubic feet or less, 2 cubic feet or less, 1 cubic feet or less, 0.75 cubic feet or less, 0.5 cubic feet or less, or 0.25 cubic feet or less). The volume of the treatment zone can range from any of the minimum values described above to any of the maximum values described above. For example, the treatment zone can have a volume of from 0.1 cubic feet to 8000 cubic feet (e.g., from 0.1 to 100 cubic feet, from 100 to 8000 cubic feet, from 0.1 to 1 cubic feet, from 1 to 10 cubic feet, from 10 to 100 cubic feet, from 100 to 1000 cubic feet, from 1000 to 8000 cubic feet, from 0.1 to 7000 cubic feet, from 0.1 to 6000 cubic feet, from 0.1 to 5000 cubic feet, from 0.1 to 2500 cubic feet, from 0.1 to 1000 cubic feet, from 0.1 to 750 cubic feet, from 0.1 to 500 cubic feet, from 0.1 to 250 cubic feet, from 0.1 to 100 cubic feet, from 0.1 to 75 cubic feet, from 0.1 to 50 cubic feet, from 0.1 to 25 cubic feet, from 0.1 to 10 cubic feet, from 0.1 to 1 cubic feet, from 0.5 to 8000 cubic feet, from 1 to 8000 cubic feet, from 5 to 8000 cubic feet, from 10 to 8000 cubic feet, from 25 to 8000 cubic feet, from 50 to 8000 cubic feet, from 75 to 8000 cubic feet, from 100 to 8000 cubic feet, from 250 to 8000 cubic feet, from 500 to 8000 cubic feet, from 750 to 8000 cubic feet, from 2500 to 8000 cubic feet, from 5000 to 8000 cubic feet, from 0.5 to 7000 cubic feet, from 1 to 5000 cubic feet, from 1 to 1000 cubic feet, from 1 to 100 cubic feet, from 1 to 85 cubic feet, from 5 to 80 cubic feet, from 5 to 55 cubic feet, or from 10 to 25 cubic feet).

In some examples, the devices can further be configured to recycle the treatment gas from the treatment zone. For example, a duct can be fluidly connected to the treatment zone and the reactor, the duct being configured to recycle the treatment gas from the treatment zone, for example as shown in FIG. 1 and FIG. 2. In some examples, the methods further comprise recycling the treatment gas from the treatment zone. For example, the treatment gas can be recycled such that any unreacted treatment gas can be reused when recycled.

In some examples, the device can further comprise a sensory control that incorporates feedback, feedforward, and/or time appropriate logic controllers, for example to control and/or adjust one or more parameters, such as the temperature of the treatment zone, the dose of the treatment gas, the relative velocity of the treatment gas, the time that the raw agricultural product is contacted with the treatment gas, the humidity in the treatment zone, or a combination thereof.

In some examples, the device can further comprise a computing device. Any of the methods disclosed herein can be carried out in whole or in part on one or more computing or processing devices.

Figure 6:
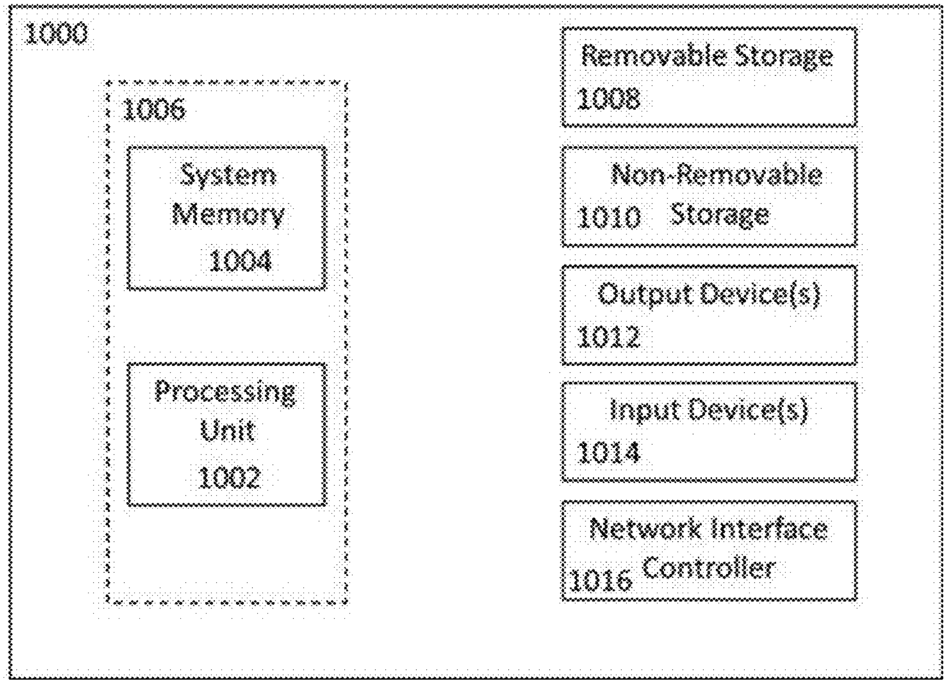
FIG. 6 is a schematic illustration of an example computing device.

FIG. 6 illustrates an example computing device 1000 upon which examples disclosed herein may be implemented. The computing device 1000 can include a bus or other communication mechanism for communicating information among various components of the computing device 1000. In its most basic configuration, computing device 1000 typically includes at least one processing unit 1002 (a processor) and system memory 1004. Depending on the exact configuration and type of computing device, system memory 1004 may be volatile (such as random access memory (RAM)), non-volatile (such as read-only memory (ROM), flash memory, etc.), or some combination of the two. This most basic configuration is illustrated in FIG. 6 by a dashed line 1006. The processing unit 1002 may be a standard programmable processor that performs arithmetic and logic operations necessary for operation of the computing device 1000.

The computing device 1000 can have additional features/functionality. For example, computing device 1000 may include additional storage such as removable storage 1008 and non-removable storage 1010 including, but not limited to, magnetic or optical disks or tapes. The computing device 1000 can also contain network connection(s) 1016 that allow the device to communicate with other devices. The computing device 1000 can also have input device(s) 1014 such as a keyboard, mouse, touch screen, antenna or other systems configured to communicate with the camera in the system described above, etc. Output device(s) 1012 such as a display, speakers, printer, etc. may also be included. The additional devices can be connected to the bus in order to facilitate communication of data among the components of the computing device 1000.

The processing unit 1002 can be configured to execute program code encoded in tangible, computer-readable media. Computer-readable media refers to any media that is capable of providing data that causes the computing device 1000 (i.e., a machine) to operate in a particular fashion. Various computer-readable media can be utilized to provide instructions to the processing unit 1002 for execution. Common forms of computer-readable media include, for example, magnetic media, optical media, physical media, memory chips or cartridges, a carrier wave, or any other medium from which a computer can read. Example computer-readable media can include, but is not limited to, volatile media, non-volatile media, and transmission media. Volatile and non-volatile media can be implemented in any method or technology for storage of information such as computer readable instructions, data structures, program modules or other data and common forms are discussed in detail below. Transmission media can include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 1002 can execute program code stored in the system memory 1004. For example, the bus can carry data to the system memory 1004, from which the processing unit 1002 receives and executes instructions. The data received by the system memory 1004 can optionally be stored on the removable storage 1008 or the non-removable storage 1010 before or after execution by the processing unit 1002.

The computing device 1000 typically includes a variety of computer-readable media. Computer-readable media can be any available media that can be accessed by device 1000 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media can be part of computing device 1000.

It should be understood that the various techniques described herein can be implemented in connection with hardware or software or, where appropriate, with a combination thereof. Thus, the methods, systems, and associated signal processing of the presently disclosed subject matter, or certain aspects or portions thereof, can take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs can implement or utilize the processes described in connection with the presently disclosed subject matter, e.g., through the use of an application programming interface (API), reusable controls, or the like. Such programs can be implemented in a high level procedural or object-oriented programming language to communicate with a computer system. However, the program(s) can be implemented in assembly or machine language, if desired. In any case, the language can be a compiled or interpreted language and it may be combined with hardware implementations.

In certain examples, the methods can be carried out in whole or in part on a computing device 1000 comprising a processor 1002 and a memory 1004 operably coupled to the processor 1002, the memory 1004 having further computer-executable instructions stored thereon that, when executed by the processor 1002, cause the processor 1002 to carry out one or more of the method steps described above.

In some examples, the device further comprises a computing device 1000 comprising a processor 1002 and a memory 1004 operably coupled to the processor, the memory further having computer-executable instructions stored thereon that, when executed by the processor, cause the processor to: receive a measurement from the sensory control and incorporate feedback, feedforward and/or time appropriate control of a parameter based thereon.

The examples below are intended to further illustrate certain aspects of the methods and compounds described herein and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in °C or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Example 1

Disclosed herein are devices and methods for controlled delivery of a treatment gas to treat a raw agricultural product, for example by contacting the raw agricultural product with the treatment gas. The methods and devices as disclosed herein can, for example, inhibit growth of organisms such as bacteria, fungi, viruses, etc. on the raw agricultural product; inhibit spoilage, rot, and/or decay of the raw agricultural product; or a combination thereof. The methods can devices disclosed herein can, for example, extend the shelf life and/or safety of the raw agricultural product, thus reducing food loss and waste.

The methods and devices as disclosed herein can select and/or vary parameters (e.g., air flow, temperature, relative humidity, concentration of the treatment gas, etc.) in view of a variety of factors (such as the identity of the raw agricultural product, the surface reactivity of the raw agricultural product, the number and/or arrangement of the raw agricultural product, or a combination thereof) in order to achieve the desired level of treatment with the treatment gas.

In some examples, the devices disclosed herein can comprise a display case, such as a display case designed to optimize shelf life, quality, safety, and/or presentation of a perishable item, such as a raw agricultural product. The devices and methods disclosed herein can, for example, control and/or adjust parameters such as temperature, relative humidity, air movement, air quality, or a combination thereof to achieve said optimization. Further, the devices and methods disclosed herein can, for example, use a gas releasing system that can optimize mass transfer of the treatment gas and increase the shelf life of the raw agricultural product using the lowest dose of the treatment gas.

For example, the methods and devices as disclosed herein can extend the shelf life and/or inhibit spoilage of fruits, vegetables, and/or other perishable items by uniform and controlled delivery of the treatment gas thereto. The devices and methods described herein can improve the efficiency of mass transfer of the treatment gas to the surface of the raw agricultural product. For example, the devices and methods described herein can control and/or adjust the relative concentration of the treatment gas, the relative velocity of the treatment gas, the rate of release of the treatment gas, the temperature, the pressure, the relative humidity, or a combination thereof in view of the raw agricultural product, for example in view of the surface condensation, surface area, surface contour, surface moisture content, volume, mass, or a combination thereof of the raw agricultural product.

The devices and methods disclosed herein can, in some examples, provide a constant dose of treatment gas around the raw agricultural product wherein the devices and/or methods control and/or adjust one or more parameters to optimize the opportunity of the treatment gas to condense on the surface of the raw agricultural product to thereby treat the raw agricultural product.

Example 2

Eighteen clamshells of strawberries (each clamshell containing 8 berries) were stacked on the device, in two layers (9 clamshells in each layer). The bottom layer (e.g., layer on the distribution grate (e.g., the perforated portion of the interior surface)) included containers 1-9 and the top layer included containers 10-18, where all containers except 5, 6, 14, and 15 were located at the edge/perimeter of the treatment zone. Containers 5 and 6 on the bottom layer were surrounded by other containers on 5 sides. Containers 14 and 15 were stacked on top of containers 5 and 6.

The 18 clamshells were treated with 150 grams of a linear $ClO_2$ releasing media, which produces $ClO_2$ at a constant rate of 0.001 mg/minute.

Figure 7:
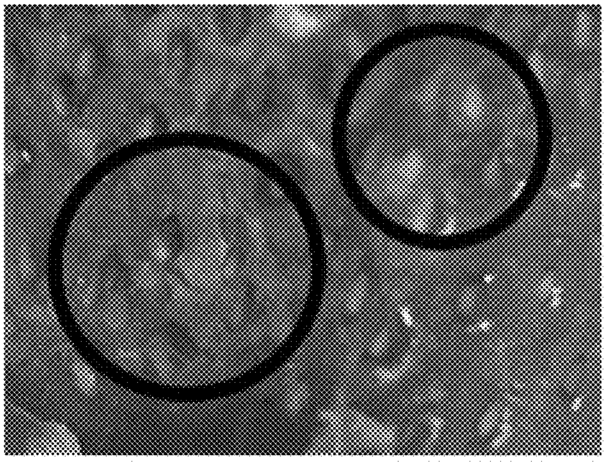
FIG. 7 is a photograph of an example strawberry showing small specks of mold (ranked 1 on the mold development scale).
Figure 8:
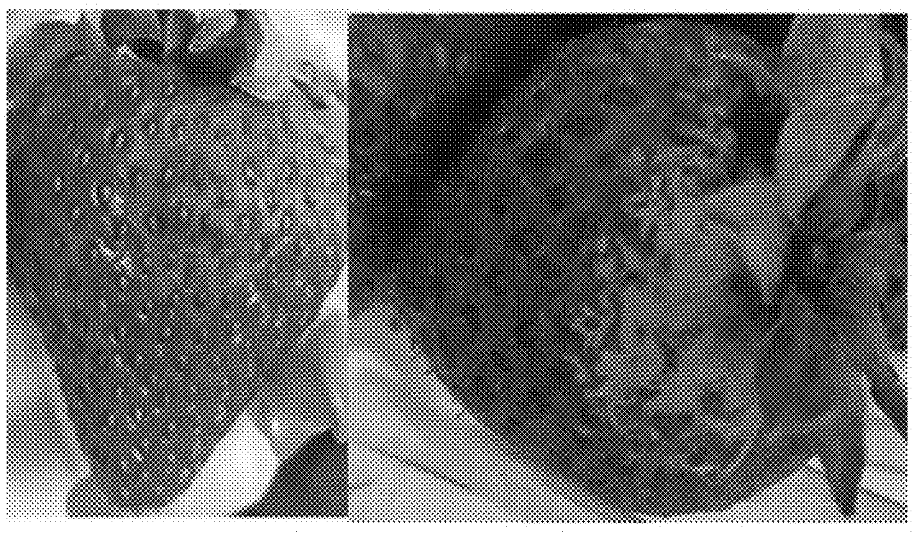
FIG. 8 shows photographs of example strawberries showing mold patches about 2 cm or larger in diameter (ranked 2 on the mold development scale).
Figure 9:
FIG. 9 is a photograph showing example strawberries covered by green, black, and/or white mold (ranked 3 on the mold development scale).

As a control, three clamshells of strawberries (each containing 8 berries) were not exposed to the $ClO_2$ from the device. All the clamshells were then monitored for a total of 5 days. The clamshells were inspected for mold each day and graded for mold development. The scale for mold development was: 0—no mold; 1—small specks of green, black, and/or white mold (FIG. 7); 2—green, black, and/or white mold patches about 2 cm or larger in diameter (FIG. 8); and 3—berry covered by green, black, and/or white mold, berries have "deflated" appearance, and/or strong musty odor (FIG. 9).

At day 1, none of the 18 treated clamshells nor the 3 control clamshells showed any mold (all clamshells=0 on the mold development scale).

Figure 10:
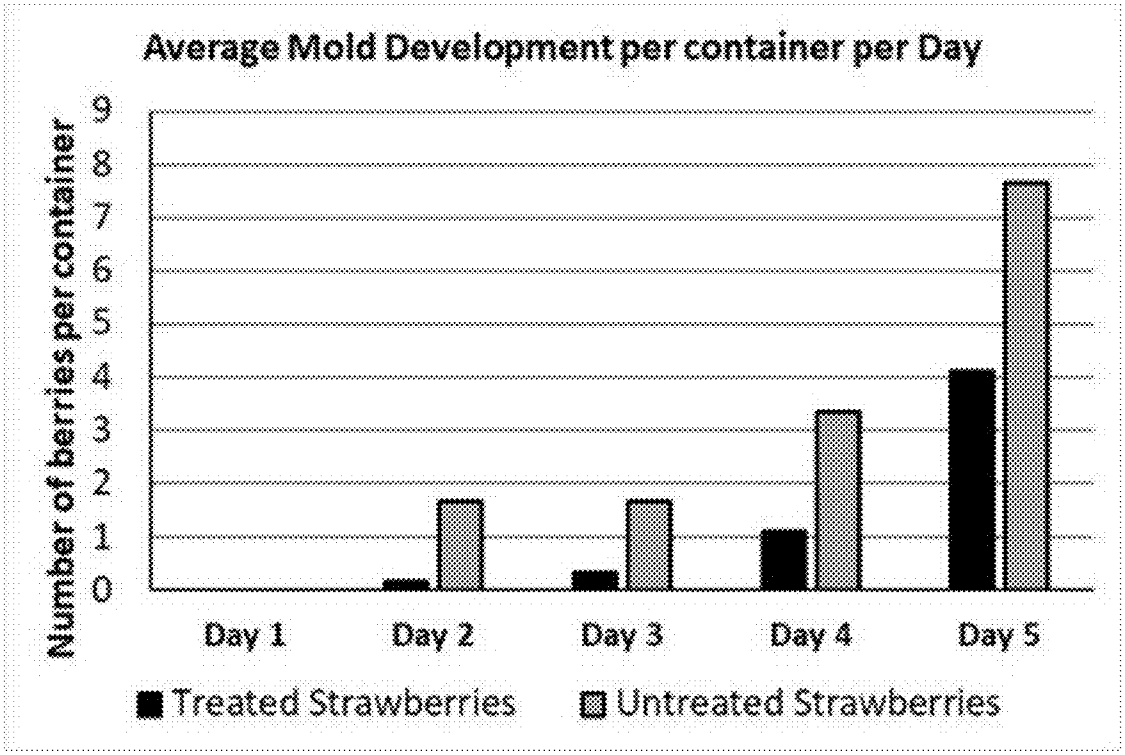
FIG. 10 shows the average mold development per container of strawberries per day.

The mold development at day 2-day 5 are summarized in Table 2-Table 5 below, respectively. At day 5, almost all of the berries in the control containers had molded. The results are further summarized in FIG. 10.

For the treated clamshells, mold development appeared in the outer containers first (located at the edge/perimeter) relative to the center. Further, there was less development in the containers located on the bottom layer (closest to the grate/perforations and airflow) than the top layer.

TABLE 2

Strawberry clamshells, mold results, Day 2.

| Day: 2 | Container # (8 berries each) | # of Molded Berries Ranked by Mold Development 0 | 1 | 2 | 3 | Total molded berries per container |
|---|---|---|---|---|---|---|
| Layer 1 (Bottom) | 1 | 8 | | | | 0 |
| | 2 | 8 | | | | 0 |
| | 3 | 8 | | | | 0 |
| | 4 | 8 | | | | 0 |
| | 5 | 8 | | | | 0 |
| | 6 | 8 | | | | 0 |
| | 7 | 7 | 1 | | | 1 |
| | 8 | 8 | | | | 0 |
| | 9 | 8 | | | | 0 |

TABLE 2-continued

Strawberry clamshells, mold results, Day 2.

| Day: 2 | Container # (8 berries each) | # of Molded Berries Ranked by Mold Development 0 | 1 | 2 | 3 | Total molded berries per container |
|---|---|---|---|---|---|---|
| Layer 2 (Top) | 10 | 7 | 1 | | | 1 |
| | 11 | 8 | | | | 0 |
| | 12 | 8 | | | | 0 |
| | 13 | 8 | | | | 0 |
| | 14 | 8 | | | | 0 |
| | 15 | 8 | | | | 0 |
| | 16 | 8 | | | | 0 |
| | 17 | 7 | 1 | | | 1 |
| | 18 | 8 | | | | 0 |
| Controls | 1 | 7 | 1 | | | 1 |
| | 2 | 6 | | 2 | | 2 |
| | 3 | 6 | 2 | | | 2 |

TABLE 3

Strawberry clamshells, mold results, Day 3.

| Day: 3 | Container # (8 berries each) | # of Molded Berries Ranked by Mold Development 0 | 1 | 2 | 3 | Total molded berries per container |
|---|---|---|---|---|---|---|
| Layer 1 (Bottom) | 1 | 8 | | | | 0 |
| | 2 | 8 | | | | 0 |
| | 3 | 7 | 1 | | | 1 |
| | 4 | 8 | | | | 0 |
| | 5 | 8 | | | | 0 |
| | 6 | 8 | | | | 0 |
| | 7 | 7 | 1 | | | 1 |
| | 8 | 8 | | | | 0 |
| | 9 | 8 | | | | 0 |
| Layer 2 (Top) | 10 | 6 | 2 | | | 2 |
| | 11 | 8 | | | | 0 |
| | 12 | 8 | | | | 0 |
| | 13 | 8 | | | | 0 |
| | 14 | 8 | | | | 0 |
| | 15 | 8 | | | | 0 |
| | 16 | 8 | | | | 0 |
| | 17 | 7 | 1 | | | 1 |
| | 18 | 7 | 1 | | | 1 |
| Controls | 1 | 7 | 1 | | | 1 |
| | 2 | 6 | | 2 | | 2 |
| | 3 | 6 | 1 | 1 | | 2 |

TABLE 4

Strawberry clamshells, mold results, Day 4.

| Day: 4 | Container # (8 berries each) | # of Molded Berries Ranked by Mold Development 0 | 1 | 2 | 3 | Total molded berries per container |
|---|---|---|---|---|---|---|
| Layer 1 (Bottom) | 1 | 8 | | | | 0 |
| | 2 | 8 | | | | 0 |
| | 3 | 6 | 1 | 1 | | 2 |
| | 4 | 8 | | | | 0 |
| | 5 | 8 | | | | 0 |
| | 6 | 8 | | | | 0 |
| | 7 | 5 | 2 | 1 | | 3 |
| | 8 | 8 | | | | 0 |
| | 9 | 8 | | | | 0 |
| Layer 2 (Top) | 10 | 6 | | 2 | | 2 |
| | 11 | 6 | 2 | | | 2 |
| | 12 | 6 | 2 | | | 2 |
| | 13 | 6 | 1 | 1 | | 2 |
| | 14 | 8 | | | | 0 |
| | 15 | 7 | 1 | | | 1 |

TABLE 4-continued

Strawberry clamshells, mold results, Day 4.

| Day: 4 | Container # (8 berries each) | # of Molded Berries Ranked by Mold Development 0 | 1 | 2 | 3 | Total molded berries per container |
|---|---|---|---|---|---|---|
| | 16 | 7 | | 1 | | 1 |
| | 17 | 5 | 2 | 1 | | 3 |
| | 18 | 6 | 1 | 1 | | 2 |
| Controls | 1 | 6 | 2 | | | 2 |
| | 2 | 4 | 2 | 2 | | 4 |
| | 3 | 4 | 1 | 2 | 1 | 4 |

TABLE 5

Strawberry clamshells, mold results, Day 5.

| Day: 5 | Container # (8 berries each) | # of Molded Berries Ranked by Mold Development 0 | 1 | 2 | 3 | Total molded berries per container |
|---|---|---|---|---|---|---|
| Layer 1 | 1 | 6 | | 2 | | 2 |
| (Bottom) | 2 | 8 | | | | 0 |
| | 3 | 4 | 1 | | 3 | 4 |
| | 4 | 4 | 1 | | 3 | 4 |
| | 5 | 6 | 2 | | | 2 |
| | 6 | 6 | 1 | 1 | | 2 |
| | 7 | 3 | 1 | 1 | 3 | 5 |
| | 8 | 5 | | 2 | 1 | 3 |
| | 9 | 4 | 1 | 2 | 1 | 4 |
| Layer 2 | 10 | | | 5 | 3 | 8 |
| (Top) | 11 | | 1 | 2 | 5 | 8 |
| | 12 | 4 | | 2 | 2 | 4 |
| | 13 | 1 | | 1 | 6 | 7 |
| | 14 | 8 | | | | 0 |
| | 15 | 3 | 2 | 2 | 1 | 5 |
| | 16 | 1 | 1 | 3 | 3 | 7 |
| | 17 | 3 | 1 | 3 | 1 | 5 |
| | 18 | 4 | | 2 | 2 | 4 |
| Controls | 1 | 1 | 1 | 2 | 4 | 7 |
| | 2 | | 1 | 4 | 3 | 8 |
| | 3 | | 2 | 1 | 4 | 8 |

Example 3

Several experiments were performed with potatoes.

Potatoes were stacked on the device. The height of the stack is measured from the surface of the distribution grate (e.g., the perforated portion of the interior surface) to the top of the highest stacked potato. Certain potatoes were specifically wounded and used as indicators. Specifically, 4 wounds were introduced per potato—one wound was made at each end of the potato, one wound was made on the bottom (side facing the distribution grate), and one wound was made on the top. Wounds were less than 0.5 centimeters deep.

The potatoes were then treated with chlorine dioxide within the treatment zone.

Four to five drops of potassium iodide (KI) were placed in each potato wound and color changes were observed after the chlorine dioxide treatment, where color change is indicative of $ClO_2$ condensing.

The potatoes were examined and photographed 3-5 hours after the $ClO_2$ treatment.

Figure 11:
FIG. 11 is a photograph of the stack of potatoes for the first test, with the locations of the six wounded potatoes shown. The stack height was ~4.5 inches for 2-3 layers of potatoes.
Figure 12:
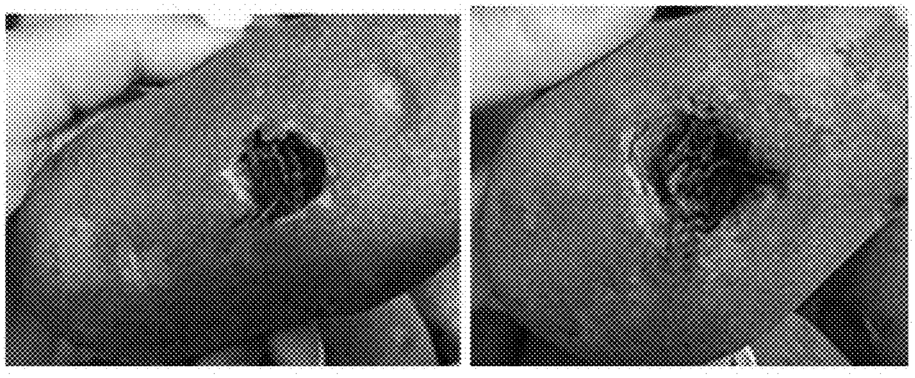
FIG. 12 shows photographs of example potato wounds facing the grate, which showed the darkest color change (black) after the chlorine dioxide treatment in the first test.
Figure 13:
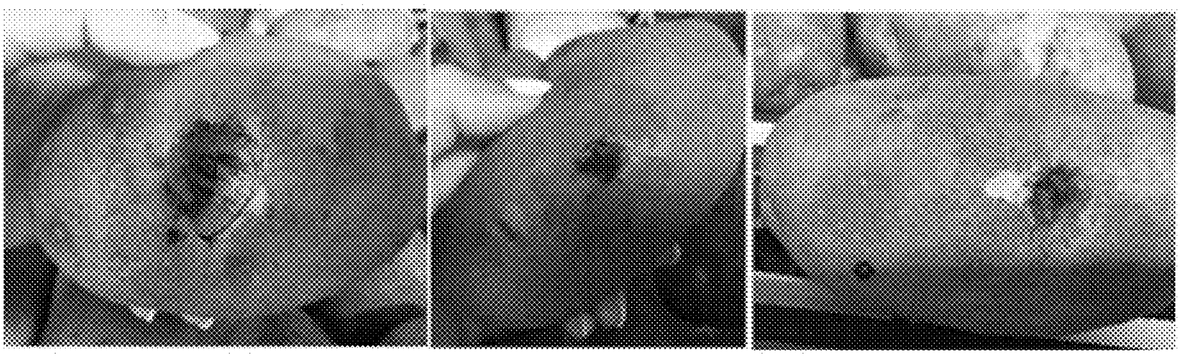
FIG. 13 shows photographs of example potato wounds facing upward facing and end wounds, which also became dark purple after the chlorine dioxide treatment in the first test.

A photograph of the stack of potatoes for the first test is shown in FIG. 11, with the locations of the six wounded potatoes shown. The stack height was ~4.5 inches for 2-3 layers of potatoes. For this test, the potatoes were treated using media that produces 0.3 milligrams (mg) of $ClO_2$ per minute over 24 hours. After the chlorine dioxide treatment, it was observed that potatoes on the bottom stack showed the darkest color change. Further, wounds facing the grate shows the darkest color change (black) (FIG. 12), but upward facing and end wounds also became dark purple (FIG. 13).

Figure 14:
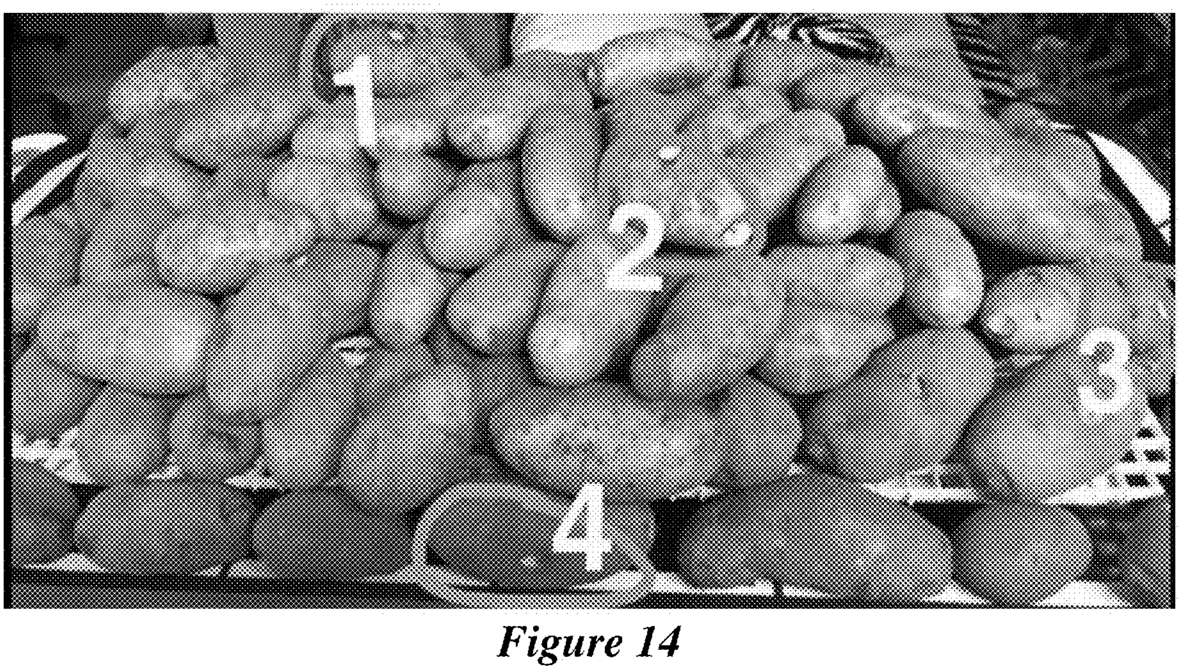
FIG. 14 is a photograph of the stack of potatoes for the second test, with the locations of the four wounded potatoes shown. The stack height was 7.5-8 inches for 4-5 layers of potatoes.
Figure 15:
FIG. 15 is a photograph of potato #1, located at the top of the stack/treatment zone, which showed only a slight color change around the edge of the wounds after the chlorine dioxide treatment in the second test.
Figure 16:
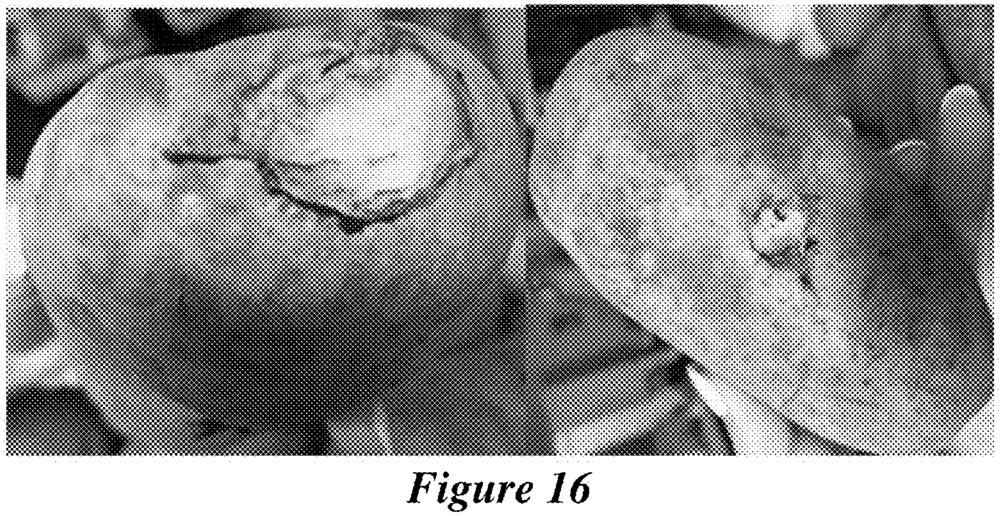
FIG. 16 shows photographs of potato #2, located at the top of the stack/treatment zone, which showed only a slight color change around the edge of the wounds after the chlorine dioxide treatment in the second test.
Figure 17:
FIG. 17 shows photographs of potato #3, located on the right side of the treatment zone and located on the distribution plate, which showed the most significant color change after the chlorine dioxide treatment in the second test.
Figure 18:
FIG. 18 shows photographs of potato #4, located at the front of the treatment zone next to the distribution plate, which did not show any significant color changes after the chlorine dioxide treatment in the second test.

A photograph of the stack of potatoes for the second test is shown in FIG. 14, with the locations of the four wounded potatoes shown. The stack height was 7.5-8 inches for 4-5 layers of potatoes. For this test, the potatoes were treated with using media that produces 0.3 milligrams (mg) of $ClO_2$ per minute over 24 hours. After the chlorine dioxide treatment, it was observed that the potatoes on the 4-5$^{th}$ layers, Potatoes #1 and #2, showed only a slight color change around the edge of the wounds (FIG. 15 and FIG. 16, respectively). Potato #3 on the right side of the treatment zone and located on the distribution plate showed the most significant color change (FIG. 17). Potato #4 at the front of the treatment zone next to the distribution plate did not show any significant color changes (FIG. 18).

Figure 19:
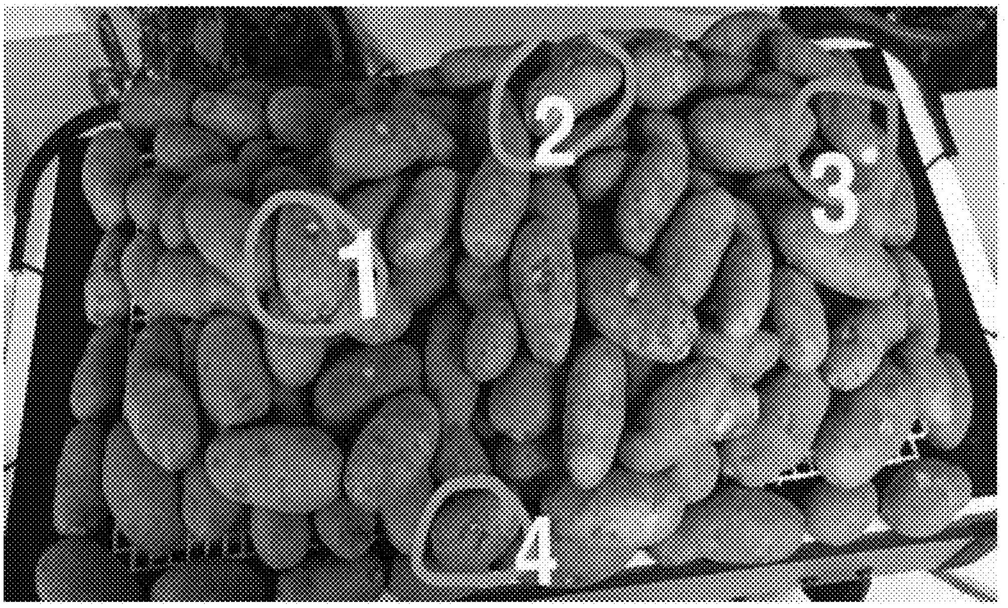
FIG. 19 is a photograph of the stack of potatoes for the third test, with the locations of the four wounded potatoes shown. The stack height was 7.5 inches for 4 layers of potatoes.
Figure 20:
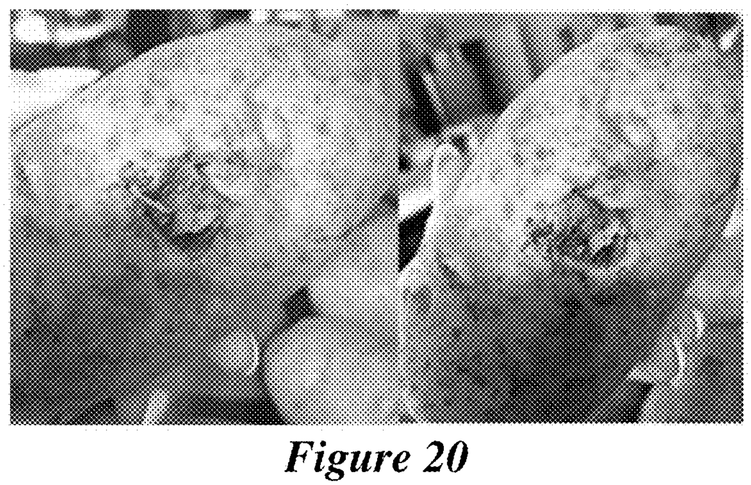
FIG. 20 shows photographs of potato #1, which showed significant color change after the chlorine dioxide treatment in the third test.
Figure 21:
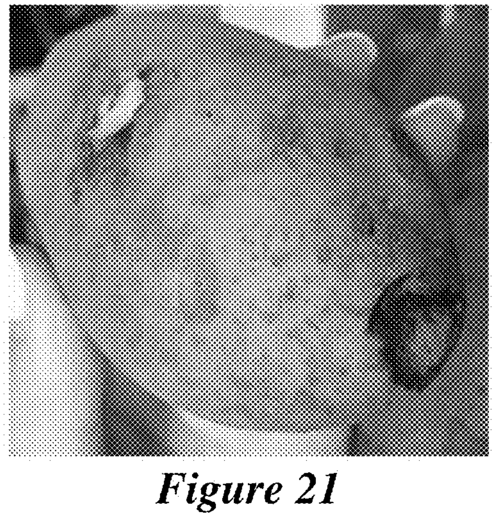
FIG. 21 is a photograph of potato #3, which showed significant color change after the chlorine dioxide treatment in the third test.
Figure 22:
FIG. 22 shows photographs of potato #2, which showed darkening around the edge of its wounds after the chlorine dioxide treatment in the third test.
Figure 23:
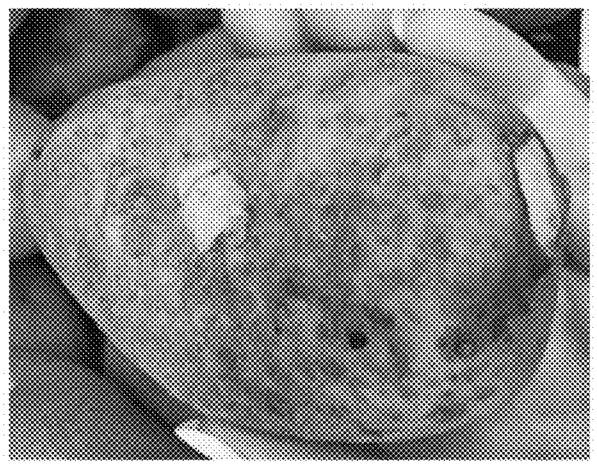
FIG. 23 is a photograph of potato #4, which did not show significant color changes after the chlorine dioxide treatment in the third test.

A photograph of the stack of potatoes for the third test is shown in FIG. 19, with the locations of the four wounded potatoes shown. The stack height was 7.5 inches for 4 layers of potatoes. For this test, the potatoes were treated using media that produces 0.2 mg of $ClO_2$ per minute over 24 hours. After the chlorine dioxide treatment, it was observed that potatoes #1 and #3 showed the most significant color changes (FIG. 20 and FIG. 21, respectively). Potato #2 showed darkening around the edge of its wounds (FIG. 22). Potato #4 did not show significant color changes (FIG. 23).

Figure 24:
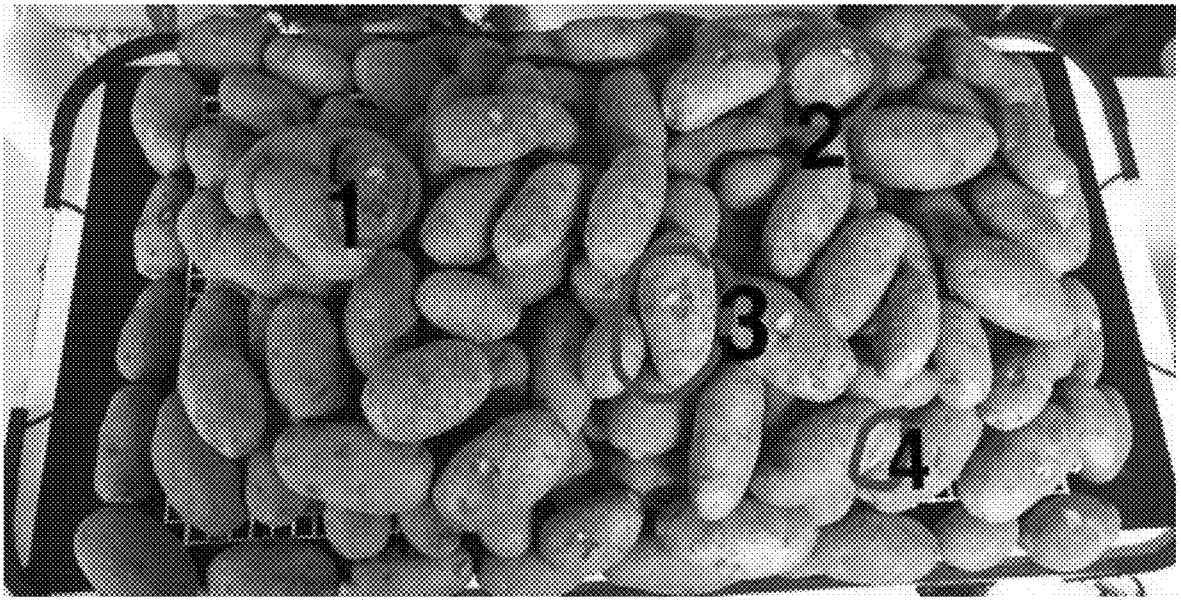
FIG. 24 is a photograph of the stack of potatoes for the fourth test, with the locations of the four wounded potatoes shown. The stack height was 7.5-8 inches for 4-5 layers of potatoes.
Figure 25:
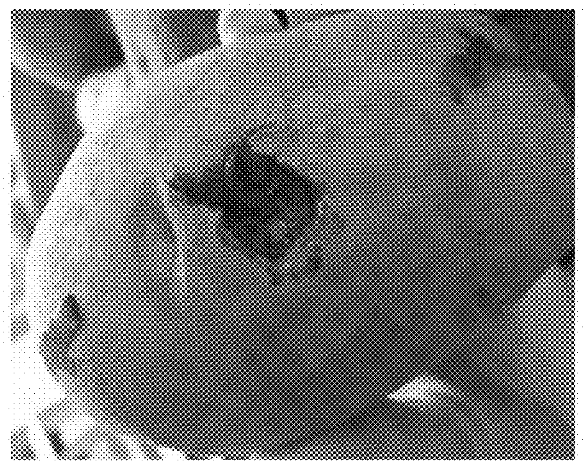
FIG. 25 is a photograph of the bottom wound of potato #3, located at the top of the stack, which showed the darkest color change after the chlorine dioxide treatment in the fourth test.
Figure 26:
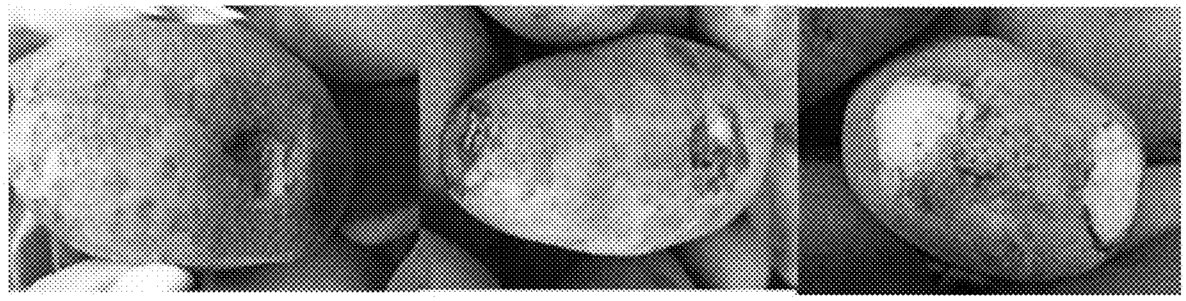
FIG. 26 shows photographs of the other three potatoes, which did not show significant color changes after the chlorine dioxide treatment in the fourth test.

A photograph of the stack of potatoes for the fourth test is shown in FIG. 24, with the locations of the four wounded potatoes shown. The stack height was 7.5-8 inches for 4-5 layers of potatoes. For this test, the potatoes were treated using media that produces 0.35 mg of $ClO_2$ per minute over 24 hours. After the chlorine dioxide treatment, the darkest color change was seen on the bottom wound of potato #3 (FIG. 25); potato #3 was located at the top of the stack. The other three potatoes did not show significant color changes (FIG. 26).

Figure 27:
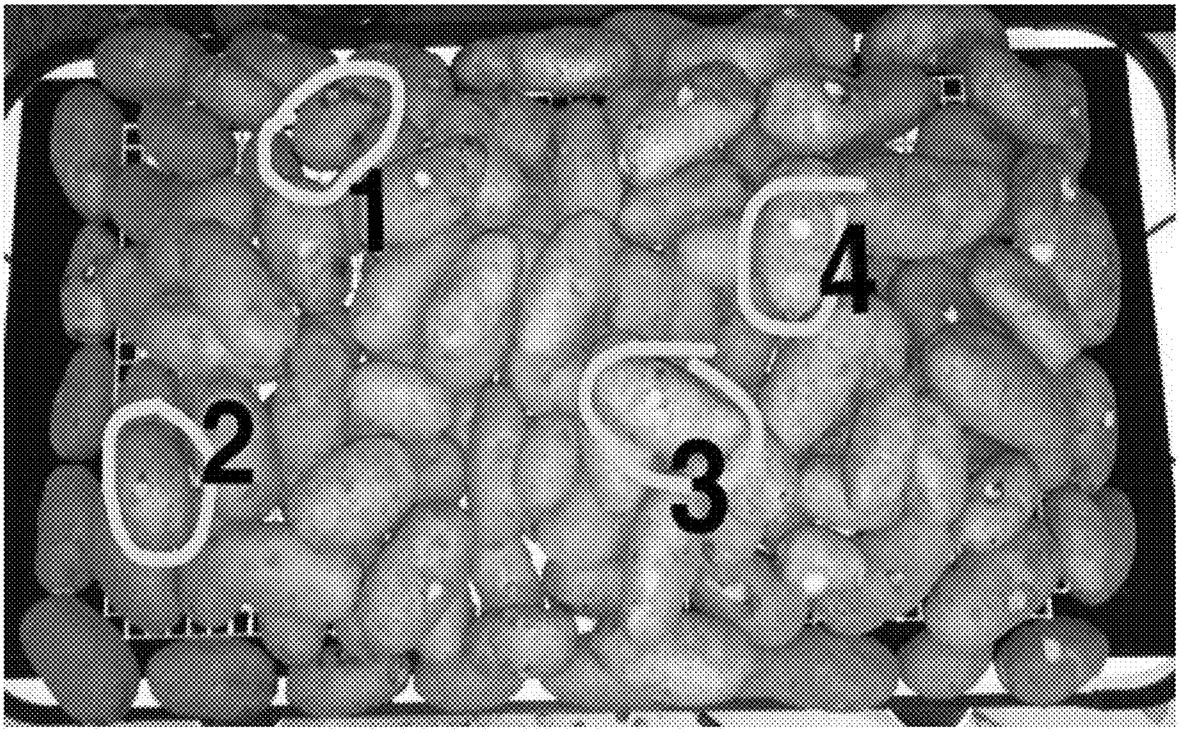
FIG. 27 is a photograph of the stack of potatoes for the fifth test (top down view), with the locations of the four wounded potatoes shown.
Figure 28:
FIG. 28 is a photograph of the stack of potatoes for the fifth test (side view). The stack 5 height was 7.5 inches for 4 layers of potatoes.
Figure 29:
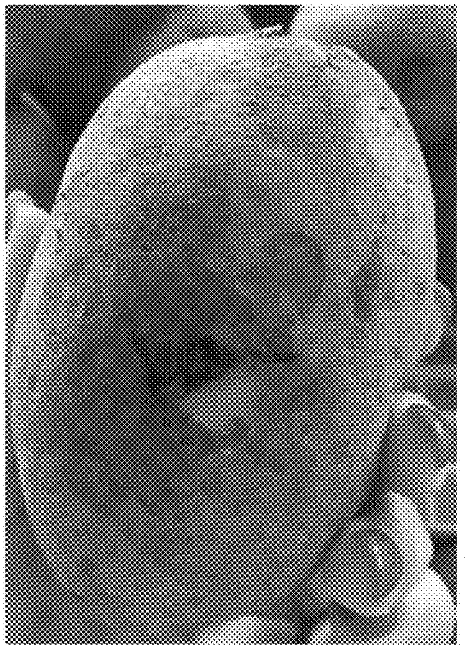
FIG. 29 is a photograph of potato #1, located on the distribution plate; its wounds only had slight color changes after the chlorine dioxide treatment in the fifth test.
Figure 30:
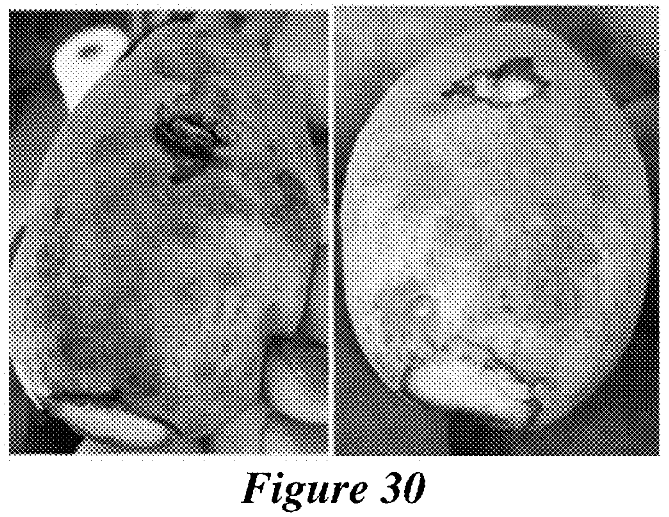
FIG. 30 shows photographs of potato #2, located on the second layer from the distribution plate; its bottom wound was the darkest after the chlorine dioxide treatment in the fifth test.
Figure 31:
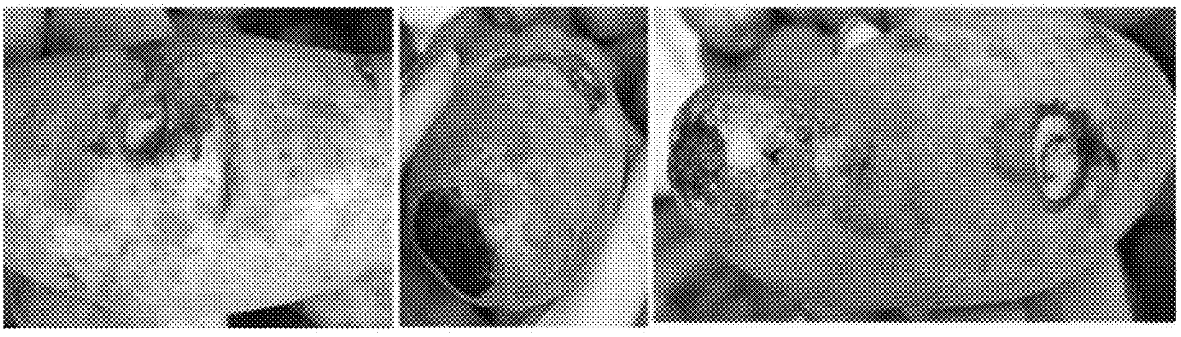
FIG. 31 shows photographs of potato #3, located on the third layer from the distribution plate; its end wounds showed the darkest color change after the chlorine dioxide treatment in the fifth test.
Figure 32:
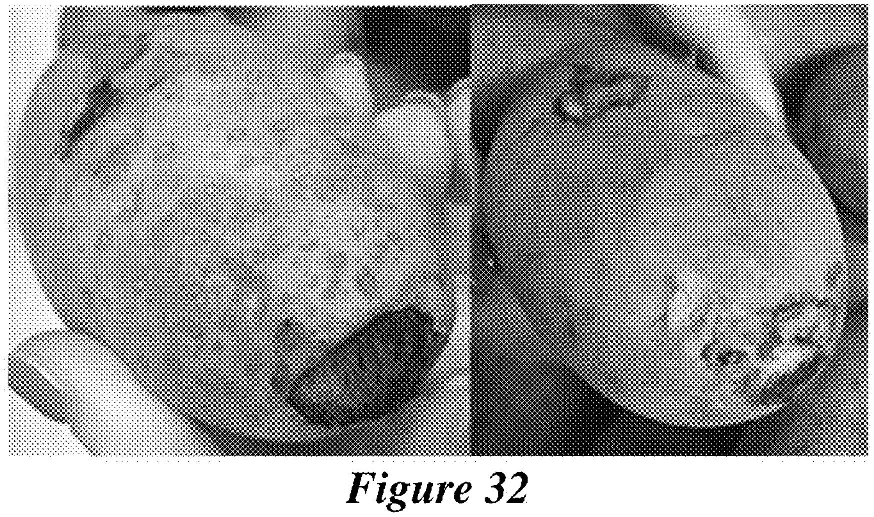
FIG. 32 shows photographs of potato #4, located on the fourth layer from the distribution plate; its bottom and side wounds showed significant color change, while the upward facing wound showed a slight color change after the chlorine dioxide treatment in the fifth test.

A photograph of the stack of potatoes for the fifth test is shown in FIG. 27 (top down view), with the locations of the four wounded potatoes shown. A side view of the stack of potatoes is shown in FIG. 28. The stack height was 7.5 inches for 4 layers of potatoes. For this test, the potatoes were treated using media that releases 0.4 mg of $ClO_2$ per minute over 24 hours. Potato #1 was located on the distribution plate and its wounds only had slight color changes (FIG. 29). Potato #2 was located on the second layer from the distribution plate and its bottom wound was the darkest (FIG. 30). Potato #3 was located on the third layer from the distribution plate and its end wounds showed the darkest color change (FIG. 31). Potato #4 was located on the fourth layer from the distribution plate and its wounds show significant color change in the bottom and side wounds, with a slight color change in the upward facing wound (FIG. 32).

Example 4

Figure 33:
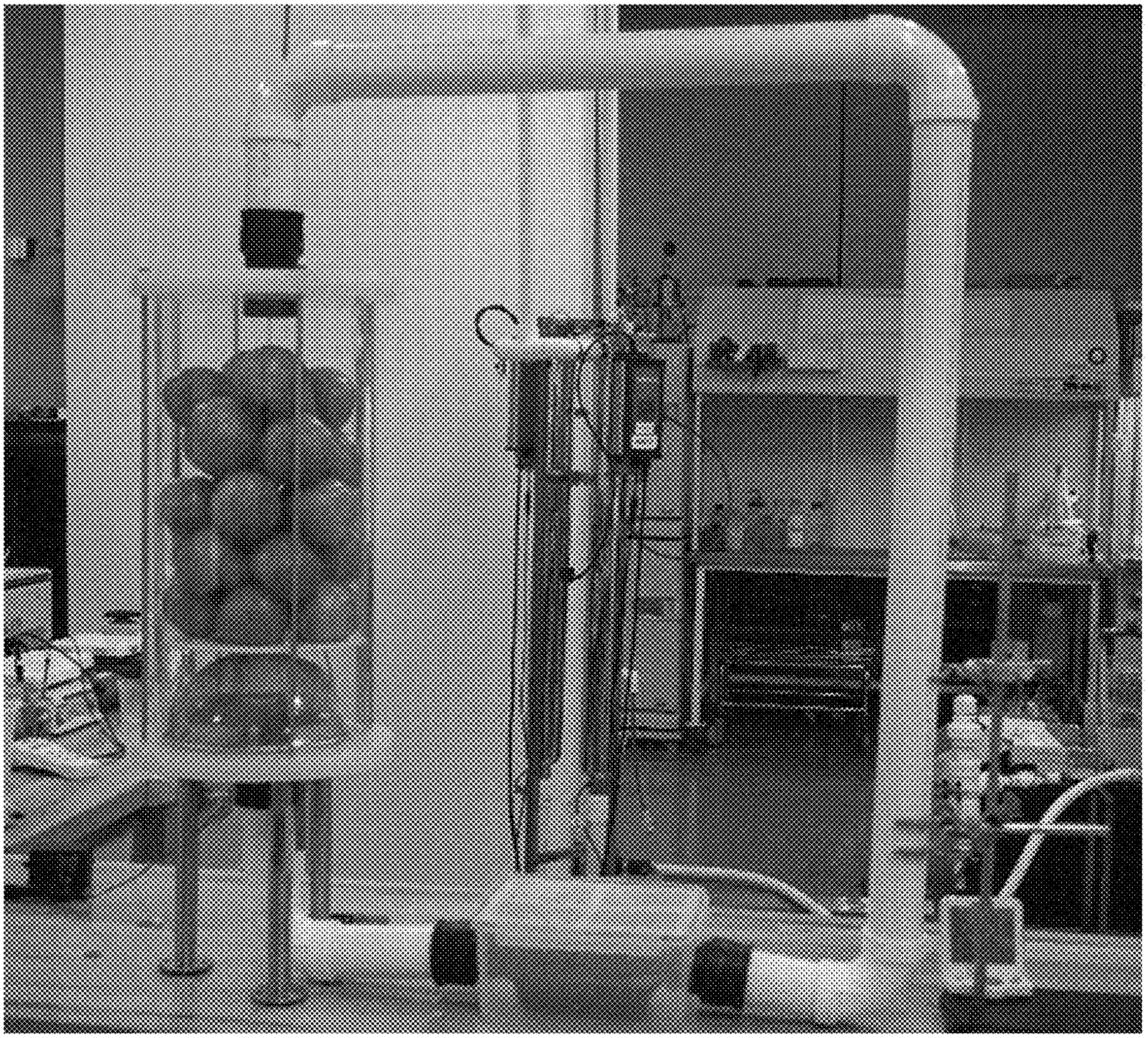
FIG. 33 is a photograph of an example device.
Figure 34:
FIG. 34 is a photograph of an example device loaded with potatoes.
Figure 35:
FIG. 35 is a photograph of an example device loaded with potatoes.
Figure 36:
FIG. 36 is a photograph of an example device loaded with potatoes.

A photograph of an example device is shown in FIG. 33. Experiments were run using a device similar to that shown in FIG. 33 to test the distribution of $ClO_2$ through potatoes (FIG. 34-FIG. 36). The device in this example is a column with $ClO_2$ entering the bottom through a fan and a distributor plate. Certain potatoes loaded in the device were wounded (as described above) and the wounds were treated with KI so that a color change is indicative of $ClO_2$ condensing.

Example 5

Further experiments with different raw agricultural products were performed using a device such as the one shown in FIG. 33. The column was 10 inches in diameter and 17 inches tall. The fan sits below the bed and takes up about 5 inches of the column height, so the treatment zone is 10 inches in diameter and 12 inches tall.

The air flows into the bottom carrying a charge or constant level of chlorine dioxide gas. The column has a perforated distributor plate to help the flow of chlorine dioxide gas cover the cross section of the column.

The column was then loaded with the items to be tested. The items are preferably stacked in bulk, but the column can also be loaded with items within another packaging material.

Figure 37:
FIG. 37 is a photograph of an example device loaded with strawberries; potatoes treated with potassium iodide (KI) were used as indicators/chemical coupons.
Figure 38:
FIG. 38 is a photograph of an example device loaded with potatoes.
Figure 39:
FIG. 39 is a photograph of an example device loaded with tomatoes; potatoes treated with KI were used as indicators/chemical coupons.
Figure 40:
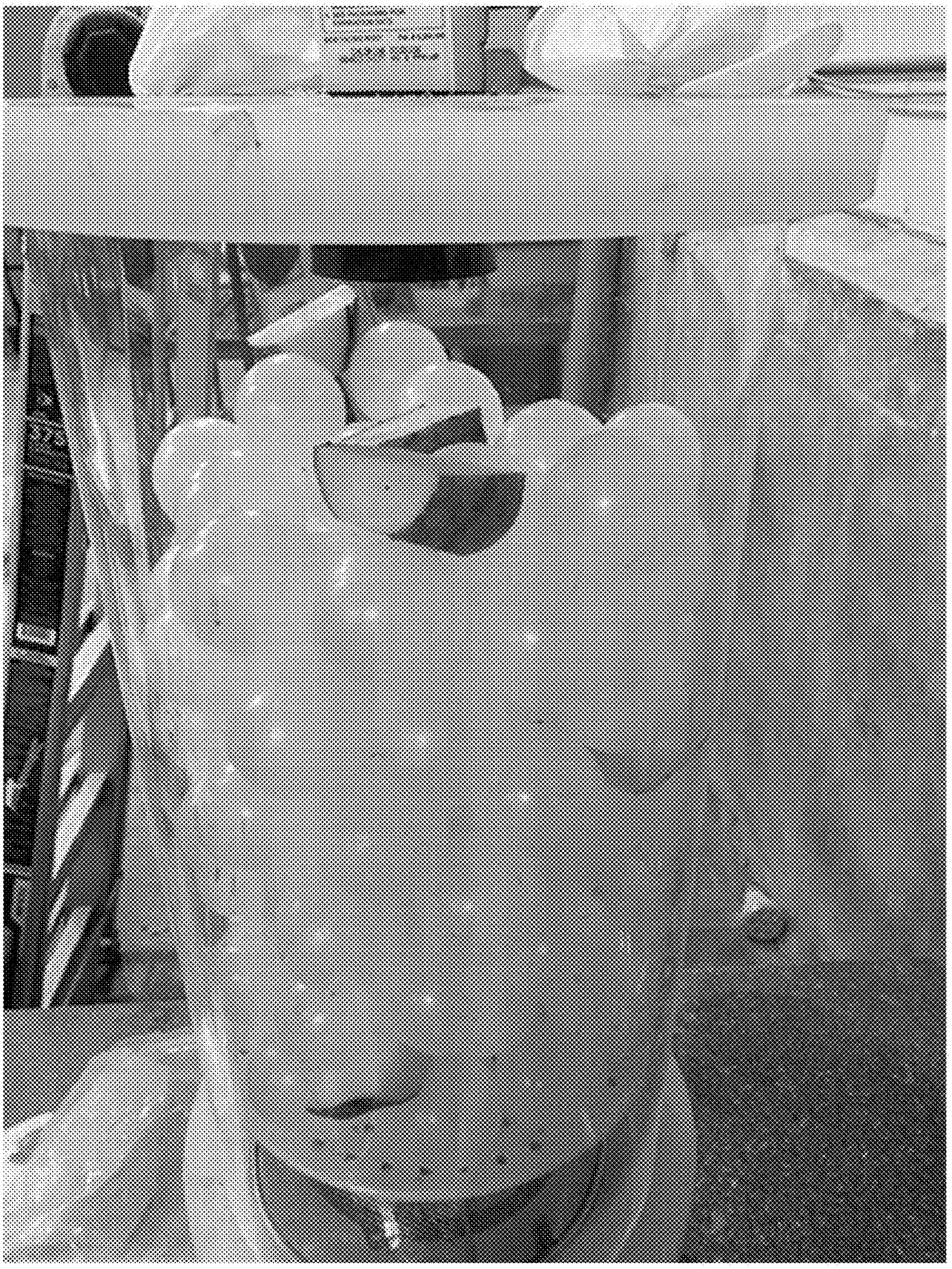
FIG. 40 is a photograph of an example device loaded with unreactive balls; potatoes treated with KI were used as indicators/chemical coupons.

The raw agricultural products were of different sizes and different surface reactivities. As a control, unreactive balls were used. The reactivity of the surfaces ranged on a scale of from 0 (unreactive) to 5 (highly reactive). The different items tested were strawberries (surface reactivity: 5) (FIG. 37), broccoli (surface reactivity: 4), potatoes (surface reactivity: 3) (FIG. 38), tomatoes (surface reactivity: 3) (FIG. 39), grapes (surface reactivity: 2), onion (surface reactivity: 2), avocados (surface reactivity: 2), and balls (surface reactivity: 0, control) (FIG. 40).

Further, the raw agricultural products were tested with different doses and relative velocities.

The relative velocity was tested at two conditions, "low" and "high", which were controlled by a fan at the base of the unit. The relative velocity was tested in an empty column. The "high" rate was 0.14 fps and the "low" rate was 0.07 fps.

The dose was tested at two conditions, "low" and "high." For the "low" condition, $ClO_2$ was generated at a rate of 0.007 milligrams of per hour over 24 hours. For the "high" condition, $ClO_2$ was generated at a rate of 0.07 mg per hour over 24 hours. Thus, the "high" dose is greater than the "low" does by an order of magnitude.

The tests were performed over 1 hour such that the inlet concentrations are relatively constant.

$ClO_2$ breakthrough out of the top of the column was measured using a potato (break through time (potato) in tables below) as well as a chemical indicator coupon (break through time (paper) in tables below). In the tables below, breakthrough time (!) is the time at which $ClO_2$ reached the column outlet and is a measure of residence time in a single pass column.

Chemical coupons (highly/most reactive surface) were placed radially and vertically in the produce pile to assess the distribution of $ClO_2$ through the packed column. The uniformity of the treatment gas distribution was rated using the color of the coupons.

In general, at the end of the experiments coupons radially at a given level were very consistent in absorption of $ClO_2$. Accordingly, the results for the coupons given in the tables are the average result for all the radial coupons at a given vertical location: bottom, middle, or top. The closer the number is to 10, the more even the distribution.

Further, over the course of the experiments, coupons vertically in the chamber varied depending on the surface reactivity of the items in the column (see, Coupon average and standard deviation in tables below). Less reactive surfaces had coupons in the vertical that looked very much the same at the end of a treatment. More reactive surfaces had noticeable differences from the bottom to the top of the column, with the top getting less $ClO_2$.

A summary of the results for the strawberries, broccoli, potatoes, tomatoes, grapes, onions, avocados, and balls are shown below in Table 6-Table 13, respectively. A summary of the results for the different experiments is shown in Table 14.

TABLE 6

Strawberries tested in column with lid off.

| Fan speed* | ZC (g) | ZF (g) | break through time (potato) (sec) | break through time (paper) (sec) | break through time (!) (sec) | bottom | middle | top | coupon avg | coupon std |
|---|---|---|---|---|---|---|---|---|---|---|
| 2 | 0 | 0 | n/a | n/a | n/a | 0 | 0 | 0 | 0.0 | 0.0 |
| 2 | 10 | 10 | 41 | n/a | n/a | 8.3 | 7 | 9 | 8.1 | 1.0 |
| 2 | 1 | 1 | 225 | 900 | n/a | 1 | 1 | 1.3 | 1.1 | 0.2 |
| 1 | 10 | 10 | 405 | 428 | n/a | 0 | 0 | 1 | 0.3 | 0.6 |
| 1 | 1 | 1 | 790 | 810 | n/a | 0 | 0 | 0 | 0.0 | 0.0 |

*Fan speed: 2 = high, 1 = low

TABLE 7

Broccoli tested in column with lid off.

| Fan speed* | ZC (g) | ZF (g) | break through time (potato) (sec) | break through time (paper) (sec) | break through time (!) (sec) | bottom | middle | top | coupon avg | coupon std |
|---|---|---|---|---|---|---|---|---|---|---|
| 2 | 10 | 10 | 23 | na | na | 6 | 6 | 7.75 | 6.6 | 1.0 |
| 1 | 10 | 10 | 47 | na | na | 6 | 2.75 | 3.25 | 4.0 | 1.8 |

TABLE 7-continued

Broccoli tested in column with lid off.

| Fan speed* | ZC (g) | ZF (g) | break through time (potato) (sec) | break through time (paper) (sec) | break through time (!) (sec) | bottom | middle | top | coupon avg | coupon std |
|---|---|---|---|---|---|---|---|---|---|---|
| 2 | 1 | 1 | 41 | na | na | 2 | 1 | 1 | 1.3 | 0.6 |
| 1 | 1 | 1 | 94 | na | na | 1 | 1 | 1 | 1.0 | 0.0 |

*Fan speed: 2 = high, 1 = low

TABLE 8

Potatoes tested in column with lid off.

| Fan speed* | ZC (g) | ZF (g) | break through time (potato) (sec) | break through time (paper) (sec) | break through time (!) (sec) | bottom | middle | top | coupon avg | coupon std |
|---|---|---|---|---|---|---|---|---|---|---|
| 2 | 10 | 10 | 45 sec | 50 | 210 | 10 | 8.5 | 6.6 | 8.4 | 1.7 |
| 1 | 10 | 10 | 115 | 115 | 241 | 9.6 | 9 | 10 | 9.5 | 0.5 |
| 2 | 1 | 1 | 45 | 45 | 2400 | 2.1 | 1 | 1.3 | 1.5 | 0.6 |
| 1 | 1 | 1 | 151 | 151 | 1260 | 3 | 2 | 1 | 2.0 | 1.0 |

*Fan speed: 2 = high, 1 = low

TABLE 9

Tomatoes tested in column with lid off.

| Fan speed* | ZC (g) | ZF (g) | break through time (potato) (sec) | break through time (paper) (sec) | break through time (!) (sec) | bottom | middle | top | coupon avg | coupon std |
|---|---|---|---|---|---|---|---|---|---|---|
| 2 | 10 | 10 | 22.0 | 22.0 | 40 | 7.6 | 7.6 | 9 | 8.1 | 0.8 |
| 1 | 10 | 10 | 48.0 | 48.0 | 77 | 7.6 | 8 | 9.3 | 8.3 | 0.9 |
| 2 | 1 | 1 | 44.0 | 44.0 | 40 | 1.3 | 1.3 | 1 | 1.2 | 0.2 |
| 1 | 1 | 1 | 85.0 | 85.0 | 191 | 3.6 | 2.6 | 2 | 2.7 | 0.8 |
| 1 | 10 | 10 | 64.0 | 64.0 | 98 | 8.3 | 8.3 | 7.3 | 8.0 | 0.6 |
| 2 | 1 | 1 | 42.0 | 42.0 | 373 | 3.6 | 4.3 | 4.3 | 4.1 | 0.4 |

*Fan speed: 2 = high, 1 = low

TABLE 10

Grapes tested in column with lid off.

| Fan speed* | ZC (g) | ZF (g) | break through time (potato) (sec) | break through time (paper) (sec) | break through time (!) (sec) | bottom | middle | top | coupon avg | coupon std |
|---|---|---|---|---|---|---|---|---|---|---|
| 2 | 10 | 10 | 35 | 35 | 56 | 7.3 | 8 | 8.5 | 7.9 | 0.6 |
| 1 | 10 | 10 | 83 | 68 | 118 | 8 | 8.3 | 9 | 8.4 | 0.5 |
| 2 | 1 | 1 | 59 | 59 | 438 | 2 | 1.3 | 1 | 1.4 | 0.5 |
| 1 | 1 | 1 | 84 | 76 | 229 | 3 | 3.3 | 2.3 | 2.9 | 0.5 |
| 1 | 10 | 10 | 73 | 59 | 112 | 8.6 | 8.3 | 8.6 | 8.5 | 0.2 |
| 2 | 1 | 1 | 35 | 35 | n/a | 2 | 1.6 | 1 | 1.5 | 0.5 |

*Fan speed: 2 = high, 1 = low

TABLE 11

Onions tested in column with lid off.

| Fan speed* | ZC (g) | ZF (g) | break through time (potato) (sec) | break through time (paper) (sec) | break through time (!) (sec) | bottom | middle | top | coupon avg | coupon std |
|---|---|---|---|---|---|---|---|---|---|---|
| 2 | 10 | 10 | 20.0 | 20.0 | 30.0 | 8.00 | 8.00 | 7.00 | 7.67 | 0.58 |
| 1 | 10 | 10 | 58.0 | 58.0 | 92.0 | 8.50 | 8.30 | 9.30 | 8.70 | 0.53 |
| 2 | 1 | 1 | 66.0 | 66.0 | 448.0 | 6.00 | 7.00 | 4.00 | 5.67 | 1.53 |
| 1 | 1 | 1 | 162.0 | 162.0 | 463.0 | 4.00 | 4.00 | 3.80 | 3.93 | 0.12 |
| 2 | 10 | 10 | 26.0 | 23.0 | 47.0 | 5.00 | 6.00 | 8.00 | 6.33 | 1.53 |
| 2 | 1 | 1 | 44.0 | 44.0 | 318.0 | 3.00 | 2.00 | 4.00 | 3.00 | 1.00 |

*Fan speed: 2 = high, 1 = low

TABLE 12

Avocados tested in column with lid off.

| Fan speed* | ZC (g) | ZF (g) | break through time (potato) (sec) | break through time (paper) (sec) | break through time (!) (sec) | bottom | middle | top | coupon avg | coupon std |
|---|---|---|---|---|---|---|---|---|---|---|
| 2 | 10 | 10 | 24 | 24 | 54 | 8 | 8 | 7.3 | 7.8 | 0.4 |
| 1 | 10 | 10 | 49 | 49 | 83 | 8.6 | 7.3 | 8.3 | 8.1 | 0.7 |
| 2 | 1 | 1 | 27 | 27 | 1500 | 6 | 4.3 | 4 | 4.8 | 1.1 |
| 1 | 1 | 1 | 88 | 75 | 443 | 5.3 | 3.3 | 3.6 | 4.1 | 1.1 |
| 2 | 10 | 10 | 22 | 22 | 64 | 9.3 | 7.6 | 7.3 | 8.1 | 1.1 |
| 2 | 1 | 1 | 33 | 33 | 1500 | 5 | 2.6 | 3.3 | 3.6 | 1.2 |

*Fan speed: 2 = high, 1 = low

TABLE 13

Balls (2 inches in diameter) tested in column with lid off.

| Fan speed* | ZC (g) | ZF (g) | break through time (potato) (sec) | break through time (paper) (sec) | break through time (!) (sec) | bottom | middle | top | coupon avg | coupon std |
|---|---|---|---|---|---|---|---|---|---|---|
| 2 | 10 | 10 | 32 | 32 | 75 | 8 | 8.5 | 9 | 8.5 | 0.5 |
| 1 | 1 | 1 | 74 | 74 | 144 | 5 | 4 | 4 | 4.3 | 0.6 |
| 1 | 10 | 10 | 61 | 61 | 90 | 8 | 7.5 | 10 | 8.5 | 1.3 |
| 2 | 1 | 1 | 41 | 41 | 2400 | 3.5 | 2 | 3 | 2.8 | 0.8 |
| 2 | 10 | 10 | 28 | 28 | 58 | 7 | 7 | 9 | 7.7 | 1.2 |
| 1 | 1 | 1 | 55 | 58 | 186 | 3 | 2 | 1.3 | 2.1 | 0.9 |

TABLE 14

Summary of the results for strawberries, broccoli, potatoes, tomatoes, grapes, onions, avocados, and balls.

| | Type | Fan | Dose | BT | coupon |
|---|---|---|---|---|---|
| potatoes | 3 | 2 | 10 | 45 | 8.4 |
| potatoes | 3 | 1 | 10 | 115 | 9.5 |
| potatoes | 3 | 2 | 1 | 45 | 1.5 |
| potatoes | 3 | 1 | 1 | 151 | 2.0 |
| grapes | 2 | 2 | 10 | 35 | 7.9 |
| grapes | 2 | 1 | 10 | 83 | 8.4 |
| grapes | 2 | 2 | 1 | 59 | 1.4 |
| grapes | 2 | 1 | 1 | 84 | 2.9 |
| grapes | 2 | 1 | 10 | 73 | 8.5 |
| grapes | 2 | 2 | 1 | 35 | 1.5 |
| strawberries | 5 | 2 | 0 | 0 | 0.0 |

TABLE 14-continued

Summary of the results for strawberries, broccoli, potatoes, tomatoes, grapes, onions, avocados, and balls.

| | Type | Fan | Dose | BT | coupon |
|---|---|---|---|---|---|
| strawberries | 5 | 2 | 10 | 41 | 8.1 |
| strawberries | 5 | 2 | 1 | 225 | 1.1 |
| strawberries | 5 | 1 | 10 | 405 | 0.3 |
| strawberries | 5 | 1 | 1 | 790 | 0.0 |
| onions | 2 | 2 | 10 | 20 | 7.7 |
| onions | 2 | 1 | 10 | 58 | 8.7 |
| onions | 2 | 2 | 1 | 66 | 5.7 |
| onions | 2 | 1 | 1 | 162 | 3.9 |
| onions | 2 | 2 | 10 | 26 | 6.3 |
| onions | 2 | 2 | 1 | 44 | 3.0 |
| tomatoes | 3 | 2 | 10 | 22 | 8.1 |

TABLE 14-continued

Summary of the results for strawberries, broccoli, potatoes, tomatoes, grapes, onions, avocados, and balls.

| | Type | Fan | Dose | BT | coupon |
|---|---|---|---|---|---|
| tomatoes | 3 | 1 | 10 | 48 | 8.3 |
| tomatoes | 3 | 2 | 1 | 44 | 1.2 |
| tomatoes | 3 | 1 | 1 | 85 | 2.7 |
| tomatoes | 3 | 1 | 10 | 64 | 8.0 |
| tomatoes | 3 | 2 | 1 | 42 | 4.1 |
| avocados | 2 | 2 | 10 | 24 | 7.8 |
| avocados | 2 | 1 | 10 | 49 | 8.1 |
| avocados | 2 | 2 | 1 | 27 | 4.8 |
| avocados | 2 | 1 | 1 | 88 | 4.1 |
| avocados | 2 | 2 | 10 | 22 | 8.1 |
| avocados | 2 | 2 | 1 | 33 | 3.6 |
| balls | 0 | 2 | 10 | 32 | 8.5 |
| balls | 0 | 1 | 1 | 74 | 4.3 |
| balls | 0 | 1 | 10 | 61 | 8.5 |
| balls | 0 | 2 | 1 | 41 | 2.8 |
| balls | 0 | 2 | 10 | 28 | 7.7 |
| balls | 0 | 1 | 1 | 55 | 2.1 |
| broccoli | 4 | 10 | 2 | 23 | 6.6 |
| broccoli | 4 | 10 | 1 | 47 | 4.0 |
| broccoli | 4 | 1 | 2 | 41 | 1.3 |
| broccoli | 4 | 1 | 1 | 94 | 1.0 |
| broccoli | 4 | 10 | 1 | 32 | 4.8 |

Regression analysis was then performed on the independent variables ($ClO_2$ concentration, Relative Velocity, Surface Reactivity) vs. dependent variables (column breakthrough time, reactive coupon rating). The regression analysis indicated that the more reactive the surface, the higher the inlet concentration of $ClO_2$ needs to be to get uniform treatment in a well-mixed system. The results further indicated that the breakthrough time was impacted mostly by surface reactivity and relative velocity. In summary, the data shows that for highly reactive surfaces, higher relative velocities and lower doses are needed to keep $ClO_2$ moving uniformly in the column and vice versa (e.g., for lower reactive surfaces, lower relative velocities and higher doses are needed).

As a further set of experiments, the effect of the ball diameter and the number of openings in the plate were examined. Table 15 below shows the results for balls 2 inches in diameter with 100 openings in the distribution plate. Table 16 below shows the results for balls 1.5 inches in diameter with 100 openings in the distribution plate. Table 17 below shows the results for balls 2 inches in diameter with 70 plate openings. A summary of the results for the different experiments is shown in Table 18 below.

TABLE 15

Balls (2 inches in diameter) tested in column with lid off.

| Fan speed* | ZC (g) | ZF (g) | break through time (potato) (sec) | break through time (paper) (sec) | break through time (!) (sec) | Relative velocity (fps) | bottom | middle | top | coupon avg | coupon std |
|---|---|---|---|---|---|---|---|---|---|---|---|
| 2 | 10 | 10 | 32 | 32 | 75 | 0.09 | 8 | 8.5 | 9 | 8.5 | 0.5 |
| 1 | 1 | 1 | 74 | 74 | 144 | 0.04 | 5 | 4 | 4 | 4.3 | 0.6 |
| 1 | 10 | 10 | 61 | 61 | 90 | 0.05 | 8 | 7.5 | 10 | 8.5 | 1.3 |
| 2 | 1 | 1 | 41 | 41 | 2400 | 0.07 | 3.5 | 2 | 3 | 2.8 | 0.8 |
| 2 | 10 | 10 | 28 | 28 | 58 | 0.11 | 7 | 7 | 9 | 7.7 | 1.2 |
| 1 | 1 | 1 | 55 | 58 | 186 | 0.05 | 3 | 2 | 1.3 | 2.1 | 0.9 |

*Fan speed: 2 = high, 1 = low

TABLE 16

Balls (1.5" in diameter) tested in column (lid off); 100 openings in distribution plate.

| Fan speed* | ZC (g) | ZF (g) | break through time (potato) (sec) | break through time (paper) (sec) | break through time (!) (sec) | Relative velocity (fps) | bottom | middle | top | coupon avg | coupon std |
|---|---|---|---|---|---|---|---|---|---|---|---|
| 1 | 10 | 10 | 79 | 70 | 118 | 0.15 | 9 | 8 | 9 | 8.7 | 0.6 |
| 1 | 1 | 1 | 51 | 40 | 199 | 0.05 | 6 | 5 | 7 | 6.0 | 1.0 |
| 2 | 10 | 10 | 17 | 17 | 33 | 0.09 | 8 | 8 | 9 | 8.3 | 0.6 |
| 2 | 1 | 1 | 32 | 21 | 158 | 0.04 | 3.6 | 4.3 | 3.6 | 3.8 | 0.4 |
| 1 | 10 | 10 | 52 | 52 | 76 | 0.04 | 8.6 | 8.6 | 9.0 | 8.7 | 0.2 |
| 2 | 10 | 10 | 13 | 12 | 27 | 0.10 | 8.0 | 8.0 | 8.3 | 8.1 | 0.2 |

*Fan speed: 2 = high, 1 = low

TABLE 17

| Balls (2" in diameter) tested in column with lid off; 70 openings in distribution plate. | | | | | | | | | | | | |
|---|---|---|---|---|---|---|---|---|---|---|---|---|
| Fan speed* | ZC (g) | ZF (g) | break through time (potato) (sec) | break through time (paper) (sec) | break through time (!) (sec) | Relative velocity (fps) | bottom | middle | top | coupon avg | coupon std |
| 2 | 10 | 10 | 20 | 20 | 42 | 0.04 | 7 | 7 | 9 | 7.7 | 1.2 |
| 1 | 10 | 10 | 55 | 55 | 73 | 0.06 | 8 | 8 | 9 | 8.3 | 0.6 |
| 2 | 1 | 1 | 32 | 32 | n/a | 0.18 | 7 | 8 | 9 | 8.0 | 1.0 |
| 1 | 1 | 1 | 74 | 80 | 400 | 0.09 | 2 | 2 | 3.6 | 2.5 | 0.9 |
| 1 | 10 | 10 | 72 | 56 | 87 | 0.06 | 8 | 7.8 | 9 | 8.3 | 0.6 |
| 2 | 1 | 1 | 29 | 29 | 2400 | 0.23 | 2.3 | 2 | 2 | 2.1 | 0.2 |

*Fan speed: 2 = high, 1 = low

TABLE 18

| Summary of data for unreactive balls. | | | | | |
|---|---|---|---|---|---|
| Fan speed | ZC g | Ball Diameter (Inches) | plate openings | coupon avg | break through time (sec) |
| 2 | 10 | 2 | 100 | 8.5 | 32 |
| 1 | 1 | 2 | 100 | 4.3 | 74 |
| 1 | 10 | 2 | 100 | 8.5 | 61 |
| 2 | 1 | 2 | 100 | 2.8 | 41 |
| 2 | 10 | 2 | 100 | 7.7 | 28 |
| 1 | 1 | 2 | 100 | 2.1 | 55 |
| 2 | 10 | 2 | 70 | 7.7 | 20 |
| 1 | 10 | 2 | 70 | 8.3 | 55 |
| 2 | 1 | 2 | 70 | 8.0 | 32 |
| 1 | 1 | 2 | 70 | 2.5 | 74 |
| 1 | 10 | 2 | 70 | 8.3 | 72 |
| 2 | 1 | 2 | 70 | 2.1 | 29 |
| 1 | 10 | 1.5 | 100 | 8.7 | 79 |

TABLE 18-continued

| Summary of data for unreactive balls. | | | | | |
|---|---|---|---|---|---|
| Fan speed | ZC g | Ball Diameter (Inches) | plate openings | coupon avg | break through time (sec) |
| 1 | 1 | 1.5 | 100 | 6.0 | 51 |
| 2 | 10 | 1.5 | 100 | 8.3 | 17 |
| 2 | 1 | 1.5 | 100 | 3.8 | 32 |
| 1 | 10 | 1.5 | 100 | 8.7 | 52 |
| 2 | 10 | 1.5 | 100 | 8.1 | 13 |

*Fan speed: 2 = high, 1 = low

As a further control, experiments with avocados were run without the fan being on, e.g. a "no" flow or static condition (Table 19). These experiments shows that the time it takes the system to come to equilibrium is much longer at the static condition than when the fan is running and, in the case of highly reactive surfaces, equilibrium may never be reached. Further, the treatment gas distribution throughout the packed column varies significantly.

TABLE 19

| Avocados tested in column under static (no flow) conditions. | | | | | | | | | | | |
|---|---|---|---|---|---|---|---|---|---|---|---|
| Fan speed | ZC (g) | ZF (g) | break through time (potato) (sec) | break through time (paper) (sec) | break through time (!) (sec) | bottom | middle | top | coupon avg | coupon std |
| 0 | 20 | 20 | 312 | 339 | n/a | 5.3 | 8 | 9 | 7.4 | 1.9 |
| 0 | 20 | 20 | 460 | 430 | n/a | n/a | n/a | n/a | n/a | n/a |
| 0 | 20 | 20 | 296 | 338 | n/a | n/a | n/a | n/a | n/a | n/a |
| 0 | 20 | 20 | 139 | 123 | 318 | 10 | 10 | 10 | 10.0 | 0.0 |
| 0 | 10 | 10 | 158 | 138 | 632 | 10 | 10 | 10 | 10.0 | 0.0 |
| 0 | 1 | 1 | 226 | 212 | 1620 | 9 | 9 | 8 | 8.7 | 0.6 |
| 0 | 0.5 | 0.5 | 1232 | 1020 | n/a | 1 | 1 | 1 | 1.0 | 0.0 |
| 0 | 0.5 | 0.5 | n/a | n/a | n/a | 0 | 0 | 0 | 0.0 | 0.0 |
| 0 | 1 | 1 | 754 | 754 | n/a | 0 | 0 | 1 | 0.3 | 0.6 |
| 0 | 10 | 10 | 251 | 276 | 853 | 10 | 10 | 10 | 10.0 | 0.0 |
| 0 | 20 | 20 | 211 | 108 | 369 | 10 | 10 | 10 | 10.0 | 0.0 |

As a further experiment, the effect of packaging was examined. The experiments above had the product stacked in the column in bulk form. As a further experiment, the column was loaded with strawberries within clamshell packages. The results are summarized in Table 20.

TABLE 20

Strawberries in clamshells.

| Fan speed* | ZC (g) | ZF (g) | break through time (potato) (sec) | break through time (paper) (sec) | break through time (!) (sec) | bottom | middle | top | coupon avg | coupon std | Start temp | Final temp |
|---|---|---|---|---|---|---|---|---|---|---|---|---|
| 2 | 10 | 10 | 19 | 14 | 32 | 7.5 | 7 | 6.5 | 7.0 | 0.5 | | |
| 1 | 10 | 10 | 47 | 31 | 60 | 8.3 | 7.5 | 9 | 8.3 | 0.8 | | |
| 2 | 10 | 10 | 23 | n/a | n/a | 5.5 | 5.5 | 4.5 | 5.2 | 0.6 | | |
| 1 | 10 | 10 | 28 | n/a | n/a | 8.5 | 7.25 | 7 | 7.6 | 0.8 | | |
| 2 | 1 | 1 | 21 | n/a | n/a | 1 | 1 | 0.5 | 0.8 | 0.3 | | |
| 1 | 1 | 1 | 69 | n/a | n/a | 1.5 | 1.5 | 1.5 | 1.5 | 0.0 | | |
| 1 | 10 | 10 | 48 | n/a | n/a | 6.5 | 5.75 | 5 | 5.8 | 0.8 | | |
| 2 | 1 | 1 | 27 | n/a | n/a | 0.5 | 1 | 1 | 0.8 | 0.3 | | |
| 1 | 10 | 0 | n/a | n/a | n/a | 1 | 1 | 1 | 1.0 | 0.0 | | |
| 2 | 10 | 10 | 27 | n/a | n/a | 6.5 | 5.5 | 6 | 6.0 | 5.8 | 39 | 55 |
| 1 | 10 | 10 | 52 | n/a | n/a | 7.5 | 9 | 6 | 7.5 | 7.5 | 42 | 58 |
| 2 | 1 | 1 | 37 | n/a | n/a | 1.5 | 1.3 | 1 | 1.3 | 1.2 | 45 | 58 |
| 1 | 1 | 1 | 69 | n/a | n/a | 2 | 2.5 | 4 | 2.8 | 3.1 | 46 | 56 |

*Fan speed: 2 = high, 1 = low

EXEMPLARY ASPECTS

In view of the described devices and methods, herein below are described certain more particularly described aspects of the inventions. The particularly recited aspects should not, however, be interpreted to have any limiting effect on any different claims containing different or more general teaching described herein or that the "particular" aspects are somehow limited in some way other than the inherent meanings of the language and formulas literally used therein.

Example 1: A device for controlled delivery of a treatment gas to treat a raw agricultural product within a treatment zone having a volume, the device comprising: a reactor fluidly connected to the treatment zone; wherein the treatment gas is produced in the reactor and the treatment zone is configured to receive the treatment gas from the reactor upon application of a pressure differential; wherein the raw agricultural product is treated with the treatment gas in the treatment zone; wherein the raw agricultural product has a surface and the surface has a reactivity with the treatment gas, the reactivity of the surface of the raw agricultural product with the treatment gas being the surface reactivity; wherein the device is configured to deliver a dose of the treatment gas at a relative velocity to the treatment zone; wherein the dose of the treatment gas and the relative velocity are selected in view of the surface reactivity of the raw agricultural product to be treated; wherein: when the raw agricultural product has a low surface reactivity, then the dose is from 1 to 1000 ppmv and the relative velocity is from 0.01 to 0.1 feet per minute; when the raw agricultural product has a moderate surface reactivity, then the dose is from 0.1 to 100 ppmv and the relative velocity is from 0.05 to 0.25 feet per minute; and when the raw agricultural product has a high surface reactivity, then the dose is from 0.01 to 10 ppmv and the relative velocity is from 0.05 to 0.5 feet per minute; and wherein surface reactivity of the raw agricultural product is as defined in Table 1.

Example 2: The device of any examples herein, particularly example 1, wherein the reactor is fluidly connected to the treatment zone via a first duct, the first duct creating a path for fluid flow between the reactor and the treatment zone.

Example 3: The device of any examples herein, particularly example 1 or example 2, wherein the reactor, the treatment zone, the first duct, or a combination thereof further comprises a sealable port configured to fluidly isolate the reactor from the treatment zone upon sealing the sealable port.

Example 4: The device of any examples herein, particularly examples 1-3, wherein the pressure differential comprises a positive pressure differential and the device further comprises a motive source fluidly connected to the reactor.

Example 5: The device of any examples herein, particularly example 4, wherein the motive source is fluidly connected to the reactor via a second duct, the second duct creating a path for fluid flow between the reactor and the motive source.

Example 6: The device of any examples herein, particularly example 4 or example 5, wherein the reactor, the motive source, the second duct, or a combination thereof further comprises a sealable port configured to fluidly isolate the reactor from the motive source upon sealing the sealable port.

Example 7: The device of any examples herein, particularly examples 4-6, wherein the motive source comprises a blower, a fan, a gas cylinder, or a combination thereof.

Example 8: The device of any examples herein, particularly examples 1-3, wherein the pressure differential comprises a negative pressure differential and the device further comprises a motive source fluidly connected to the treatment zone.

Example 9: The device of any examples herein, particularly example 8, wherein the motive source is connected to the treatment zone via a second duct, the second duct creating a path for fluid flow between the treatment zone and the motive source.

Example 10: The device of any examples herein, particularly example 8 or example 9, wherein the treatment zone, the motive source, the second duct, or a combination thereof further comprises a sealable port configured to fluidly isolate the treatment zone from the motive source upon sealing the sealable port.

Example 11: The device of any examples herein, particularly examples 8-10, wherein the motive source comprises a vacuum source.

Example 12: The device of any examples herein, particularly examples 1-11, wherein the absolute value of the pressure differential is from greater than 0 to 1 pounds per square inch (psi).

Example 13: The device of any examples herein, particularly examples 1-12, wherein the treatment zone has a volume of from 0.1 cubic feet to 8000 cubic feet.

Example 14: The device of any examples herein, particularly example 13, wherein the treatment zone has a volume of 380 cubic inches.

Example 15: The device of any examples herein, particularly examples 1-14, further comprising a treatment chamber, wherein the treatment chamber comprises an interior surface and the treatment zone is at least partially enclosed by the interior surface of the treatment chamber.

Example 16: The device of any examples herein, particularly example 15, wherein the treatment zone is fully enclosed by the interior surface of the treatment chamber.

Example 17: The device of any examples herein, particularly examples 15-16, wherein the treatment chamber comprises an interior surface and at least a portion of the interior surface of the treatment chamber is perforated.

Example 18: The device of any examples herein, particularly example 17, wherein the treatment chamber is configured to receive the treatment gas from the reactor through the perforated portion of the interior surface such that the treatment gas diffuses into the treatment chamber via the perforated portion of the interior surface.

Example 19: The device of any examples herein, particularly example 18, wherein the raw agricultural product is located on the perforated portion of the interior surface of the treatment chamber.

Example 20: The device of any examples herein, particularly examples 1-19, wherein the reactor, the treatment chamber, the first duct, and the second duct independently comprise a rigid material or a flexible material.

Example 21: The device of any examples herein, particularly examples 1-20, wherein the reactor, the treatment chamber, the first duct, and the second duct, or a combination thereof comprise(s) an inert material.

Example 22: The device of any examples herein, particularly examples 1-21, wherein the raw agricultural product comprises a single item that is the raw agricultural product.

Example 23: The device of any examples herein, particularly examples 1-21, wherein the raw agricultural product comprises a plurality of items that are the raw agricultural products.

Example 24: The device of any examples herein, particularly examples 1-23, wherein the raw agricultural product is further contained within a gas permeable container within the treatment zone.

Example 25: The device of any examples herein, particularly examples 1-24, wherein the treatment zone has a temperature of from 0 °C to 32 °C.

Example 26: The device of any examples herein, particularly examples 1-25, wherein the treatment gas comprises chlorine dioxide, carbon dioxide, or a combination thereof.

Example 27: The device of any examples herein, particularly examples 1-26, wherein the device is configured such that the raw agricultural product is contacted with the treatment gas within the treatment zone for an amount of time of from 5 minutes to 48 hours.

Example 28: The device of any examples herein, particularly examples 1-27, wherein the treatment gas is produced from a precursor in the reactor at a rate of from 0.1 milligram (mg) of treatment gas per day per gram (g) of precursor initially present to 600 mg of gas/day/g of precursor initially present.

Example 29: The device of any examples herein, particularly examples 1-28, wherein the treatment zone has a humidity of from 20% to 100%, wherein the humidity is non-condensing.

Example 30: The device of any examples herein, particularly examples 1-29, wherein the device is configured to select the humidity of the treatment zone in view of the surface reactivity of the raw agricultural product.

Example 31: The device of any examples herein, particularly example 30, wherein when the raw agricultural product as a low surface reactivity, then the humidity of the treatment zone is from 60%-100%; when the raw agricultural product has a moderate surface reactivity, then the humidity of the treatment zone is from 40%-80%; and when the raw agricultural product has a high surface reactivity, then the humidity of the treatment zone is from 20%-60%; wherein the humidity is non-condensing.

Example 32: The device of any examples herein, particularly examples 1-31, wherein the reactor further comprises a bed comprising dry particles of a precursor and dry particles of a proton generating species and producing the treatment gas in the reactor comprises directing air through the bed.

Example 33: The device of any examples herein, particularly example 32, wherein the bed comprises a mixture of the dry particles of the precursor and the dry particles of the proton generating species.

Example 34: The device of any examples herein, particularly example 32, wherein the bed comprises a layered bed comprising alternating layers of a layer of the dry particles comprising the precursor and a layer of the dry particles comprising the proton generating species.

Example 35: The device of any examples herein, particularly example 34, wherein the total number of layers in the layered bed is 3 or more.

Example 36: The device of any examples herein, particularly examples 32-35, wherein the treatment gas is produced at a rate that is controlled by controlling the presence or absence of air flowing though the bed, the amount of time the air flows through the bed, the amount of the dry particles comprising the precursor in the bed, the amount of the dry particles comprising the proton-generating species in the bed, the temperature, or a combination thereof.

Example 37: The device of any examples herein, particularly examples 32-36, wherein the air has a humidity of from 50% to 80%.

Example 38: The device of any examples herein, particularly examples 1-31, wherein the reactor further comprises dry particles of a precursor and dry particles of a proton generating species enclosed within an enclosing material and producing the treatment gas in the reactor comprises directing air through the reactor.

Example 39: The device of any examples herein, particularly example 38, wherein the enclosing material is substantially impervious to liquid water.

Example 40: The device of any examples herein, particularly example 38 or example 39, wherein the enclosing material comprises membrane comprising a polyethylene or paper filter.

Example 41: The device of any examples herein, particularly examples 38-40, wherein the enclosing material comprises TYVEK® and GORTEX®.

Example 42: The device of any examples herein, particularly examples 38-41, wherein the enclosing material is a sachet comprising three layers of membrane material forming a two-compartment sachet to separate the dry particles of the proton-generating species from the dry particles of the precursor.

Example 43: The device of any examples herein, particularly examples 38-42, wherein the treatment gas is produced at a rate that is controlled by controlling the presence or absence of air flowing though the reactor, the amount of time the air flows through the reactor, the amount of the dry particles comprising the precursor enclosed in the enclosing material, the amount of the dry particles comprising the proton-generating species enclosed within the enclosing material, the temperature, the humidity of the air flowing through the reactor, the type of enclosing material, the thickness of the enclosing material, or a combination thereof.

Example 44: The device of any examples herein, particularly examples 38-43, wherein the air has a humidity of from 50% to 80%.

Example 45: The device of any examples herein, particularly examples 1-31, wherein the reactor further comprises a mixer containing dry particles of a precursor and dry particles of a proton generating species and wherein producing the treatment gas in the reactor comprises dynamically mixing the dry particles of the precursor and the dry particles of the proton generating species in the mixer.

Example 46: The device of any examples herein, particularly example 45, wherein the treatment gas is produced at a rate that is varied by varying the amount of time the dry particles comprising the precursor and the dry particles comprising the proton-generating species are dynamically mixed, the rate at which the dry particles comprising the precursor and the dry particles comprising the proton-generating species are dynamically mixed, or a combination thereof.

Example 47: The device of any examples herein, particularly example 45 or example 46, wherein the mixer is selected from the group consisting of a tumbler, a vibratory mixer, a rotary mixer, a marinator mixer, and a stirrer.

Example 48: The device of any examples herein, particularly examples 45-47, wherein the mixer is selected from the group consisting of a tumbler, a rotary mixer, a marinator mixer, and a stirrer and wherein the dry particles comprising the precursor and dry particles comprising the proton-generating species are dynamically mixed at a rate of from 1 revolution per day (RPD) to 100 revolutions per minute (RPM).

Example 49: The device of any examples herein, particularly examples 45-47, wherein the mixer is a vibratory mixer and the dry particles comprising the precursor and dry particles comprising the proton-generating species are dynamically mixed at a rate of from 1 Hertz (Hz) to 20 kilohertz (kHz).

Example 50: The device of any examples herein, particularly examples 45-49, wherein the amount of time that the dry particles comprising the precursor and dry particles comprising the proton-generating species are dynamically mixed is from 1 minute to 24 hours.

Example 51: The device of any examples herein, particularly examples 45-50, wherein the reactor further comprises a means for milling, crushing, abrading, or a combination thereof the dry particles comprising the precursor and dry particles comprising the proton-generating species.

Example 52: The device of any examples herein, particularly examples 45-51, wherein the mixer further contains an abrasive particle and producing the treatment gas in the reactor further comprises dynamically mixing the abrasive particle with the dry particles comprising the precursor and dry particles comprising the proton-generating species.

Example 53: The device of any examples herein, particularly examples 45-52, wherein the mixer further contains a deliquescent and producing the treatment gas in the reactor further comprises dynamically mixing the deliquescent with the dry particles comprising the precursor and dry particles comprising the proton-generating species.

Example 54: The device of any examples herein, particularly examples 45-53, wherein the mixer further contains a desiccant and producing the treatment gas in the reactor further comprises dynamically mixing the desiccant with the dry particles comprising the precursor and dry particles comprising the proton-generating species.

Example 55: The device of any examples herein, particularly examples 32-54, wherein the dry particles comprising the precursor comprise a chlorine dioxide precursor and the treatment gas comprises chlorine dioxide; the dry particles comprising the precursor comprise a carbon dioxide precursor and the treatment gas comprises carbon dioxide; or a combination thereof.

Example 56: The device of any examples herein, particularly examples 32-55, wherein the dry particles comprising the precursor further comprise a porous carrier selected from the group consisting of zeolite crystals, silica, pumice, diatomaceous earth, bentonite, and clay, and wherein the precursor is impregnated in the porous carrier.

Example 57: The device of any examples herein, particularly examples 32-55, wherein the dry particles comprising the precursor include from 1% to 30% by weight of the precursor.

Example 58: The device of any examples herein, particularly examples 32-57, wherein the dry particles comprising the precursor comprise a carbon dioxide precursor and the carbon dioxide precursor comprises a carbon-containing compound selected from the group consisting of carbonates, bicarbonates, sesquicarbonates, and combinations thereof.

Example 59: The device of any examples herein, particularly example 58, wherein the carbon-containing compound is selected from the group consisting of sodium carbonate, sodium bicarbonate, sodium sesquicarbonate, and combinations thereof.

Example 60: The device of any examples herein, particularly examples 32-57, wherein the dry particles comprising the precursor comprise a chlorine dioxide precursor and the chlorine dioxide precursor comprises a chlorine dioxide-producing compound selected from the group consisting of a metal chlorite, a metal chlorate, chloric acid, hypochlorous acid, and combinations thereof.

Example 61: The device of any examples herein, particularly example 60, wherein the metal chlorite comprises sodium chlorite, barium chlorite, calcium chlorite, lithium chlorite, potassium chlorite, magnesium chlorite, or combinations thereof; or wherein the metal chlorate comprises sodium chlorate, lithium chlorate, potassium chlorate, magnesium chlorate, barium chlorate, or combinations thereof.

Example 62: The device of any examples herein, particularly examples 32-61, wherein the dry particles comprising the proton-generating species further comprise a porous carrier selected from the group consisting of zeolite crystals, silica, pumice, diatomaceous earth, bentonite, and clay, and wherein the proton-generating species is impregnated in the porous carrier.

Example 63: The device of any examples herein, particularly examples 32-62, wherein the dry particles comprising the proton-generating species include from 10% to 40% by weight of the proton-generating species.

Example 64: The device of any examples herein, particularly examples 32-63, wherein the proton-generating species comprises an organic acid, an inorganic acid, a metal salt, or a combination thereof.

Example 65: The device of any examples herein, particularly examples 32-64, wherein the proton-generating species comprises an organic acid and/or an inorganic acid selected from the group consisting of acetic acid, citric acid, hydrochloric acid, phosphoric acid, propionic acid, sulfuric acid, and combinations thereof.

Example 66: The device of any examples herein, particularly examples 32-65, wherein the proton-generating species comprises a metal salt selected from the group consisting of ferric chloride, ferric sulfate, $CaCl_2$, $ZnSO_4$, $ZnCl_2$, $CoSO_4$, $CoCl_2$, $MnSO_4$, $MnCl_2$, $CuSO_4$, $CuCl_2$, $MgSO_4$, sodium acetate, sodium citrate, sodium sulfate, sodium bisulfate, hydrogen phosphate, disodium hydrogen phosphate, and combinations thereof.

Example 67: The device of any examples herein, particularly examples 1-31, wherein producing the treatment gas in the reactor comprises mixing a solution of a precursor and a solution of a proton generating species.

Example 68: The device of any examples herein, particularly example 67, wherein the precursor comprises a carbon dioxide precursor and the carbon dioxide precursor comprises a carbon-containing compound selected from the group consisting of carbonates, bicarbonates, sesquicarbonates, and combinations thereof.

Example 69: The device of any examples herein, particularly example 68, wherein the carbon-containing compound is selected from the group consisting of sodium carbonate, sodium bicarbonate, sodium sesquicarbonate, and combinations thereof.

Example 70: The device of any examples herein, particularly example 67, wherein the precursor comprises a chlorine dioxide precursor and the chlorine dioxide precursor comprises a chlorine dioxide-producing compound selected from the group consisting of a metal chlorite, a metal chlorate, chloric acid, hypochlorous acid, and combinations thereof.

Example 71: The device of any examples herein, particularly example 70, wherein the metal chlorite comprises sodium chlorite, barium chlorite, calcium chlorite, lithium chlorite, potassium chlorite, magnesium chlorite, or combinations thereof; or wherein the metal chlorate comprises sodium chlorate, lithium chlorate, potassium chlorate, magnesium chlorate, barium chlorate, or combinations thereof.

Example 72: The device of any examples herein, particularly examples 67-71, wherein the proton-generating species comprises an organic acid, an inorganic acid, a metal salt, or a combination thereof.

Example 73: The device of any examples herein, particularly examples 67-72, wherein the proton-generating species comprises an organic acid and/or an inorganic acid selected from the group consisting of acetic acid, citric acid, hydrochloric acid, phosphoric acid, propionic acid, sulfuric acid, and combinations thereof.

Example 74: The device of any examples herein, particularly examples 67-73, wherein the proton-generating species comprises a metal salt selected from the group consisting of ferric chloride, ferric sulfate, $CaCl_2$, $ZnSO_4$, $ZnCl_2$, $CoSO_4$, $CoCl_2$, $MnSO_4$, $MnCl_2$, $CuSO_4$, $CuCl_2$, $MgSO_4$, sodium acetate, sodium citrate, sodium sulfate, sodium bisulfate, hydrogen phosphate, disodium hydrogen phosphate, and combinations thereof.

Example 75: The device of any examples herein, particularly example 67, wherein the treatment gas comprises chlorine dioxide and the chlorine dioxide gas is generated by mixing a sodium chlorite solution and hydrochloric acid solution.

Example 76: The device of any examples herein, particularly examples 1-75, wherein the device is further configured to recycle the treatment gas from the treatment zone.

Example 77: The device of any examples herein, particularly examples 1-76, wherein the device comprises a display case.

Example 78: The device of any examples herein, particularly examples 1-77, wherein the device further comprises a hydrocooler, a liquid ice injector, a forced air cooler, a vacuum cooler, or a combination thereof.

Example 79: The device of any examples herein, particularly examples 1-78, wherein the device further comprises a means for forced air circulation, cooling, hydration, sanitation, or a combination thereof.

Example 80: The device of any examples herein, particularly examples 1-79, wherein the device further comprises a sensory control that incorporates feedback, feedforward, and/or time appropriate logic controllers.

Example 81: The device of any examples herein, particularly example 80, wherein the device further comprises a computing device comprising a processor and a memory operably coupled to the processor, the memory further having computer-executable instructions stored thereon that, when executed by the processor, cause the processor to: receive a measurement from the sensory control and incorporate feedback, feedforward and/or time appropriate control of a parameter based thereon.

Example 82: A method of treating a raw agricultural product with a treatment gas within a treatment zone, the method comprising: producing the treatment gas in a reactor, the reactor being fluidly connected to the treatment zone; and applying a pressure differential to direct the treatment gas from the reactor to the treatment zone; wherein the raw agricultural product is treated with the treatment gas in the treatment zone; wherein the raw agricultural product has a surface and the surface has a reactivity with the treatment gas, the reactivity of the surface of the raw agricultural product with the treatment gas being the surface reactivity; wherein a dose of the treatment gas is delivered to the treatment zone at a relative velocity; wherein the method further comprises selecting the dose of the treatment gas and the relative velocity in view of the surface reactivity of the raw agricultural product to be treated; wherein: when the raw agricultural product has a low surface reactivity, then the dose is from 1 to 1000 ppmv and the relative velocity is from 0.01 to 0.1 feet per minute; when the raw agricultural product has a moderate surface reactivity, then the dose is from 0.1 to 100 ppmv and the relative velocity is from 0.05 to 0.25 feet per minute; and when the raw agricultural product has a high surface reactivity, then the dose is from 0.01 to 10 ppmv and the relative velocity is from 0.05 to 0.5 feet per minute; and wherein surface reactivity of the raw agricultural product is as defined in Table 1.

Example 83: The method of any examples herein, particularly example 82, wherein the method comprises using the device of any examples herein, particularly examples 1-81.

Example 84: The method of any examples herein, particularly example 82 or example 83, wherein the absolute value of the pressure differential is from greater than 0 to 1 psi.

Example 85: The method of any examples herein, particularly examples 82-84, wherein the treatment zone has a volume of from 0.1 cubic feet to 8000 cubic feet.

Example 86: The method of any examples herein, particularly examples 82-85, wherein the raw agricultural product comprises a single item that is the raw agricultural product.

Example 87: The method of any examples herein, particularly examples 82-85, wherein the raw agricultural product comprises a plurality of items that are the raw agricultural product.

Example 88: The method of any examples herein, particularly examples 82-87, wherein the raw agricultural product is further contained within a gas permeable container within the treatment zone.

Example 89: The method of any examples herein, particularly examples 82-88, wherein the treatment zone has a temperature of from 0 °C to 32 °C.

Example 90: The method of any examples herein, particularly examples 82-89, wherein the treatment gas comprises chlorine dioxide, carbon dioxide, or a combination thereof.

Example 91: The method of any examples herein, particularly examples 82-90, wherein the raw agricultural product is contacted with the treatment gas within the treatment zone for an amount of time of from 5 minutes to 48 hours.

Example 92: The method of any examples herein, particularly examples 82-91, wherein the method comprises producing the treatment gas from a precursor at a rate of from 0.1 milligram (mg) of treatment gas per day per gram (g) of precursor initially present to 600 mg of gas/day/g of precursor initially present.

Example 93: The method of any examples herein, particularly examples 82-92, wherein the treatment zone has a humidity of from 20% to 100%, wherein the humidity is non-condensing.

Example 94: The method of any examples herein, particularly examples 82-93, wherein the method further comprises selecting the humidity of the treatment zone in view of the surface reactivity of the raw agricultural product.

Example 95: The method of any examples herein, particularly example 94, wherein when the raw agricultural product as a low surface reactivity, then the humidity of the treatment zone is from 60%-100%; when the raw agricultural product has a moderate surface reactivity, then the humidity of the treatment zone is from 40%-80%; and when the raw agricultural product has a high surface reactivity, then the humidity of the treatment zone is from 20%-60%; wherein the humidity is non-condensing.

Example 96: The method of any examples herein, particularly examples 82-95, wherein the reactor further comprises a bed comprising dry particles of a precursor and dry particles of a proton generating species and producing the treatment gas in the reactor comprises directing air through the bed.

Example 97: The method of any examples herein, particularly example 96, wherein the bed comprises a mixture of the dry particles of the precursor and the dry particles of the proton generating species.

Example 98: The method of any examples herein, particularly example 96, wherein the bed comprises a layered bed comprising alternating layers of a layer of the dry particles comprising the precursor and a layer of the dry particles comprising the proton generating species.

Example 99: The method of any examples herein, particularly example 98, wherein the total number of layers is 3 or more.

Example 100: The method of any examples herein, particularly examples 96-99, wherein the method further comprises controlling or adjusting the rate at which the treatment gas is produced by controlling or adjusting: the presence or absence of air flowing though the bed, the amount of time the air flows through the bed, the amount of the dry particles comprising the precursor in the bed, the amount of the dry particles comprising the proton-generating species in the bed, the temperature, or a combination thereof.

Example 101: The method of any examples herein, particularly examples 96-100, wherein the air has a humidity of from 50% to 80%.

Example 102: The method of any examples herein, particularly examples 82-95, wherein the reactor further comprises dry particles of a precursor and dry particles of a proton generating species enclosed within an enclosing material and producing the treatment gas in the reactor comprises directing air through the reactor.

Example 103: The method of any examples herein, particularly example 102, wherein the enclosing material is substantially impervious to liquid water.

Example 104: The method of any examples herein, particularly example 102 or example 103, wherein the enclosing material comprises membrane comprising a polyethylene or paper filter.

Example 105: The method of any examples herein, particularly examples 102-104, wherein the enclosing material comprises TYVEK® and GORTEX®.

Example 106: The method of any examples herein, particularly examples 102-105, wherein the enclosing material is a sachet comprising three layers of membrane material forming a two-compartment sachet to separate the dry particles of the proton-generating species from the dry particles of the precursor.

Example 107: The method of any examples herein, particularly examples 102-106, wherein the method further comprises controlling or adjusting the rate at which the treatment gas is produced by controlling or adjusting: the presence or absence of air flowing though the reactor, the amount of time the air flows through the reactor, the amount of the dry particles comprising the precursor enclosed in the enclosing material, the amount of the dry particles comprising the proton-generating species enclosed within the enclosing material, the temperature, the humidity of the air flowing through the reactor, the type of enclosing material, the thickness of the enclosing material, or a combination thereof.

Example 108: The method of any examples herein, particularly examples 102-107, wherein the air has a humidity of from 50% to 80%.

Example 109: The method of any examples herein, particularly examples 82-95, wherein the reactor further comprises a mixer containing dry particles of a precursor and dry particles of a proton generating species and wherein producing the treatment gas in the reactor comprises dynamically mixing the dry particles of the precursor and the dry particles of the proton generating species in the mixer.

Example 110: The method of any examples herein, particularly example 109, wherein the method further comprises controlling or adjusting the rate at which the treatment gas is produced by controlling or adjusting: the amount of time the dry particles comprising the precursor and the dry particles comprising the proton-generating species are dynamically mixed, the rate at which the dry particles comprising the precursor and the dry particles comprising the proton-generating species are dynamically mixed, or a combination thereof.

Example 111: The method of any examples herein, particularly example 109 or example 110, wherein the mixer is selected from the group consisting of a tumbler, a vibratory mixer, a rotary mixer, a marinator mixer, and a stirrer.

Example 112: The method of any examples herein, particularly examples 109-111, wherein the mixer is selected from the group consisting of a tumbler, a rotary mixer, a marinator mixer, and a stirrer and wherein the method comprises dynamically mixing the dry particles comprising the precursor and dry particles comprising the proton-generating species at a rate of from 1 revolution per day (RPD) to 100 revolutions per minute (RPM).

Example 113: The method of any examples herein, particularly examples 109-111, wherein the mixer is a vibratory mixer and the method comprise dynamically mixing the dry particles comprising the precursor and dry particles comprising the proton-generating species at a rate of from 1 Hertz (Hz) to 20 kilohertz (kHz).

Example 114: The method of any examples herein, particularly examples 109-113, wherein the amount of time that the dry particles comprising the precursor and dry particles comprising the proton-generating species are dynamically mixed is from 1 minute to 24 hours.

Example 115: The method of any examples herein, particularly examples 109-114, wherein the method further comprises milling, crushing, abrading, or a combination thereof the dry particles comprising the precursor and dry particles comprising the proton-generating species.

Example 116: The method of any examples herein, particularly examples 109-115, wherein the mixer further contains an abrasive particle and producing the treatment gas in the reactor further comprises dynamically mixing the abrasive particle with the dry particles comprising the precursor and dry particles comprising the proton-generating species.

Example 117: The method of any examples herein, particularly examples 109-116, wherein the mixer further contains a deliquescent and producing the treatment gas in the reactor further comprises dynamically mixing the deliquescent with the dry particles comprising the precursor and dry particles comprising the proton-generating species.

Example 118: The method of any examples herein, particularly examples 109-117, wherein the mixer further contains a desiccant and producing the treatment gas in the reactor further comprises dynamically mixing the desiccant with the dry particles comprising the precursor and dry particles comprising the proton-generating species.

Example 119: The method of any examples herein, particularly examples 96-118, wherein the dry particles comprising the precursor comprise a chlorine dioxide precursor and the treatment gas comprises chlorine dioxide; the dry particles comprising the precursor comprise a carbon dioxide precursor and the treatment gas comprises carbon dioxide; or a combination thereof.

Example 120: The method of any examples herein, particularly examples 96-119, wherein the dry particles comprising the precursor further comprise a porous carrier selected from the group consisting of zeolite crystals, silica, pumice, diatomaceous earth, bentonite, and clay, and wherein the precursor is impregnated in the porous carrier.

Example 121: The method of any examples herein, particularly examples 96-120, wherein the dry particles comprising the precursor include from 1% to 30% by weight of the precursor.

Example 122: The method of any examples herein, particularly examples 96-121, wherein the dry particles comprising the precursor comprise a carbon dioxide precursor and the carbon dioxide precursor comprises a carbon-containing compound selected from the group consisting of carbonates, bicarbonates, sesquicarbonates, and combinations thereof.

Example 123: The method of any examples herein, particularly example 122, wherein the carbon-containing compound is selected from the group consisting of sodium carbonate, sodium bicarbonate, sodium sesquicarbonate, and combinations thereof.

Example 124: The method of any examples herein, particularly examples 96-123, wherein the dry particles comprising the precursor comprise a chlorine dioxide precursor and the chlorine dioxide precursor comprises a chlorine dioxide-producing compound selected from the group consisting of a metal chlorite, a metal chlorate, chloric acid, hypochlorous acid, and combinations thereof.

Example 125: The method of any examples herein, particularly example 124, wherein the metal chlorite comprises sodium chlorite, barium chlorite, calcium chlorite, lithium chlorite, potassium chlorite, magnesium chlorite, or combinations thereof; or wherein the metal chlorate comprises sodium chlorate, lithium chlorate, potassium chlorate, magnesium chlorate, barium chlorate, or combinations thereof.

Example 126: The method of any examples herein, particularly examples 96-125, wherein the dry particles comprising the proton-generating species further comprise a porous carrier selected from the group consisting of zeolite crystals, silica, pumice, diatomaceous earth, bentonite, and clay, and wherein the proton-generating species is impregnated in the porous carrier.

Example 127: The method of any examples herein, particularly examples 96-126, wherein the dry particles comprising the proton-generating species include from 10% to 40% by weight of the proton-generating species.

Example 128: The method of any examples herein, particularly examples 96-127, wherein the proton-generating species comprises an organic acid, an inorganic acid, a metal salt, or a combination thereof.

Example 129: The method of any examples herein, particularly examples 96-128, wherein the proton-generating species comprises an organic acid and/or an inorganic acid selected from the group consisting of acetic acid, citric acid, hydrochloric acid, phosphoric acid, propionic acid, sulfuric acid, and combinations thereof.

Example 130: The method of any examples herein, particularly examples 96-129, wherein the proton-generating species comprises a metal salt selected from the group consisting of ferric chloride, ferric sulfate, $CaCl_2$, $ZnSO_4$, $ZnCl_2$, $CoSO_4$, $CoCl_2$, $MnSO_4$, $MnCl_2$, $CuSO_4$, $CuCl_2$, $MgSO_4$, sodium acetate, sodium citrate, sodium sulfate, sodium bisulfate, hydrogen phosphate, disodium hydrogen phosphate, and combinations thereof.

Example 131: The method of any examples herein, particularly examples 82-95, wherein producing the treatment gas in the reactor comprises mixing a solution of a precursor and a solution of a proton generating species.

Example 132: The method of any examples herein, particularly example 131, wherein the precursor comprises a carbon dioxide precursor and the carbon dioxide precursor comprises a carbon-containing compound selected from the group consisting of carbonates, bicarbonates, sesquicarbonates, and combinations thereof.

Example 133: The method of any examples herein, particularly example 132, wherein the carbon-containing compound is selected from the group consisting of sodium carbonate, sodium bicarbonate, sodium sesquicarbonate, and combinations thereof.

Example 134: The method of any examples herein, particularly example 131, wherein the precursor comprises a chlorine dioxide precursor and the chlorine dioxide precursor comprises a chlorine dioxide-producing compound selected from the group consisting of a metal chlorite, a metal chlorate, chloric acid, hypochlorous acid, and combinations thereof.

Example 135: The method of any examples herein, particularly example 134, wherein the metal chlorite comprises sodium chlorite, barium chlorite, calcium chlorite, lithium chlorite, potassium chlorite, magnesium chlorite, or combinations thereof; or wherein the metal chlorate comprises sodium chlorate, lithium chlorate, potassium chlorate, magnesium chlorate, barium chlorate, or combinations thereof.

Example 136: The method of any examples herein, particularly examples 131-135, wherein the proton-generating species comprises an organic acid, an inorganic acid, a metal salt, or a combination thereof.

Example 137: The method of any examples herein, particularly examples 131-136, wherein the proton-generating species comprises an organic acid and/or an inorganic acid selected from the group consisting of acetic acid, citric acid, hydrochloric acid, phosphoric acid, propionic acid, sulfuric acid, and combinations thereof.

Example 138: The method of any examples herein, particularly examples 131-137, wherein the proton-generating species comprises a metal salt selected from the group consisting of ferric chloride, ferric sulfate, $CaCl_2$, $ZnSO_4$, $ZnCl_2$, $CoSO_4$, $CoCl_2$, $MnSO_4$, $MnCl_2$, $CuSO_4$, $CuCl_2$, $MgSO_4$, sodium acetate, sodium citrate, sodium sulfate, sodium bisulfate, hydrogen phosphate, disodium hydrogen phosphate, and combinations thereof.

Example 139: The method of any examples herein, particularly example 131, wherein the treatment gas comprises chlorine dioxide and the chlorine dioxide gas is generated by mixing a sodium chlorite solution and hydrochloric acid solution.

Example 140: The method of any examples herein, particularly examples 82-139, wherein the method further comprises recycling the treatment gas from the treatment zone.

The devices and methods of the appended claims are not limited in scope by the specific devices and methods described herein, which are intended as illustrations of a few aspects of the claims and any devices and methods that are functionally equivalent are within the scope of this disclosure. Various modifications of the devices and methods in addition to those shown and described herein are intended to fall within the scope of the appended claims. Further, while only certain representative devices and methods, and aspects of these devices and methods are specifically described, other devices and methods and combinations of various features of the devices and methods are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A method of treating a raw agricultural product with a treatment gas within a treatment zone, wherein the raw agricultural product comprises hemp and/or belongs to a crop group or subgroup defined in Table 1, the method comprising:

producing the treatment gas in a reactor, the reactor being fluidly connected to the treatment zone; and applying a pressure differential to direct the treatment gas from the reactor to the treatment zone;

wherein the raw agricultural product is treated with the treatment gas in the treatment zone;

wherein the raw agricultural product has a surface and the surface has a reactivity with the treatment gas, the reactivity of the surface of the raw agricultural product with the treatment gas being the surface reactivity;

wherein a dose of the treatment gas is delivered to the treatment zone at a relative velocity;

wherein the method further comprises selecting the dose of the treatment gas and the relative velocity in view of the surface reactivity of the raw agricultural product to be treated;

wherein:

when the raw agricultural product has a low surface reactivity, then the dose is from 1 to 1000 ppmv and the relative velocity is from 0.01 to 0.1 feet per minute;

when the raw agricultural product has a moderate surface reactivity, then the dose is from 0.1 to 100 ppmv and the relative velocity is from 0.05 to 0.25 feet per minute; and when the raw agricultural product has a high surface reactivity, then the dose is from 0.01 to 10 ppmv and the relative velocity is from 0.05 to 0.5 feet per minute;

and wherein surface reactivity of the raw agricultural product is as defined in Table 1.

2. The method of claim 1, wherein when the raw agricultural product as a low surface reactivity, then the humidity of the treatment zone is from 60%-100%; when the raw agricultural product has a moderate surface reactivity, then the humidity of the treatment zone is from 40%-80%; and when the raw agricultural product has a high surface reactivity, then the humidity of the treatment zone is from 20%-60%; wherein the humidity is non-condensing.

3. The method of claim 1, wherein the reactor further comprises a bed comprising dry particles of a precursor and dry particles of a proton generating species and producing the treatment gas in the reactor comprises directing air through the bed, and wherein the method further comprises controlling or adjusting the rate at which the treatment gas is produced by controlling or adjusting: the presence or absence of air flowing though the bed, the amount of time the air flows through the bed, the amount of the dry particles comprising the precursor in the bed, the amount of the dry particles comprising the proton-generating species in the bed, the temperature, or a combination thereof.

4. The method of claim 1, wherein the reactor further comprises dry particles of a precursor and dry particles of a proton generating species enclosed within an enclosing material and producing the treatment gas in the reactor comprises directing air through the reactor, and wherein the method further comprises controlling or adjusting the rate at which the treatment gas is produced by controlling or adjusting: the presence or absence of air flowing though the reactor, the amount of time the air flows through the reactor, the amount of the dry particles comprising the precursor enclosed in the enclosing material, the amount of the dry particles comprising the proton-generating species enclosed within the enclosing material, the temperature, the humidity of the air flowing through the reactor, the type of enclosing material, the thickness of the enclosing material, or a combination thereof.

5. The method of claim 1, wherein the reactor further comprises a mixer containing dry particles of a precursor and dry particles of a proton generating species and wherein producing the treatment gas in the reactor comprises dynamically mixing the dry particles of the precursor and the dry particles of the proton generating species in the mixer, and wherein the method further comprises controlling or adjusting the rate at which the treatment gas is produced by controlling or adjusting: the amount of time the dry particles comprising the precursor and the dry particles comprising the proton-generating species are dynamically mixed, the rate at which the dry particles comprising the precursor and the dry particles comprising the proton-generating species are dynamically mixed, or a combination thereof.

6. The method of claim 1, wherein the absolute value of the pressure differential is from greater than 0 to 1 pounds per square inch (psi).

7. The method of claim 1, wherein the raw agricultural product is further contained within a gas permeable container within the treatment zone.

8. The method of claim 1, wherein the treatment gas comprises chlorine dioxide, carbon dioxide, or a combination thereof.

9. The method of claim 1, wherein the raw agricultural product is contacted with the treatment gas within the treatment zone for an amount of time of from 5 minutes to 48 hours.

10. The method of claim 1, wherein the method further comprises selecting the humidity of the treatment zone in view of the surface reactivity of the raw agricultural product.

11. The method of claim 1, wherein the method further comprises recycling the treatment gas from the treatment zone.

* * * * *